US012000186B1

(12) United States Patent
Mapson

(10) Patent No.: US 12,000,186 B1
(45) Date of Patent: Jun. 4, 2024

(54) THREE-POINT DOOR CLOSURE MECHANISM WITH PASSIVE LATCH

(71) Applicant: Zoox, Inc., Foster City, CA (US)

(72) Inventor: Adam Christopher Mapson, Millbrae, CA (US)

(73) Assignee: Zoox, Inc., Foster City, CA (US)

(*) Notice: Subject to any disclaimer, the term of this patent is extended or adjusted under 35 U.S.C. 154(b) by 137 days.

(21) Appl. No.: 17/498,271

(22) Filed: Oct. 11, 2021

(51) Int. Cl.
E05F 17/00 (2006.01)
B60J 5/04 (2006.01)
E05B 81/10 (2014.01)
E05B 83/38 (2014.01)
E05B 83/40 (2014.01)
E05D 15/10 (2006.01)
E05F 15/643 (2015.01)

(52) U.S. Cl.
CPC ............. *E05B 83/40* (2013.01); *B60J 5/0468* (2013.01); *B60J 5/0479* (2013.01); *E05B 81/10* (2013.01); *E05B 83/38* (2013.01); *E05D 15/101* (2013.01); *E05D 15/1047* (2013.01); *E05F 15/643* (2015.01); *E05Y 2201/434* (2013.01); *E05Y 2201/64* (2013.01); *E05Y 2201/654* (2013.01); *E05Y 2201/684* (2013.01); *E05Y 2900/531* (2013.01)

(58) Field of Classification Search
CPC .. E05B 83/38; E05B 8/40; E05B 81/10; B60J 5/0468; B60J 5/0479; E05D 15/101; E05D 15/1047; E05D 15/643; E05Y 2201/434; E05Y 2201/64; E05Y 2201/654; E05Y 2201/684; E05Y 2900/531

USPC .................................. 49/360, 163, 370, 371
See application file for complete search history.

(56) References Cited

U.S. PATENT DOCUMENTS

| | | | | |
|---|---|---|---|---|
| 5,967,595 A | * | 10/1999 | Heya | B60J 5/06 49/213 |
| 6,036,257 A | * | 3/2000 | Manuel | E05D 15/1081 49/213 |
| 6,328,374 B1 | * | 12/2001 | Patel | E05D 15/1047 49/213 |
| 6,942,277 B2 | * | 9/2005 | Rangnekar | E05D 3/127 16/366 |
| 7,798,557 B2 | * | 9/2010 | Elliott | B60J 5/06 296/146.12 |
| 7,954,880 B2 | * | 6/2011 | Kunishima | E05D 15/1081 296/146.12 |
| 8,353,555 B2 | * | 1/2013 | Boettcher | E05D 15/1047 296/146.12 |
| 9,475,368 B2 | * | 10/2016 | Choi | B60J 5/0479 |

(Continued)

FOREIGN PATENT DOCUMENTS

WO WO-2012159784 A1 * 11/2012 ......... E05D 15/0678

*Primary Examiner* — Jerry E Redman
(74) *Attorney, Agent, or Firm* — Lee & Hayes, P.C.

(57) ABSTRACT

A door assembly includes a door, a door actuator mechanism configured to transition the door between an open position and a closed position, a first latch configured to hold the door in the closed position, and a second latch engaging with a portion of the door actuator mechanism and being configured to hold the door in the closed position. The second latch includes a cam and a biasing member coupled to the cam. The biasing member is configured to transition the cam between a first position in which the cam engages the portion of the door actuator mechanism, and a second position in which the cam disengages the portion of the door actuator mechanism.

20 Claims, 26 Drawing Sheets

(56) References Cited

U.S. PATENT DOCUMENTS

| | | | | |
|---|---|---|---|---|
| 9,605,469 | B2* | 3/2017 | Henseleit | E05F 15/73 |
| 10,384,519 | B1* | 8/2019 | Brown | B60J 5/047 |
| 10,633,908 | B1* | 4/2020 | Loeb | E05D 15/1002 |
| 10,876,341 | B2* | 12/2020 | Taylor | E05F 15/41 |
| 10,914,108 | B2* | 2/2021 | Yun | B60J 5/06 |
| 10,960,739 | B2* | 3/2021 | Choi | B60J 5/043 |
| 11,072,228 | B2* | 7/2021 | Choi | B60J 10/33 |
| 11,085,224 | B2* | 8/2021 | Loeb | E05F 15/649 |
| 11,313,163 | B2* | 4/2022 | Yun | E05D 15/30 |
| 11,332,081 | B2* | 5/2022 | Choi | B60J 5/0479 |
| 11,358,445 | B1* | 6/2022 | Shahoian | B60J 5/0479 |
| 11,359,430 | B2* | 6/2022 | Linden | E05F 15/73 |
| 11,525,293 | B2* | 12/2022 | Yun | E05D 15/0621 |
| 11,585,141 | B2* | 2/2023 | Yun | E05F 11/04 |
| 11,597,492 | B2* | 3/2023 | Griffiths | E05D 15/0621 |
| 2016/0114659 | A1* | 4/2016 | Maruyama | E06B 3/509 |
| | | | | 49/164 |
| 2016/0129769 | A1* | 5/2016 | Choi | E05B 85/24 |
| | | | | 49/159 |
| 2016/0272053 | A1* | 9/2016 | Maruyama | E05D 13/04 |
| 2016/0348409 | A1* | 12/2016 | Choi | E05B 83/40 |
| 2020/0392766 | A1* | 12/2020 | Marshall | E05B 83/36 |
| 2021/0079703 | A1* | 3/2021 | Yun | E05D 15/30 |
| 2022/0090427 | A1* | 3/2022 | Choi | E05D 15/48 |
| 2022/0106822 | A1* | 4/2022 | Yun | B60J 5/047 |
| 2022/0195773 | A1* | 6/2022 | Bettcher, III | E05D 5/062 |
| 2023/0137554 | A1* | 5/2023 | Kajino | E05D 7/0009 |
| | | | | 49/340 |

* cited by examiner

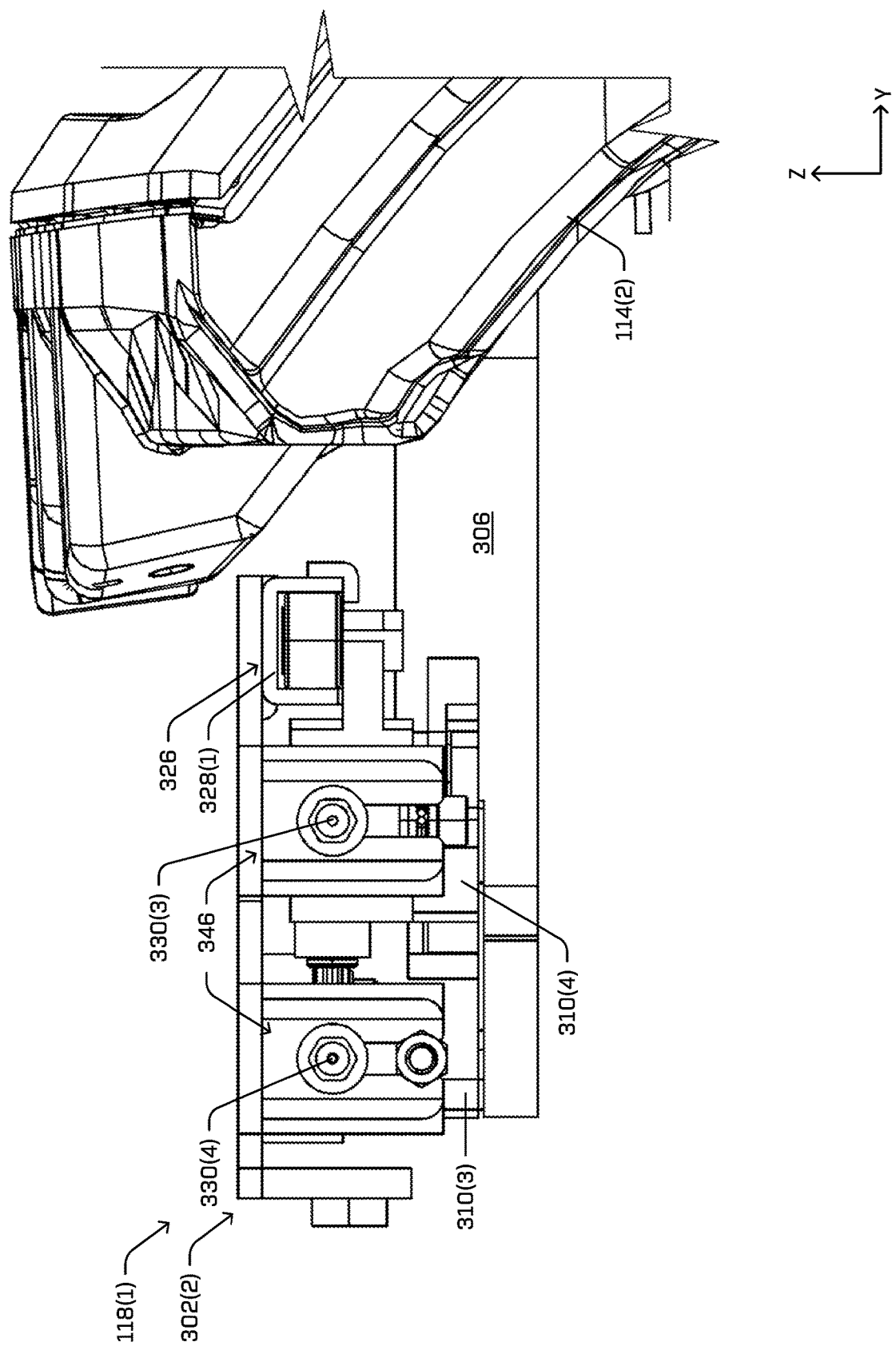

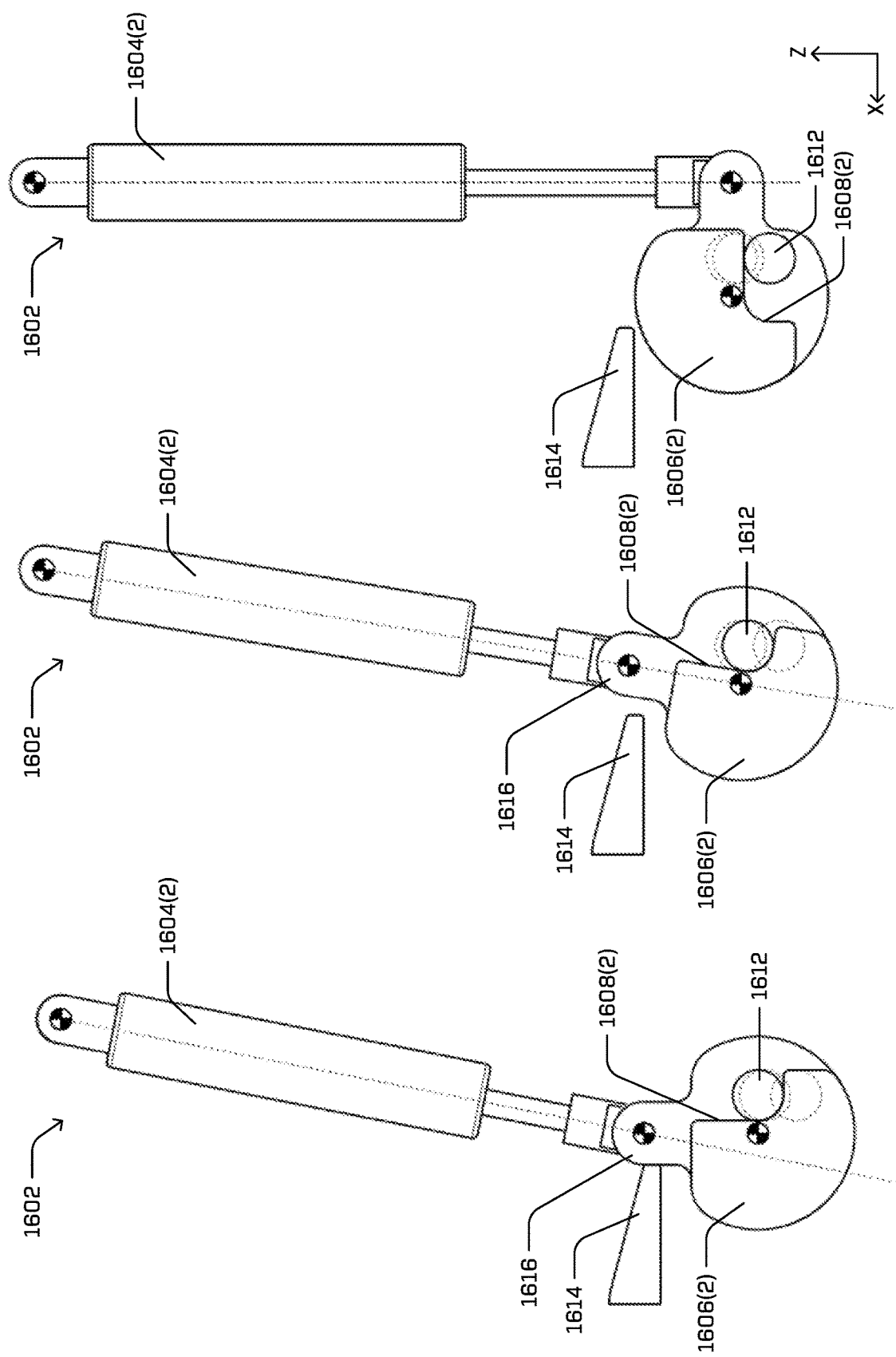

THREE-POINT DOOR CLOSURE MECHANISM WITH PASSIVE LATCH

BACKGROUND

Vehicles can include an interior space within which one or more passengers are seated. To access the interior space, vehicles can include one or more doors that are opened and closed. For example, the doors may be transitioned between an open position for allowing passengers to enter or exit the interior space, and a closed position for enclosing the interior space. Conventionally, doors are rotatably coupled to the vehicle and passengers wishing to enter and exit the interior space may rotate the doors about a hinge point.

However, opening and/or closing doors in this manner can be problematic. For example, depending on the location of the vehicle and/or the proximity of the vehicle to other vehicles or objects, it may be difficult to rotate the door. For example, in situations in which the vehicle is parked relatively close to a wall, telephone pole, and/or another vehicle, space around the doors may be limited. In such situations, it may be difficult to open the door, and as a result, passengers may have difficulty entering and/or exiting the interior space. While attempts have been made to develop sliding doors that open by sliding parallel to a side of the vehicle, such as for vans and buses, these doors often include complicated assemblies. Such assemblies are prone to failure, demand increased footprints within the vehicle, and create aesthetically unappealing connections. Additionally, the assemblies may include components that are visible from an exterior of the vehicle, which may reduce an aesthetic appearance of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 3D is a fourth view of the first door actuator mechanism for opening and closing door(s) of the vehicle of FIG. 1, according to an example of the present disclosure.

FIGS. 16D-F illustrate views showing an operation of the latching mechanism of FIG. 16A, according to an example of the present disclosure.

DETAILED DESCRIPTION

Figure 1:
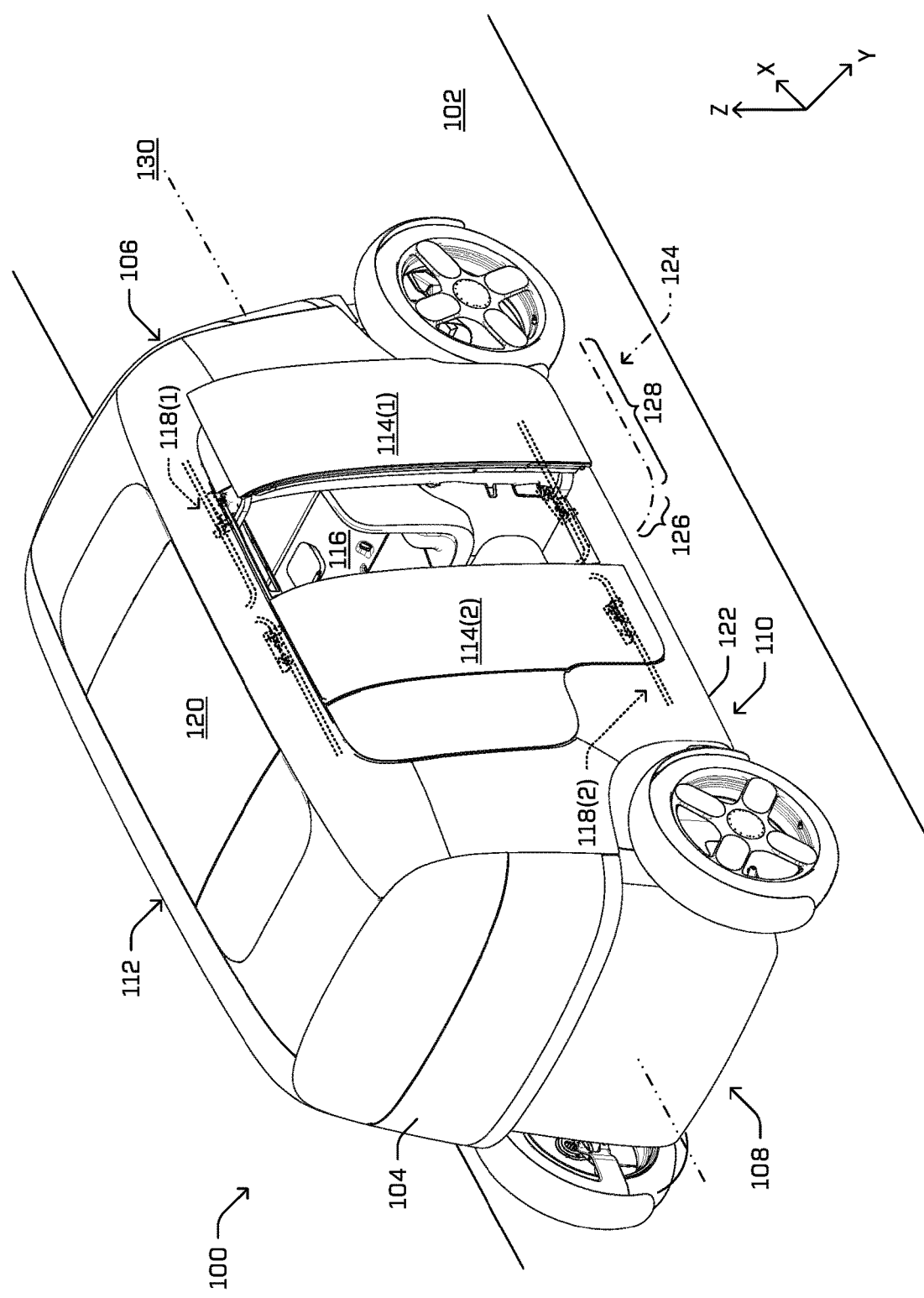
FIG. 1 is a perspective view of an example vehicle, including example door actuator mechanisms for accessing an interior space of the vehicle, according to an example of the present disclosure.

This disclosure relates to door actuator mechanisms for opening and closing door(s) of a vehicle. For example, vehicles may include one or more doors (or door assemblies) movably coupled to a frame, body, and/or other component of the vehicle via the door actuator mechanisms. In some instances, a first door actuator mechanism may couple to a first portion of a door, such as a top of the door, to the vehicle, and a second door actuator mechanism may couple to a second portion of the door, such as a bottom of the door, to the vehicle. The door actuator mechanisms may respectively include carriage assemblies that are configured to transition the doors between an open position and a closed position. In the open position, access to an interior space of the vehicle is provided and in the closed position, access to the interior space is restricted. The carriage assemblies of the first door actuator mechanism and the second door actuator mechanism may be disposed within an interior of the vehicle and may not be visible from an exterior of the vehicle. In some instances, the first door actuator mechanism and the second door actuator mechanism may include carriage assemblies, at the top and the bottom of the door, which may eliminate a potential third (middle) carriage assembly. The carriage assemblies can serve to open the door along a travel path (between the closed position and the open position) that is substantially parallel to a longitudinal axis of the vehicle. Such a travel path may be substantially parallel and in close proximity to a side of the vehicle to reduce a travel footprint of the doors during opening and closing. In other words, an amount of lateral travel by the doors during opening and closing may be reduced relative to conventional doors. As such, the doors may be opened and closed when the vehicle is parked in relatively close proximity to other vehicles or other objects to enable passengers to enter and exit the interior space of the vehicle. Additionally, given the positioning of the first door actuator mechanism and the second door actuator mechanism within an interior, an aesthetic appearance of the vehicle may be increased.

In some instances, the vehicle may include multiple door actuator mechanisms that are located on opposing sides of the vehicle. For example, a first door assembly having a first door and a second door may be located on a first side of the vehicle, and a second door assembly having a third door and a fourth door may be located on a second side of the vehicle.

In some instances, the doors on either side of the vehicle may be opened and closed individually, or collectively (e.g., in unison). When opened, the doors may extend in a direction away from one another, towards longitudinal ends of the vehicle. When closed, the doors may be positioned adjacent one another, towards a central lateral axis of the vehicle. While two door assemblies are described, each with two separate doors, the vehicle may include any number of doors located along sides and/or ends of the vehicle.

In some instances, the door actuator mechanisms may include one or more carriage assemblies that facilitate opening and closing the doors. For example, the first door actuator mechanism on the first side of the vehicle may include a first carriage assembly coupled to a first door of the first door assembly and a second carriage assembly coupled to a second door of the first door assembly. In some instances, the first door actuator mechanism is disposed proximate a top of the first door assembly. Here, the first carriage assembly may couple proximate a top of the first door of the first door assembly, and the second carriage assembly may couple proximate a top of the second door of the first door assembly. The first door actuator mechanism may be disposed on a ceiling of the vehicle within the interior space. However, portions of the first door actuator mechanism may be visibly concealed within the interior space (e.g., beneath headliner(s)). Additionally, in some instances, the second door actuator mechanism may include a third carriage assembly coupled to the first door of the first door assembly and a fourth carriage assembly coupled to the second door of the first door assembly. In some instances, the second door actuator mechanism is disposed proximate a bottom of the first door assembly. Here, the third carriage assembly may couple proximate a bottom of the first door of the first door assembly, and the fourth carriage assembly may couple proximate a bottom of the second door of the first door assembly. The second door actuator mechanism may be disposed on a floor of the vehicle, within the interior space. However, portions of the second door actuator mechanism may be visibly concealed within the interior space (e.g., beneath floorboard).

The first door actuator mechanism may therefore support the top of the first door assembly while the first door and the second door are respectively opened and closed, and the second door actuator mechanism may support the bottom of the first door assembly while the first door and the second door are respectively opened and closed. The first door and the second door may include an unsupported portion spanning from the first door actuator mechanism and the second door actuator mechanism. The positioning of the first door actuator mechanism and the second door actuator mechanism at the top and bottom of the door, respectively, may stabilize the doors during opening and closing. For example, introduced below, carriages of the carriage assembly may travel within channels (e.g., rails) that constrain movement of the door in undesired directions. This may reduce an amount of undesired movement (e.g., vibration) of the door during opening and closing. Additionally, actuators may simultaneously pull or actuate the top of the door and the bottom of the door to apply a tensioning force that limits undesired movement of the door. In this design, with the first door actuator mechanism and the second door actuator mechanism, a third door actuator mechanism, for example, may be eliminated. That is, compared to conventional track-based system that include mechanisms for opening a middle portion of the door, the use of the first door actuator mechanism at the top of the door and the second door actuator mechanism at the bottom of the door may eliminate a need for additional actuator mechanisms. The second door assembly on the second side of the vehicle may include a similar first door actuator mechanism and/or second door actuator mechanism for opening and closing doors of the second door assembly.

The carriage assemblies of the first door actuator mechanism and the second door actuator mechanism may be configured to travel along or within paths, tracks, channels, and so forth to open and close the doors. In some instances, actuators, cables, motors, and the like are coupled to the carriage assemblies for maneuvering the carriage assemblies along the channels. For example, when the doors are closed, actuators may pull the carriage assemblies in a first direction along the channels to open the door, and when the doors are opened, the actuators may push the carriage assemblies in a second direction along the channels. In some instances, each of the carriage assemblies of the first door actuator mechanism and the second door actuator mechanism may operably couple whether directly or indirectly to one or more actuators for closing and opening the door.

In some instances, a series of cables may be routed to pull the carriage assemblies in different directions during opening and closing. For example, a first cable may couple to the first carriage assembly of the first door actuator mechanism and the first carriage assembly of the second door actuator mechanism. The first cable also connects to a first actuator, such as a first motor. When the first motor rotates in a first direction, the first cable may pull on the first carriage assembly of the first door actuator mechanism and the first carriage assembly of the second door actuator mechanism to open the first door. Conversely, a second cable may couple to the first carriage assembly of the first door actuator mechanism, the first carriage assembly of the second door actuator mechanism, as well as the motor. When the motor rotates in a second direction, the second cable may pull on the first carriage assembly of the first door actuator mechanism and the first carriage assembly of the second door actuator mechanism to close the door. The first cable and the second cable may therefore represent a closed loop system for opening and closing the first door. Other doors of the vehicle may operate similarly to open and close.

In some instances, the carriage assemblies include wheels that engage with the channels to guide the carriage assemblies along a path defined by the channels. As the doors open and close, the wheels can travel along the path defined by the channels. In some instances, the channels include a first portion that extends substantially lateral to the vehicle, parallel to a lateral axis of the vehicle, and a second portion that extends substantially longitudinal to the vehicle, parallel to a longitudinal axis of the vehicle. As such, the first portion may be non-linear with the longitudinal axis of the vehicle. The channels can curve between the first portion and the second portion to permit the wheels to travel between the first portion and the second portion. During opening of the doors, for example, the doors may first maneuver away from the vehicle (via the first portion), and then maneuver along a side of the vehicle (via the second portion). Additionally, the carriages of the first door actuator mechanism and the second door actuator mechanism are constrained by the channels to limit undesired movement of the doors.

Movement in a direction away from the vehicle serves to offset the door from the vehicle such that the door may move longitudinally and alongside the vehicle. In other words, when transitioning the door assemblies from the closed position to the open position, the first portion of the channel causes the doors to travel in a first direction away from the vehicle while causing a face (outer surface) of the door to remain substantially parallel to the longitudinal axis of the vehicle. Here, the first portion may direct the door outward away from the interior space of the vehicle. Once the vehicle door has traveled a desired distance in the first direction, and along the first portion of the channel, the second portion of the channel causes the door to travel in a second direction that is substantially parallel to the longitudinal axis of the vehicle. During this instance, the face of the door remains substantially parallel to the longitudinal axis of the vehicle. As such, during opening of the doors, the first portion of the channel moves the doors outward from the side of the vehicle. This may prevent seals of the door rubbing or contacting the body of the door. Additionally, the lateral movement of the doors, outwards from the vehicle, provides a clearance between the doors and the body to allow longitudinal movement of the doors towards the open position. During closing of the door, first portion of the channel directs the doors inward towards the vehicle such that the seals engage the body in a substantially lateral direction (without longitudinal motion). Such movement of the doors is accomplished via the shape of the channels and the use of multiple carriages coupled to the door.

The carriage assemblies may include components, such as pivotable couplings, hinges, linkages, and so forth that permit the carriage assemblies to traverse the path defined by the channels. In some instances, the carriage assemblies include a first carriage and a second carriage that are pivotably coupled together and/or via one or more linkages. The first carriage includes first wheels that traverse the first portion of the channel and then the second portion of the channel as the door moves from the closed position to the open position. Additionally, as the door moves from the open position to the closed position, the first wheels may traverse the second portion of the channel and then the first portion of the channel. The second carriage can include second wheels that are configured to traverse the second portion of the channel to maneuver the door substantially parallel to the longitudinal axis of the vehicle. The second carriage, or the second wheels of the second carriage, may not be capable of traversing the first portion of the channel. As such, movement of the carriage assembly into and out of the closed position can be accomplished via the first carriage pivotably coupling to the second carriage such that the first wheels of the first carriage traverse the first portion and the second portion of the channel.

The carriage assemblies can include components for coupling to the doors. In some instances, the carriage assemblies couple to the door via a bracket. A first end of a bracket may couple to the door. One or more linkages may pivotably couple the bracket to the first carriage and the second carriage. The bracket and the one or more linkages assist in transferring movement imparted to the second carriage to the first carriage. Here, the bracket servers to operably couple the first carriage and the second carriage for traversing the carriage assembly along the channel. For example, as introduced above, pulling on the second carriage via one or more cables may cause the door to open and close. Movement of the second carriage (via the pulling on the cable) can be imparted to the first carriage via the bracket and the one or more linkages operably coupling the first carriage and the second carriage. Additionally, or alternatively, a first link may couple the bracket to the first carriage, such that movement of the second carriage is imparted to the first carriage via the link. In such instances, the second carriage may also couple to the bracket directly, or via one or more links.

In some instances, movement of the first door actuator mechanism (such as the first carriage assembly or the second carriage assembly) is commensurate with the second door actuator mechanism (such as the third carriage assembly or the fourth carriage assembly), respectively, such that the top and the bottom of the doors are opened in unison. As such, for a respective door, the carriage assembly of the first door actuator mechanism and the carriage assembly of the second door actuator mechanism may traverse paths during opening and closing of the door.

As will be evident from the examples described below, the door mechanisms of the present disclosure are more robust, compact, and simpler than existing systems utilized to open and close doors. Moreover, the door mechanisms described herein enable opening and closing of the doors within a smaller footprint compared to conventional system. This may improve user experiences when entering and exiting the vehicle. Additionally, the reduced footprint permits the doors to open and close in constrained environments that were previously unattainable.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 illustrates an example vehicle 100 that includes door actuator mechanisms having one or more carriage assemblies for opening and closing doors of the vehicle 100. The vehicle 100 may be configured to travel across an area 102 (e.g., a road surface) to transport people and/or cargo from a first location to a second location. For the purpose of illustration, the vehicle 100 may represent an autonomous vehicle configured to operate according to a Level 5 classification issued in 2016 by the U.S. National Highway Traffic Safety Administration, which describes a vehicle capable of performing all safety critical functions for the entire trip, with the driver (or occupant) not being expected to control the vehicle 100 at any time. In that case, since the vehicle 100 may be configured to control all functions from start to stop, including all parking functions, the vehicle 100 may be unoccupied. However, the disclosure may be incorporated into any ground-borne vehicle, including those ranging from vehicles that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The vehicle 100 may generally include a body 104 having a first lateral end 106, a second lateral end 108, a first lateral side 110, and a second lateral side 112. In some instances, the vehicle 100 may be bi-directional and configured to travel in multiple directions. For example, in some instances, the first lateral end 106 of the vehicle 100 may represent a front end of the vehicle 100 when traveling in a forward direction, and the second lateral end 108 of the vehicle 100 may represent a front end of the vehicle 100 when traveling in an opposite direction.

The vehicle 100 may include one or more doors 114 on each side of the vehicle 100 for facilitating entry and exit of occupants and cargo to and from an interior space 116 of the vehicle 100. As shown in FIG. 1, the first lateral side 110 may include a first door 114(1) and a second door 114(2). The doors 114 are independently maneuverable between an open position and a closed position. As shown in FIG. 1, the first door 114(1) is in an open position, while the second door 114(2) is shown in a closed position. However, in some instances, the first door 114(1) and the second door 114(2) may operate in unison such that the first door 114(1) and the second door 114(1) open and close together. That is, when the first door 114(1) opens and closes, the second door 114(2) may open and close, respectively. In the closed position, the first door 114(1) and the second door 114(2) may seal against one another and/or the body 104 to prevent the ingress of water, debris, sound, and so forth into the interior space 116. Additionally, in the closed position, the first door 114(1) and the second door 114(2) may be latched together, or the first door 114(1) and the second door 114(2) may independently latch (e.g., lock) or otherwise secure to the body 104. To seal the first door 114(1) and the second door 114(1), one of the first door 114(1) or the second door 114(2) may be configured to be opened first.

Movement of the first door 114(1) and the second door 114(2), between the open and closed position, may be accomplished at least in part by one or more door actuator mechanisms 118. In some instances, a first door actuator mechanism 118(1) (shown in dashed lines in FIG. 1) may be disposed proximate a top 120 of the vehicle 100 and include respective carriage assemblies that couple to the first door 114(1) and the second door 114(2). For example, as discussed in detail herein, the first door actuator mechanism 118(1) may include a first carriage assembly that couples to the first door 114(1) and a second carriage assembly that couples to the second door 114(2). The first carriage assembly may couple proximate a top of the first door 114(1), and the second carriage assembly may couple proximate a top of the second door 114(2). Additionally, a second door actuator mechanism 118(2) (shown in dashed lines in FIG. 1) may be disposed proximate a bottom 122 of the vehicle 100 and include respective carriage assemblies that couple to the first door 114(1) and the second door 114(2). For example, as discussed in detail herein, the second door actuator mechanism 118(2) may include a first carriage assembly that couples to the first door 114(1) and a second carriage assembly that couples to the second door 114(2). The first carriage assembly may couple proximate a bottom of the first door 114(1), and the second carriage assembly may couple proximate a bottom of the second door 114(2). The first door 114(1) includes an unsupported portion spanning from the first carriage assembly of the first door actuator mechanism 118(1) and the first carriage assembly of the second door actuator mechanism 118(2). Likewise, the second door 114(2) includes an unsupported portion spanning from the second carriage assembly of the first door actuator mechanism 118(1) to the second carriage assembly of the second door actuator mechanism 118(2).

The carriage assemblies of the first door actuator mechanism 118(1) and the second door actuator mechanism 118(2), respectively, facilitate movement of the first door 114(1) and the second door 114(2) between the open position and the closed position. In other words, the first carriage assembly of the first door actuator mechanism 118(1) and the second door actuator mechanism 118(2) maneuver the first door 114(1) between open and closed positions. Likewise, the second carriage assembly of the second door actuator mechanism 118(1) and the second door actuator mechanism 118(2) maneuver the second door 114(2) between open and closed positions. In some instances, the use the first door actuator mechanism 118(1) and the second door actuator mechanism 118(2) helps to stabilize the first door 114(1) during opening and closing and/or prevent oscillations during opening and closing.

The first door 114(1) and the second door 114(2) are configured to follow travel paths during opening and closing. For example, as shown in FIG. 1, the first door 114(1) is shown including a travel path 124. The travel path 124 may be defined at least in part by a first section 126 and a second section 128. In some instances, the first section 126 extends substantially lateral relative to a longitudinal axis 130 of the vehicle 100, and the second section 128 extends substantially parallel to the longitudinal axis 130 of the vehicle 100. Here, during opening of the first door 114(1), for example, the first door 114(1) may first extend away from the vehicle 100 in a first direction (Y-direction) as the first door 114(1) traverses the first section 126 of the travel path 124. Therein, the first door 114(1) may extend alongside the vehicle 100, in a second direction (X-direction) as the first door 114(1) traverses the second section 128 of the travel path 124. In this position, the first door 114(1) may be disposed alongside the first lateral side 110 of the vehicle 100. Extension of the first door 114(1) in the first direction offsets the first door 114(1) from the vehicle 100 and permits the first door 114(1) to travel in the second direction and along the first lateral side 110 of the vehicle 100.

In some instances, actuation of the first door 114(1) may come by way of actuators, cables, and the like that pull and/or push on the first carriage assembly of the first door actuator mechanism 118(1) and the first carriage of the second door actuator mechanism 118(2). In some instances, the first carriage assembly of the first door actuator mechanism 118(1) may traverse along channels via wheels that engage with the channels. The channels in which the first carriage assembly of the first door actuator mechanism 118(1) engage may be at least partially disposed beneath a headliner (e.g., ceiling) within the interior space 116 (shown in dashed lines). Similarly, the first carriage of the second door actuator mechanism 118(2) may traverse along channels via wheels that engage with the channels. The channels in which the first carriage assembly of the second door actuator mechanism 118(2) engage may be at least partially disposed beneath a floorboard (e.g., floor) within the interior space 116 (shown in dashed lines). As such, in some instances, the first door actuator mechanism 118(1) and the second door actuator mechanism 118(2) may not include components on the exterior of the vehicle 100. This is in comparison to conventional door mechanism in which tracks or channels that are disposed on an exterior. However, as shown in FIG. 1, the vehicle 100 may not include channels or tracks on the exterior of the body 104 of the vehicle 100.

Although not shown, the second lateral side 112 may similarly include a first door and a second door (or a third door and fourth door of the vehicle 100), as well as one or more door actuator mechanisms having carriage assemblies for facilitating movement of doors on the second lateral side 112 between open and closed positions. Moreover, the second door 114(2) may include a similar travel path as the travel path 124 of the first door 114(1) via additional carriage assemblies. In some instances, the vehicle 100, or lateral sides of the vehicle 100, may include a single door. Still, the first door actuator mechanism 118(1) and the second door actuator mechanism 118(2) may find use in opening and closing doors other than on vehicles, such as, for example, a door in a commercial building, a home, a shed, and/or other structure.

In some instances, the first door actuator mechanism 118(1) and/or the second door actuator mechanism 118(2), or more generally the vehicle 100, may include emergency lever(s) that when actuated open the first door 114(1) and/or the second door 114(2). For example, if the first door 114(1) and the second door 114(2) are closed, actuation of the emergency lever(s) may cause the first door 114(1) and/or the second door 114(2) to open. Such actuation may release the latches (e.g., locks) of the vehicle 100 that maintain a closed position of the first door 114(1) and the second door 114(2). Moreover, the first door actuator mechanism 118(1) and/or the second door actuator mechanism 118(2) may be remotely controlled. Examples of providing access to a vehicle, such as in the case of emergencies, are described in for example U.S. patent application Ser. No. 17/247,231 now U.S. Pat. No. 11,682,272), which is incorporated by reference herein in its entirety and for all purposes.

Figure 2A:
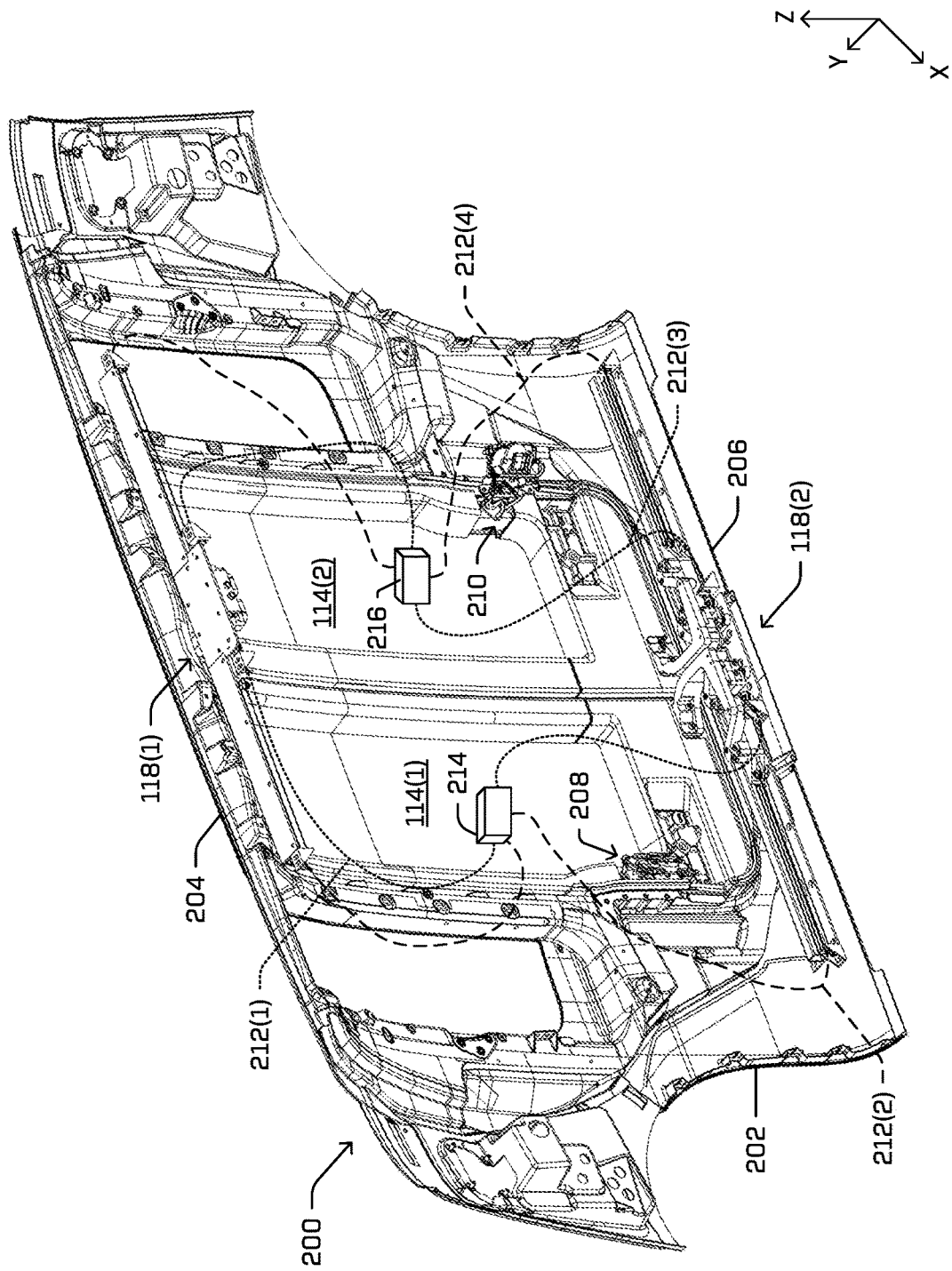
FIG. 2A is a perspective view of an example door assembly of the vehicle of FIG. 1, including the door actuator mechanisms, according to an example of the present disclosure.

FIG. 2A illustrates a door assembly 200, which in some instances, may include the first door 114(1) and the second door 114(2), as well as a frame 202 to which the first door 114(1) and the second door 114(2) couple or otherwise engage. The view shown in FIG. 2A represents an interior view of the first door 114(1) and the second door 114(2), from within the interior space 116 of the vehicle 100. The door assembly 200 may couple to a chassis or other structural element(s) of the vehicle 100, at the first lateral side 110. However, although the door assembly 200 will be described below with reference to the first door 114(1) and the second door 114(2) on the first lateral side 110, it is understood that like door assemblies including one or more doors may be coupled to the vehicle 100 at other locations (e.g., the second lateral side 112, ends of the vehicle 100, and so forth).

The first door actuator mechanism 118(1) is shown disposed proximate a top 204 of the door assembly 200, spaced vertically apart from the second door actuator mechanism 118(2) disposed proximate a bottom 206 of the door assembly 200. The top 204 of the door assembly 200 may be representative of the top 120 of the vehicle 100, and the bottom 206 of the door assembly 200 may be representative of the bottom 122 of the vehicle 100. The first door 114(1) and the second door 114(2) may each include an unsupported section, between the top and the bottom of the first door 114(1) and the second door 114(2), respectively. As such, the first door actuator mechanism 118(1) may provide a first point of contact with the first door 114(1) and the second door 114(2), respectively, at the top, and a second point of contact with the first door 114(1) and the second door 114(2), respectively, at the bottom.

As will be explained herein, the first door actuator mechanism 118(1) includes respective carriage assemblies that couple to a top of the first door 114(1) and the second door 114(2), respectively and the second door actuator mechanism 118(2) includes respective carriage assemblies that couple to a bottom of the first door 114(1) and the second door 114(2), respectively. Movement of the first door 114(1) and the second door 114(2), between the closed position (as shown in FIG. 2A) and the open position, is accomplished via respective carriage assemblies of the first door actuator mechanism 118(1) and the second door actuator mechanism 118(2). The carriage assemblies of the first door actuator mechanism 118(1) and the second door actuator mechanism 118(2) may operate in unison to open and close the first door 114(1) and the second door 114(2) at the same time. However, the first door 114(1) and the second door 114(2) may be opened individually.

The first door actuator mechanism 118(1) and the second door actuator mechanism 118(2) may generally represent rail slide mechanisms that function to open and close the first door 114(1) and the second door 114(2), respectively. As will be discussed, the carriage assemblies of the first door actuator mechanism 118(1) and the second door actuator mechanism 118(2) include wheels that engage within channels, ride on rails, and so forth during a movement of the first door 114(1) and the second door 114(2), respectively.

Within the interior space 116, the first door actuator mechanism 118(1) may be disposed within a ceiling of the interior space 116. Additionally, or alternatively, within, the second door actuator mechanism 118(2) may be disposed within a floor. Portions of the first door actuator mechanism 118(1) and the second door actuator mechanism 118(2) may be visible around an entry way into the interior space 116. The first door actuator mechanism 118(1) and the second door actuator mechanism 118(2) may therefore be at least partially concealed within the interior space 116 to provide an aesthetic appeal.

The door assembly 200 may include a first latch 208 for latching the first door 114(1) in the closed position, and a second latch 210 for locking the second door 114(2) in the closed position. The first latch 208 and the second latch 210 may respectively engage with the first door 114(1) and the second door 114(2). In some instances, the door assembly 200, or more generally the vehicle 100, may include additional latches for securing the first door 114(1) and the second door 114(2) in the closed position. For example, the first latch 208 is shown engaging with a side of first door 114(1), away from the second door 114(2) and in a direction towards the first lateral end 106 of the vehicle 100. The coupling between the first latch 208 and the first door 114(1) may provide an additional third point of contact with the first door 114(1). The three points of contact with the first door 114(1) may assist in securing the first door 114(1) in the closed state.

The second latch 210 is shown engaging with a side of the second door 114(2), away from the first door 114(1) and in a direction towards the second lateral end 108 of the vehicle 100. The coupling between the second latch 210 and the second door 114(2) may provide an additional third point of contact with the second door 114(2). The three points of contact with the second door 114(2) may assist in securing the second door 114(2) in the closed state. The three points of contact may be beneficial for providing a flush closed state when a door is closed. The three points of contact may form a plane providing more control over the orientation of the door which may otherwise pivot if only two points of contact were used.

The first latch 208 and the second latch 210 may be actuated via motors, for example. Upon arriving at a destination or in response to a request to open, the motors may actuate to disengage the first latch 208 and/or the second latch 210, thereby permitting the first door 114(1) and the second door 114(2) to respectively open. Alternatively, during transport, to secure the first door 114(1) and the second door 114(2), the motor may actuate the first latch 208 and/or the second latch 210. As such, the first latch 208 and/or the second latch 210 may represent latches that are actuated via operation of one or more actuators.

In some instances, one or more latches may be disposed proximate where the first door 114(1) and the second door 114(2) adjoin. Additionally, or alternatively, passive latches (e.g., biasing members, gas cylinders, etc.) may secure the first door 114(1) and the second door 114(2), inward, towards the vehicle 100, to assist in keeping the first door 114(1) and the second door 114(2) closed. Moreover, the vehicle 100 or the door assembly 200 may include emergency mechanism (e.g., button, lever, etc.) for unlocking the first door 114(1) and/or the second door 114(2) in case of emergencies.

Movement of the first door 114(1) and/or the second door 114(3) may be automated, or controlled via one or more computing device(s) onboard the vehicle 100. For example, a passenger may press a button. Control may additionally or alternatively be controlled via one or more remote computing device(s). For example, upon arriving at a destination location, the first door 114(1) and/or the second door 114(2) may be automatically opened.

FIG. 2A further illustrates cables routed within the interior space 116 and/or the door assembly 200 to effectuate opening and closing of the first door 114(1) and the second door 114(2). As shown, a first cable 212(1) may route between the first door actuator mechanism 118(1) and the second door actuator mechanism 118(2). The first cable 212(1) may also route through a first hub 214, which may include motors and spools about which the first cable 212(1) winds. In some instances, the first cable 212(1) may correspond to a closing cable, such that when pulled, closes the first door 114(1). For example, actuating a motor within the first hub 214 in a first direction (e.g., clockwise), may pull on the first cable 212(1) to close the first door 114(1).

A second cable 212(2) is further shown routed between the first door actuator mechanism 118(1) and the second door actuator mechanism 118(2). The second cable 212(2) may also route through the first hub 214, which may include motors and spools about which the second cable 212(2) winds. In some instances, the second cable 212(2) may correspond to an opening cable, such that when pulled, opens the first door 114(1). For example, actuating the motor within the first hub 214 in a second direction (e.g., counterclockwise), may pull on the second cable 212(2) to open the first door 114(1).

During a pulling of the first cable 212(1) and the second cable 212(2), respectively, another of the first cable 212(1) or the second cable 212(2) may provide slack. For example, when the second cable 212(2) is pulled via the rotation of the motor, the first cable 212(1) may provide slack. To accomplish such, the first cable 212(1) may be wound about a first spool within the first hub 214, and the second cable 212(2) may be wound about a second spool within the first hub 214. The first spool and the second spool may be coupled to one another, for example, via a clutch, such that rotation of the first spool in a first direction to wind the first cable 212(1) results in an opposite rotation of the second spool to unwind the second cable 212(2).

Additionally, a third cable 212(3) may route between the first door actuator mechanism 118(1) and the second door actuator mechanism 118(2). The third cable 212(3) may also route through a second hub 216, which may include motors and spools about which the third cable 212(3) winds. In some instances, the third cable 212(3) may correspond to a closing cable, such that when pulled, closes the second door 114(2). For example, actuating a motor within the second hub 216 in a first direction (e.g., clockwise), may pull on the third cable 212(3) to close the second door 114(2).

A fourth cable 212(4) is further shown routed between the first door actuator mechanism 118(1) and the second door actuator mechanism 118(2). The fourth cable 212(4) may also route through the second hub 216, which may include motors and spools about which the fourth cable 212(4) winds. In some instances, the fourth cable 212(4) may correspond to an opening cable, such that when pulled, opens the second door 114(2). For example, actuating the motor within the second hub 216 in a second direction (e.g., counterclockwise), may pull on the fourth cable 212(4) to open the second door 114(2).

During a pulling of the third cable 212(3) and the fourth cable 212(4), respectively, another of the third cable 212(3) and the fourth cable 212(4) may provide slack. For example, when the fourth cable 212(4) is pulled via the rotation of the motor, the third cable 212(3) may provide slack. To accomplish such, the third cable 212(3) may be wound about a first spool within the second hub 216, and the fourth cable 212(4) may be wound about a second spool within the second hub 216. The first spool and the second spool may be coupled to one another, for example, via a clutch, such that rotation of the first spool in a first direction to wind the third cable 212(3) results in an opposite rotation of the second spool to unwind the fourth cable 212(4).

In some instances, the motor(s) within the first hub 214 and the motor(s) with the second hub 216 may operate in unison such that the first door 114(1) and the second door 114(2) open in unison. Although not shown, the first cable 212(1), the second cable 212(2), the third cable 212(3), and/or the fourth cable 212(4) may route around pulleys (e.g., idler, fixed, guide, etc.), within conduits, and so forth, between the first door actuator mechanism 118(1) and the second door actuator mechanism 118(2). Additionally, the first hub 214 and the second hub 216 may be located within and/or on the door assembly 200 differently than shown, and/or first cable 212(1), the second cable 212(2), the third cable 212(3), and/or the fourth cable 212(4) may be routed differently than shown.

Figure 2B:
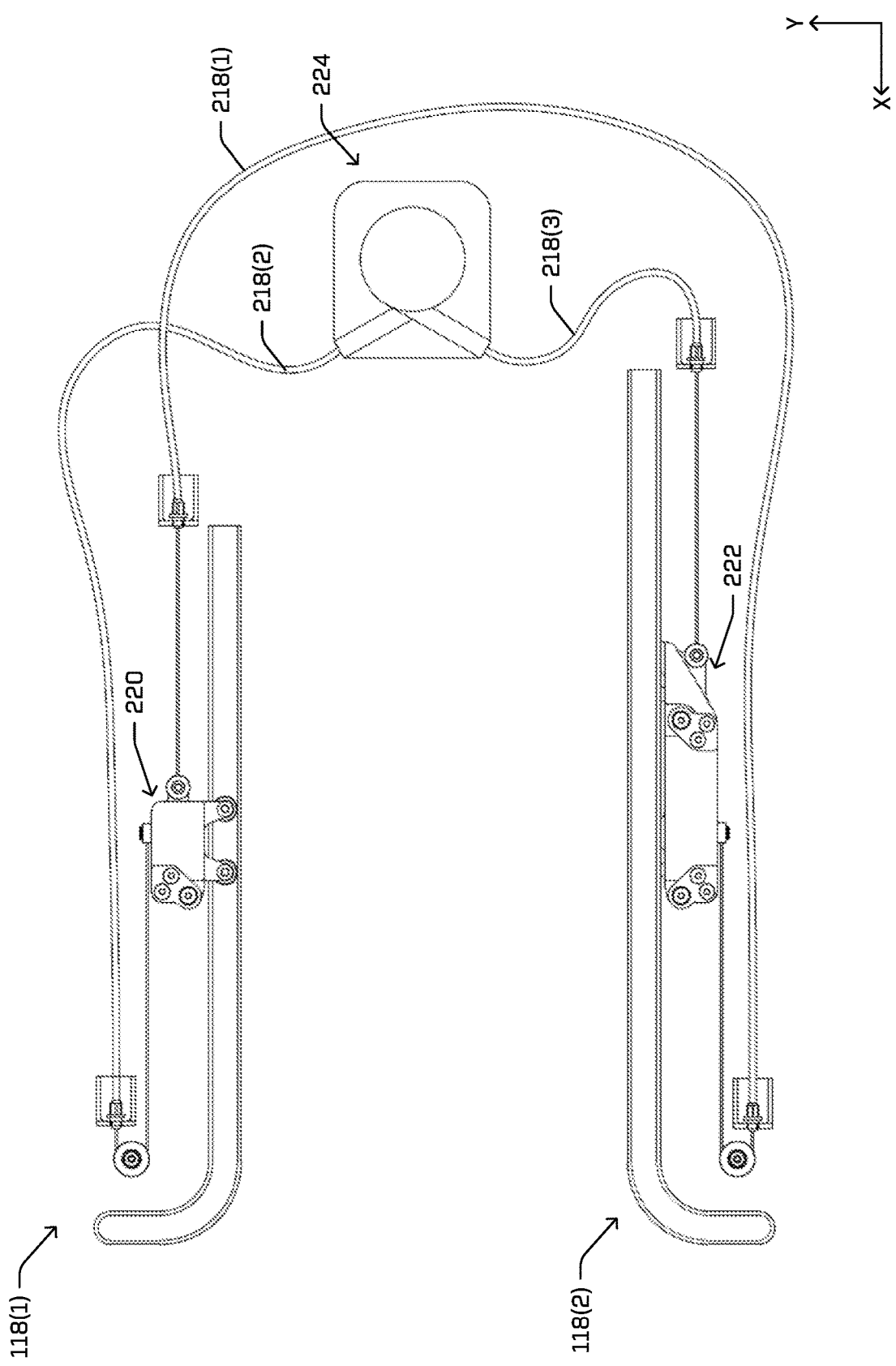
FIG. 2B is a simplified view of an example door assembly of the vehicle of FIG. 1, including the door actuator mechanisms, according to an example of the present disclosure.

FIG. 2B illustrates an alternative routing of cables for opening and closing doors of the vehicle 100, such as the first door 114(1) and the second door 114(2). FIG. 2B illustrates a simplified and partial view of the first door actuator mechanism 118(1) and the second door actuator mechanism 118(2). However, it is to be understood that the components illustrated in FIG. 2B may couple to, or be components of, the door assembly 200 as discussed above with regard to FIG. 2A.

Compared to FIG. 2A, FIG. 2B illustrates that continuous cables may be routed between a carriage assembly of the first door actuator mechanism 118(1) and a carriage assembly of the second door actuator mechanism 118(2). That is, in FIG. 2A, separate cables may be coupled to the carriage assemblies for opening and closing the first door 114(1) and the second door 114(2) (depending on the cable being pulled). In FIG. 2B, a first cable 218(1) is shown coupled between a carriage 220 of a carriage assembly of the first door actuator mechanism 118(1) and a carriage 222 of a carriage assembly of the second door actuator mechanism 118(2). As illustrated, the first cable 218(1) may couple to an end of the carriage 220 and a side of the carriage 222. The first cable 218(1) may also route around one or more pulleys and/or through brackets.

A second cable 218(2) is shown coupled to the carriage 220, at a side that is different than where the first cable 218(1) couples to the carriage 220. Additionally, the second cable 218(2) couples to a cable actuator 224. For example, the second cable 218(2) may spool about a drum, hub, or rotor of the cable actuator 224. A third cable 218(3) is shown coupled to the carriage 222, at a side that is different than where the first cable 218(1) couples to the carriage 222. The third cable 218(3) couples to the cable actuator 224 as well.

For example, the third cable 218(3) may spool about a drum, hub, or rotor of the cable actuator 224. In some instances, the second cable 218(2) may spool about a first drum of the cable actuator 224, while the third cable 218(3) may spool about a second drum of the cable actuator 224. Actuating the cable actuator 224 in a first direction (e.g., clockwise rotation) causes the first door 114(1) and the second door 114(2) to open. For example, the clockwise rotation may wound the third cable 218(3), advancing the carriage 222 in the X-direction to open the second door 114(2) (e.g., via pulling on the end of the carriage 222). At the same time, winding the third cable 218(3) causes the carriage 222 to pull on the first cable 218(1). This pulling force advances the carriage 220 in the X-direction to open the second door 114(2). Additionally, the second cable 218(2) may unwind from the cable actuator 224 to provide slack and permit the second door 114(2) to open.

Conversely, the counterclockwise rotation of the cable actuator 224 pulls the carriage 220 in an opposite direction (via the coupling to the side). The pulling force on the carriage 220 is imparted to the carriage 222 via the first cable 218(1). During this time, the third cable 218(3) may unwind from the cable actuator 224 to provide slack and permit the second door 114(2) to close.

FIG. 2B illustrates additional components of the first door actuator mechanism 118(1) and the second door actuator mechanism 118(2), which will be discussed in detail herein.

Figure 3A:
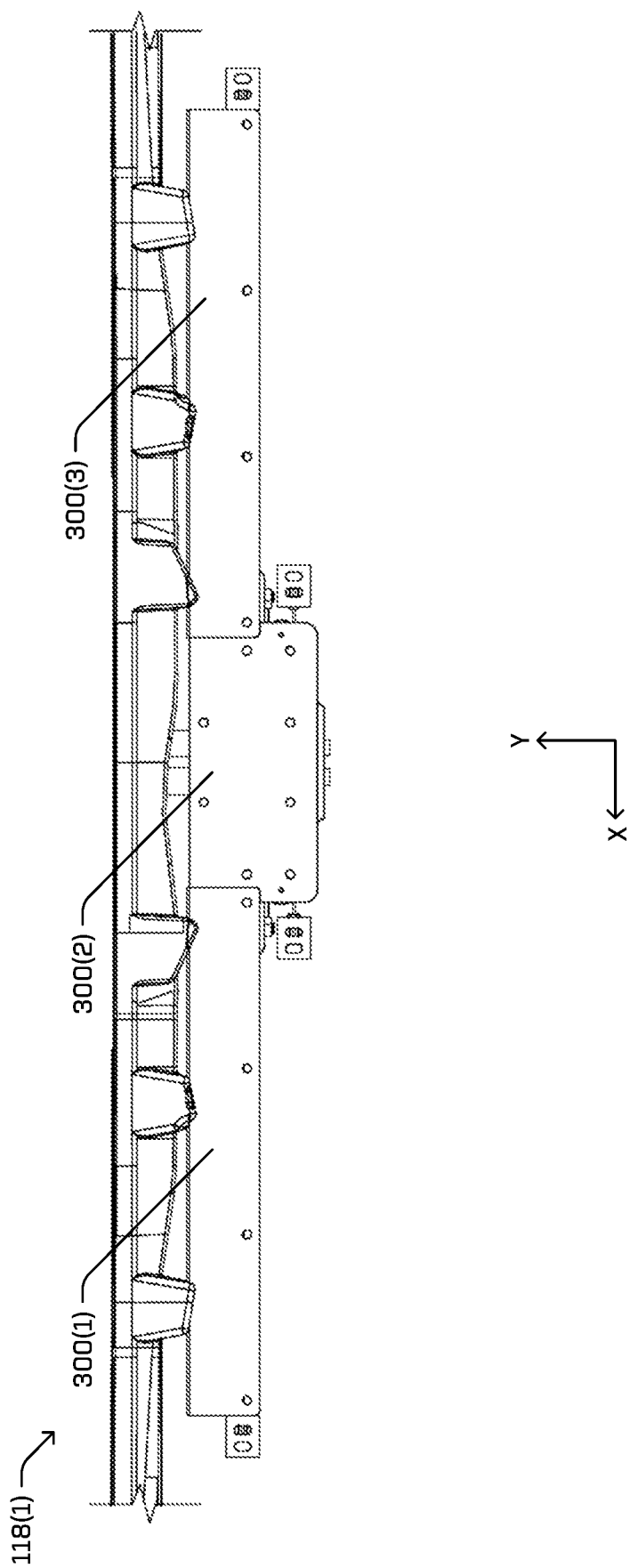
FIG. 3A is a first view of an example first door actuator mechanism for opening and closing door(s) of the vehicle of FIG. 1, according to an example of the present disclosure.

FIG. 3A illustrates a first view of the first door actuator mechanism 118(1). In some instances, the view shown in FIG. 3A represents a top view of the first door actuator mechanism 118(1).

The first door actuator mechanism 118(1) includes one or more structures, frames, or plates to which components of the first door actuator mechanism 118(1) couple and/or engage. For example, as will be described herein, a first plate 300(1) of the first door actuator mechanism 118(1) may provide or include a portion of a first channel within which a first carriage assembly of the first door actuator mechanism 118(1) traverses. A second plate 300(2) of the first door actuator mechanism 118(1) may provide or include an additional portion of the first channel within which the first carriage assembly traverses. Additionally, a third plate 300(3) of the first door actuator mechanism 118(1) may provide or include a portion of a second channel within which a second carriage assembly of the first door actuator mechanism 118(1) traverses. The second plate 300(2) may provide or include an additional portion of the second channel within which the second carriage assembly traverses.

However, although the first plate 300(1), the second plate 300(2), and the third plate 300(3) are shown as separate components, in some instances, the first plate 300(1), the second plate 300(2), and/or the third plate 300(3) may represent a single component (e.g., a single unibody plate). Moreover, other structures, channels, frames, and so forth may couple to the first plate 300(1), the second plate 300(2), and/or the third plate 300(3) for providing at least a portion of the first channel and/or the second channel. Additionally, in some instances, the first plate 300(1), the second plate 300(2), and/or the third plate 300(3) may be omitted and the channels of the first door actuator mechanism 118(1) may couple to other frames, structures, etc. of the vehicle 100.

Figure 3B:
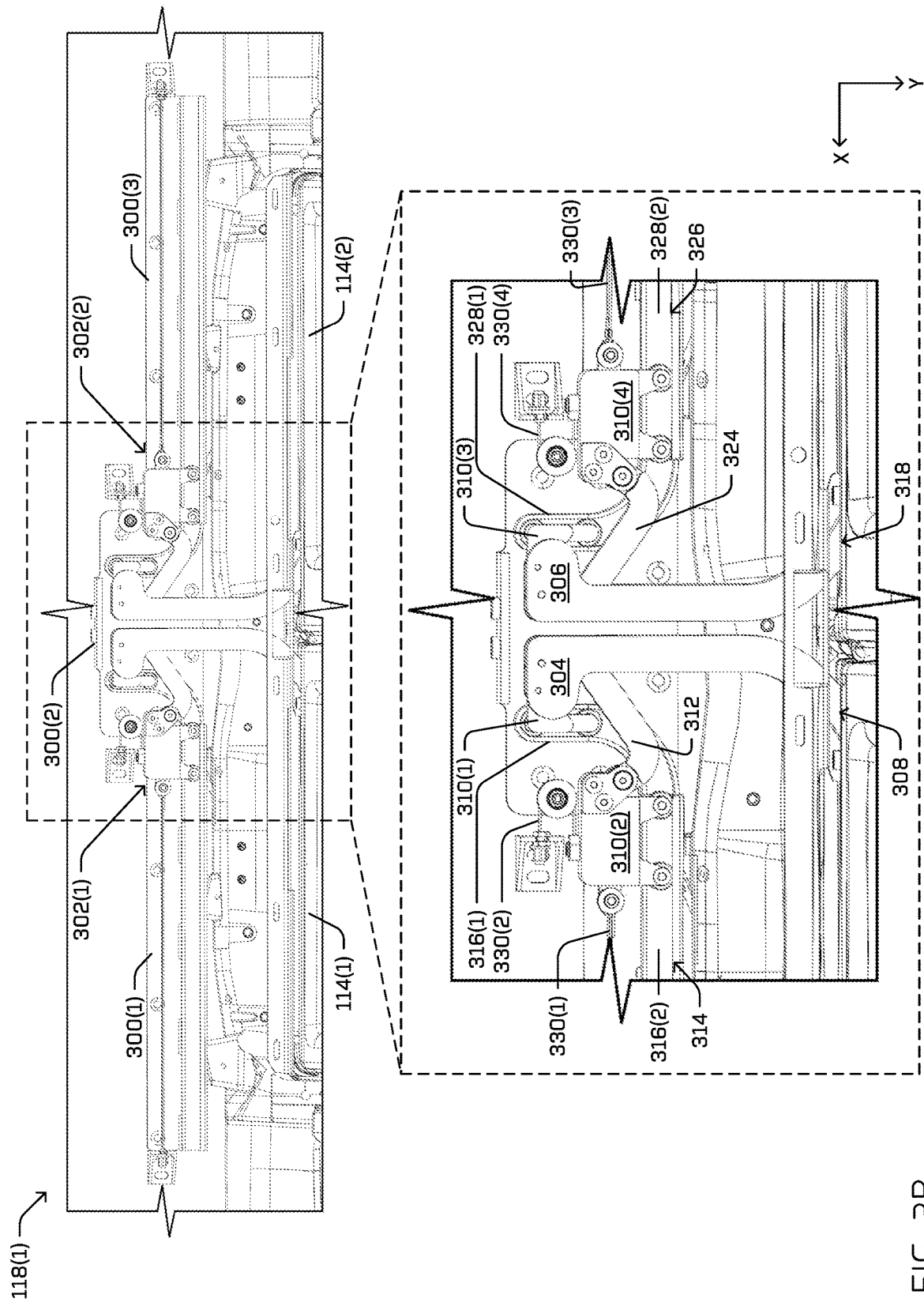
FIG. 3B is a second view of the first door actuator mechanism for opening and closing door(s) of the vehicle of FIG. 1, according to an example of the present disclosure.

FIG. 3B illustrates a second view of the first door actuator mechanism 118(1). In some instances, the view shown in FIG. 3B represents a bottom view of the first door actuator mechanism 118(1). In FIG. 3B, a detailed view of the first door actuator mechanism 118(1) is shown to better illustrate components of the first door actuator mechanism 118(1).

The first door actuator mechanism 118(1) is shown including a first carriage assembly 302(1) and a second carriage assembly 302(2). The first carriage assembly 302(1) couples to the first door 114(1) for opening and closing the first door 114(1), and the second carriage assembly 302(2) couples to the second door 114(2) for opening and closing the second door 114(2). As will be explained later, the second door actuator mechanism 118(2) may also operate to open the first door 114(1) and the second door 114(2) in unison with the first door actuator mechanism 118(1).

In some instances, the first carriage assembly 302(1) couples to the first door 114(1) via a first bracket 304, while the second carriage assembly 302(2) couples to the second door 114(2) via a second bracket 306. For example, the first bracket 304 may include a first end 308 that couples to the first door 114(1) and a body that extends away from the first door 114(1) (Y-direction) which couples to other components of the first carriage assembly 302. The first carriage assembly 302(1) includes a first carriage 310(1) and a second carriage 310(2). The first carriage 310(1) and the second carriage 310(2) couple to the first bracket 304, whether directly or indirectly. For example, the first carriage 310(1) may couple to the first bracket 304, at a second end of the first bracket 304. In some instances, the first bracket 304 may include a flange at the second end at which the first carriage 310(1) couples. As explained herein, the coupling between the first carriage 310(1) and the first bracket 304 may be pivotable such that the first carriage 310(1) is permitted to traverse a travel path during opening and closing of the first door 114(1).

The second carriage 310(2) may couple to the first bracket 304 via a first link 312. As illustrated, the first link 312 may couple to the first bracket 304 and the second carriage 310(2). The coupling between the second carriage 310(2) and the first link 312 may be pivotable such that the second carriage 310(2) is permitted to traverse the travel path during opening and closing of the first door 114(1).

As introduced above in FIG. 3A, the first plate 300(1) and the second plate 300(2) provide and/or include a channel in which the first carriage assembly 302 engage. For example, the first carriage 310(1) and the second carriage 310(2) may include wheels that traverse channels (or portions thereof) in the first plate 300(1) and the second plate 300(2). In some instances, the first plate 300(1) and the second plate 300(2) form, or include parts of, a first channel 314. In some instances, the first channel 314 may have a first portion 316(1) and a second portion 316(2). The second plate 300(2) may include or form the first portion 316(1) and the first plate 300(1) may form or include the second portion 316(2). In some instances, the first portion 316(1) may represent a trough or groove defined by, or formed within, the second plate 300(2). The second portion 316(2) may represent a U-shaped channel or C-shaped channel coupled to the first plate 300(1) (e.g., extruded piece of material).

The first channel 314 defines a first travel path of the first door 114(1). Respective wheels of the first carriage 310(1) and the second carriage 310(2) may traverse the first channel 314. In some instances, and as shown in the closed position of the first door 114(1) in FIG. 3B, the first carriage 310(1) is configured to traverse the first portion 316(1) of the first channel 314 and the second portion 316(2) of the first channel 314 during and opening of the first door 114(1). The second carriage 310(2) is configured to traverse the second portion 316(2) of the first channel 314 during an opening of the first door 114(1). The pivotable coupling between the first carriage 310(1) and the first bracket 304, as well as the pivotable coupling between the first bracket 304, the second carriage 310(2), and the first link 312 permit the first carriage 310(1) and the second carriage 310(2) to traverse the first channel 314 (e.g., during curvature of the travel path 124).

Similarly, the second bracket 306 may include a first end 318 that couples to the second door 114(2) and a body that extends away from the second door 114(2) (Y-direction) which couples to the second carriage assembly 302(2). The second carriage assembly 302(2) includes a third carriage 310(3) and a fourth carriage 310(4). In some instances, the third carriage 310(3) and the fourth carriage 310(4) couple to the second bracket 306, whether directly or indirectly. For example, the third carriage 310(3) may couple to the second bracket 306, at a second end of the second bracket 306. The second bracket 306 may include a flange at the second end at which the third carriage 310(3) couples. The coupling between the third carriage 310(3) and the second bracket 306 may be pivotable such that the third carriage 310(3) is permitted to traverse a travel path during opening and closing of the second door 114(2). The fourth carriage 310(4) may couple to the second bracket 306 via a second link 324. As illustrated, the second link 324 may couple to the second bracket 306 and the fourth carriage 310(4). The coupling between the fourth carriage 310(4) and the second link 324 may be pivotable such that the fourth carriage 310(4) is permitted to traverse a travel path during opening and closing of the second door 114(2).

As introduced above in FIG. 3A, the second plate 300(2) and the third plate 300(3) provide and/or include a channel in which the second carriage assembly 302(s) engages. For example, the third carriage 310(3) and the fourth carriage 310(4) may include wheels that traverse channels, or parts of a channel, in the second plate 300(2) and the third plate 300(3). In some instances, the second plate 300(2) and the third plate 300(3) include a second channel 326 having a first portion 328(1) and a second portion 328(2). The second plate 300(2) may include or form the first portion 328(1), and the third plate 300(3) may include or form the second portion 328(2).

The first portion 328(1) may represent a trough or groove defined by, or formed within, the second plate 300(2). In some instances, the second portion 328(2) may represent a U-shaped channel or C-shaped channel coupled to the third plate 300(3) (e.g., extruded piece of material). The second channel 326 defines a second travel path of the second door 114(2). Respective wheels of the third carriage 310(3) and the fourth carriage 310(4) may traverse the second channel 326. In some instances, and as shown in the closed position of the second door 114(2), the third carriage 310(3) is configured to traverse the first portion 328(1) of the second channel 326 and the second portion 328(2) of the second channel 326 during and opening of the second door 114(2). The fourth carriage 310(4) is configured to traverse the second portion 328(2) of the second channel 326 during an opening of the second door 114(2). The pivotable coupling between the third carriage 310(3) and the second bracket 306, as well as the pivotable coupling between the second bracket 306, the fourth carriage 310(4), and the second link 324 permit the third carriage 310(3) and the fourth carriage 310(4) to traverse the second channel 326 (e.g., during curvature of the travel path).

The first door actuator mechanism 118(1) includes components for respectively actuating the first door 114(1) and the second door (2) between open and closed positions. In some instances, the first door actuator mechanism 118(1) may include separate components coupled to the first carriage assembly 302(1) and the second carriage assembly 302(2) for respectively opening and closing the first door 114(1) and the second door 114(2). For example, a first cable 330(1) and a second cable 330(2) are shown connected to the second carriage 310(2) of the first carriage assembly 302(1). In some instances, the first cable 330(1) may represent an opening cable that when pulled, opens the first door 114(1). The second cable 330(2) may represent a closing cable that when pulled, closes the first door 114(1). An end of the first cable 330(1) and the second cable 330(2) not coupled to the second carriage 310(2) may couple to a motor. During opening of the first door 114(1), for example, the motor may actuate (e.g., rotate) to pull on the first cable 330(1). Here, the first cable 330(1) may spool about a drum. Additionally, the second cable 330(2) may provide slack (e.g., unspool) to permit the first cable 330(1) to be pulled. In some instances, the first cable 330(1) may represent a first portion of the second cable 212(2) that couples to the second carriage 310(2), and the second cable 330(2) may represent a first portion of the first cable 212(1) coupled to the second carriage 310(2), as discussed above with regard to FIG. 2A.

Pulling on the first cable 330(1) correspondingly pulls on the second carriage 310(2). From the position of the second carriage 310(2) shown in FIG. 3B, when the second carriage 310(2) is pulled via the first cable 330(1), the second carriage 310(2) traverses in a first direction (X-direction). At the same time, the second carriage 310(2) imparts a pulling force to the first bracket 304 via the first link 312. This pulling force directs the first carriage 310(1) in a second direction (Y-direction, and outward away from the interior space 116). As such, movement in the second direction moves the first door 114(1) away from the vehicle 100 such that the first door 114(1) may open.

Moreover, during opening of the first door 114(1), movement in the first direction causes the second carriage 310(2) to traverse along the second portion 316(2) of the first channel 314 and the first carriage 310(1) to traverse along the first portion 316(1) of the first channel 314. In turn, and during a continued pulling of the first cable 330(1), the first carriage 310(1) transitions to traverse along the second portion 316(2). During this instance, the first carriage 310(1) and the second carriage 310(2) traverse substantially in the first direction. The first direction may be substantially parallel to the longitudinal axis 130 of the vehicle 100.

Conversely, during a closing of the first door 114(1), the second cable 330(2) may be pulled to pull the second carriage 310(2) in a third direction (opposite the first direction, opposite X-direction). Here, the second cable 330(2) may couple to a motor, whether an additional or similar motor to which the first cable 330(1) couples. During rotation of the motor, the second cable 330(2) spools. In turn, the first carriage 310(1) and the second carriage 310(2) traverse along the second portion 316(2) of the first channel 314. During a continued pulling of the second carriage 310(2) via the second cable 330(2), the first carriage 310(1) transitions to traverse the first portion 316(1), while the second carriage 310(2) traverses along the second portion 316(2). As the first carriage 310(1) traverses the first portion 316(1), the first door 114(1) moves in a fourth direction (opposite the second direction, opposite Y-direction, inward toward the interior space 116). The first carriage 310(1) then comes into contact with an end of the first channel 314 and is halted from traveling farther in the fourth direction. Here, the first door 114(1) is in the closed position. To effectuate opening and closing of the first door 114(1), in some instances, the first cable 330(1) and the second cable 330(2) may be fed through and/or routed around one or more pulleys.

The first door actuator mechanism 118(1) further includes components for opening and closing the second door 114(2). For example, a third cable 330(3) and a fourth cable 330(4) are shown coupled to the fourth carriage 310(4) of the second carriage assembly 302(2). In some instances, the third cable 330(3) may represent an opening cable that when pulled, opens the second door 114(2). The fourth cable 330(4) may represent a closing cable that when pulled, closes the second door 114(2). An end of the third cable 330(3) and the fourth cable 330(4) not coupled to the fourth carriage 310(4) may couple to a motor. During opening of the second door 114(2), for example, the motor may actuate to pull on the third cable 330(3). Here, the third cable 330(3) may spool. Additionally, the fourth cable 330(4) may provide slack (e.g., unspool) to permit the third cable 330(3) to be pulled. In some instances, the third cable 330(3) may represent a first portion of the fourth cable 212(4) that couples to the fourth carriage 310(4), and the fourth cable 330(4) may represent a first portion of the third cable 212(3) coupled to the fourth carriage 310(4), as discussed above with regard to FIG. 2A. Alternatively, in some instances, the third cable 330(3) may represent a first portion of the first cable 218(1) that couples to the fourth carriage 310(4) (the carriage 220), and the fourth cable 330(4) may represent a portion of the second cable 218(2) coupled to the fourth carriage 310(4) (the carriage 222), as discussed above with regard to FIG. 2B.

Pulling on the third cable 330(3) correspondingly pulls on the fourth carriage 310(4). From the position of the fourth carriage 310(4) shown in FIG. 3B, when the fourth carriage 310(4) is pulled via the third cable 330(3), the fourth carriage 310(4) traverses in the third direction (opposite X-direction). At the same time, the fourth carriage 310(4) imparts a pulling force to the second bracket 306 via the second link 324. This pulling force directs the third carriage 310(3) in the second direction (Y-direction, outward from the interior space 116). As such, movement in the second direction moves the second door 114(2) away from the vehicle 100 such that the second door 114(2) may open.

Moreover, during opening of the second door 114(2), movement in the third direction causes the fourth carriage 310(4) to traverse along the second portion 328(2) of the second channel 326 and the third carriage 310(3) to traverse along the first portion 328(1) of the second channel 326. In turn, and during a continued pulling of the third cable 330(3), the third carriage 310(3) transitions to traverse along the second portion 328(2). During this instance, the third carriage 310(3) and the fourth carriage 310(4) traverse substantially in the third direction.

Conversely, during a closing of the second door 114(2), the fourth cable 330(4) may be pulled to pull the fourth carriage 310(4) in first direction (X-direction). Here, the fourth cable 330(4) may couple to a motor, whether an additional or similar motor to which the third cable 330(3) couples. During movement of the motor, the fourth cable 330(4) spools. In turn, the third carriage 310(3) and the fourth carriage 310(4) traverse along the second portion 328(2) of the second channel 326. During a continued pulling force of the fourth carriage 310(4) via the fourth cable 330(4), the third carriage 310(3) traverses the first portion 328(1), while the fourth carriage 310(4) moves along the second portion 328(2). As the third carriage 310(3) traverses the first portion 328(1), the second door 114(2) moves in the fourth direction. The third carriage 310(3) then comes into contact with an end of the second channel 326 and is halted from traveling farther in the fourth direction. Here, the second door 114(2) is in the closed position. To effectuate opening and closing of the second door 114(2), in some instances, the third cable 330(3) and the fourth cable 330(4) may be fed through and/or routed around one or more pulleys.

Furthermore, in some instances, the first cable 330(1), the second cable 330(2), the third cable 330(3), and the fourth cable 330(4) may route through one or more supports. Such supports may couple the first cable 330(1), the second cable 330(2), the third cable 330(3), and the fourth cable 330(4) to the vehicle 100 (or a body/frame of the vehicle). One or more tensioners may couple the first cable 330(1), the second cable 330(2), the third cable 330(3), and the fourth cable 330(4) to the supports for adjusting slack in the first cable 330(1), the second cable 330(2), the third cable 330(3), and the fourth cable 330(4).

Although the first carriage assembly 302(1) and the second carriage assembly 302(2) are shown and described as including cables for opening and closing the first door 114(1) and the second door 114(2), respectively, other mechanisms may be used. For example, a first actuator may couple to the second carriage 310(2) and a second actuator may couple to the fourth carriage 310(4). Actuating the first actuator in a first direction (e.g., retraction) may pull on the second carriage 310(2) such that the first carriage assembly 302(1) traverses the first channel 314 to the open position. Actuating the first actuator in a second direction (e.g., extension) may push on the second carriage 310(2) such that the first carriage assembly 302(1) traverses the first channel 314 to the closed position. The second actuator may similarly couple to the fourth carriage 310(4) and actuate in respective directions to open and close the second door 114(2). Such actuators may represent linear actuators and may be pneumatic or hydraulic. Additionally, screw drives, piston-type drives, and/or other actuators may be used. Direct current (DC) motors, coupled to spools, barrels, and the like may also be used.

Although the first door actuator mechanism 118(1) is shown and described as including the first carriage assembly 302(1) and the second carriage assembly 302(2), such components may be distinct and separate. For example, the first door actuator mechanism 118(1) may only include one of the first carriage assembly 302(1), as well as components for actuating the first carriage assembly 302(1) to open and close the first door 114(1). In such instances, a separate actuator mechanism may include the second carriage assembly 302(2) for opening and closing the second door 114(2). As such, separate and distinct door actuator mechanism(s) may be included for the first door 114(1) and second door 114(2).

Figure 3C:
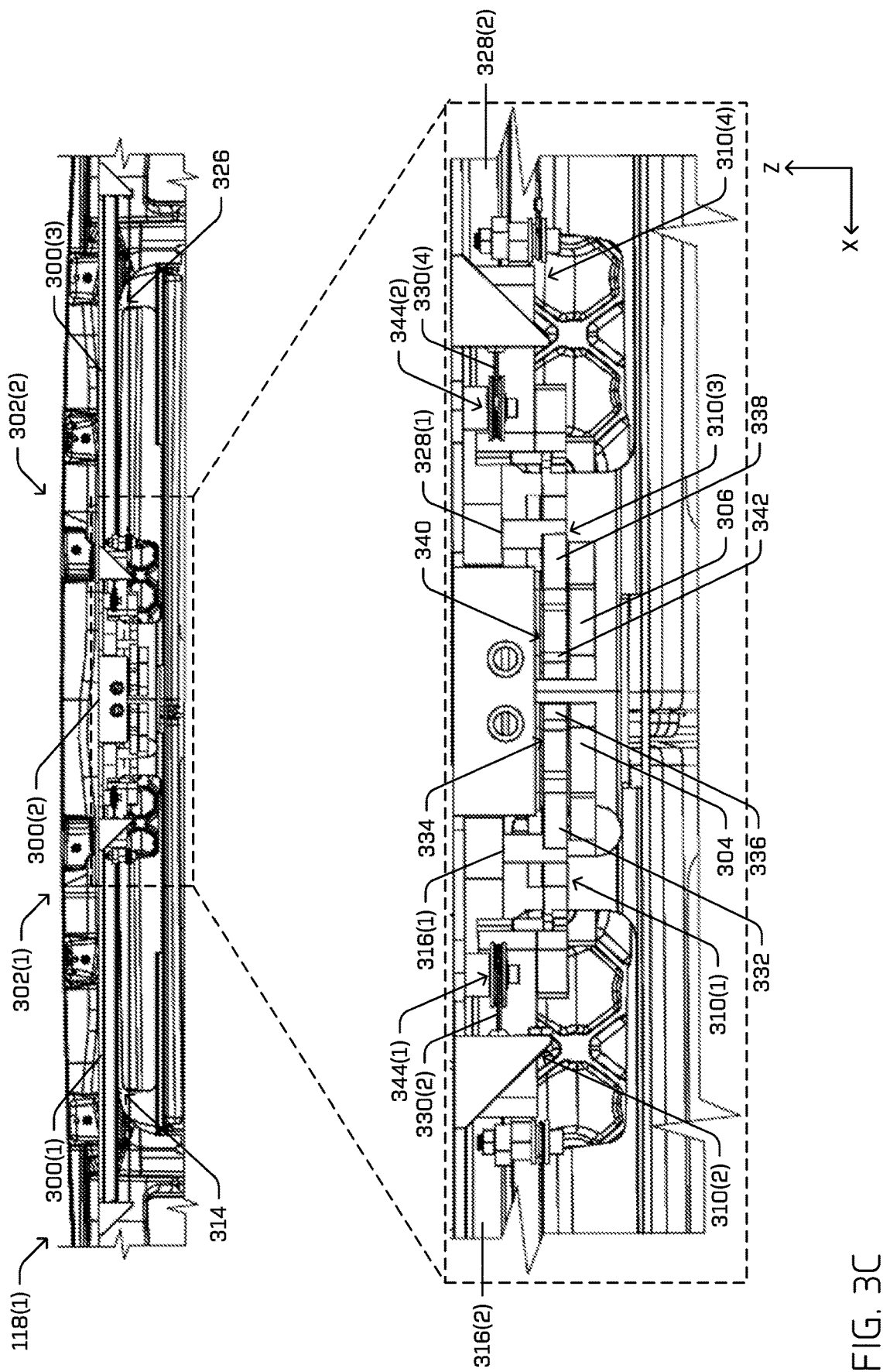
FIG. 3C is a third view of the first door actuator mechanism for opening and closing door(s) of the vehicle of FIG. 1, according to an example of the present disclosure.

FIG. 3C illustrates a third view of the first door actuator mechanism 118(1). In some instances, the view shown in FIG. 3C may represent a front view of the first door actuator mechanism 118(1). In FIG. 3C, a detailed view of the first door actuator mechanism 118(1) is shown to further illustrate components of the first door actuator mechanism 118(1).

The first plate 300(1), the second plate 300(2), and/or the third plate 300(3) include the first channel 314 and the second channel 326 within which the first carriage assembly 302(1) and the second carriage assembly 302(2) engage, respectively. For example, the first plate 300(1) includes a length (X-direction) for the second portion 316(2) of the first channel 314, and the third plate 300(3) includes a length (X-direction) of the second channel 326. The second plate 300(2) defines the first portion 316(1) of the first channel 314 and the first portion 328(1) of the second channel 326.

The first carriage 310(1) includes wheels that engage with the first portion 316(1) and the second portion 316(2) of the first channel 314. Additionally, the second carriage 310(2) includes wheels that engage with the second portion 316(2) of the first channel 314. Similarly, the third carriage 310(3) includes wheels that engage with the first portion 328(1) and the second portion 328(2) of the second channel 326. Additionally, the fourth carriage 310(4) includes wheels that engage with the second portion 328(2) of the second channel 326.

The first carriage 310(1) is shown being coupled to the first bracket 304. The first carriage 310(1) pivotably couples (e.g., hinged, bearing, etc.) to the first bracket 304 such that the first carriage 310(1) may pivot relative to the first bracket 304 as the first door 114(1) opens and closes. In some instances, the first carriage 310(1) includes a first flange 332 that is disposed within a first slot 334 of the first bracket 304. In other words, the first flange 332 may reside within the first slot 334 defined by the first bracket 304. Additionally, the first link 312 is shown coupled to the first bracket 304, at a location within the first slot 334. For example, the first link 312 may include a first end 336 coupled within the first slot 334. Such coupling may be pivotable. It is to be understood that the couplings between the first carriage 310(1), the first link 312, and the first flange 332 may include sufficient tolerance to permit respective ends of the first carriage 310(1) and the first link 312 to pivot.

The third carriage 310(3) is shown being coupled to the second bracket 306. The third carriage 310(3) pivotably couples (e.g., hinged, bearing, etc.) to the second bracket 306 such that the third carriage 310(3) may pivot relative to the second bracket 306 as the second door 114(2) opens and closes. In some instances, the third carriage 310(3) includes a second flange 338 that is disposed within a second slot 340 of the second bracket 306. In other words, the second flange 338 may reside within the second slot 340 defined by the second bracket 306. Additionally, the second link 324 is shown coupled to the second bracket 306, at a location within the second slot 340. For example, the second link 324 may include a first end 342 coupled within the second slot 340. Such coupling may be pivotable. It is to be understood that the couplings between the third carriage 310(3), the second link 324, and the second flange 338 may include sufficient tolerance to permit respective ends of the third carriage 310(3) and the second link 324 to pivot.

As introduced above, cables of the first carriage assembly 302(1) and the second carriage assembly 302(2) may wrap around one or more pulleys. For example, the second cable 330(2) may wrap around a first pulley 344(1) for providing a pulling force on the second carriage 310(2) in the third direction. The fourth cable 330(4) may wrap around a second pulley 344(2) for providing a pulling force on the fourth carriage 310(4) in the first direction. In some instances, the first pulley 344(1) and the second pulley 344(2) may couple to the second plate 300(2).

FIG. 3D illustrates a fourth view of the first door actuator mechanism 118(1). The view shown in FIG. 3D represents an end view of the first door actuator mechanism 118(1), showing components of the second carriage assembly 302(2). However, although the view shown in FIG. 3D and the discussion below relates to the second carriage assembly 302(2), the first carriage assembly 302(1) may include similar components and function similarly.

The second bracket 306 is shown extending from the second door 114(2) and coupling to the third carriage 310(3) and the fourth carriage 310(4). Additionally, as will be discussed herein in detail, the fourth carriage 310(4)

includes wheels that reside within the second channel 326. For example, the end view in FIG. 3D illustrates that the second channel 326 includes the second portion 328(2) within which wheels of the fourth carriage 310(4) engage. The second portion 328(2) of the second channel 326 may include a U-shaped structure, and within sidewalls of the second portion 328(2), the wheels of the fourth carriage 310(4) may reside.

Supports 346 are also shown, through which the third cable 330(3) and the fourth cable 330(4) may route, respectively. The supports 346 may serve to align the third cable 330(3) and the fourth cable 330(4), and may provide structure for tensioning the third cable 330(3) and the fourth cable 330(4).

Figure 4:
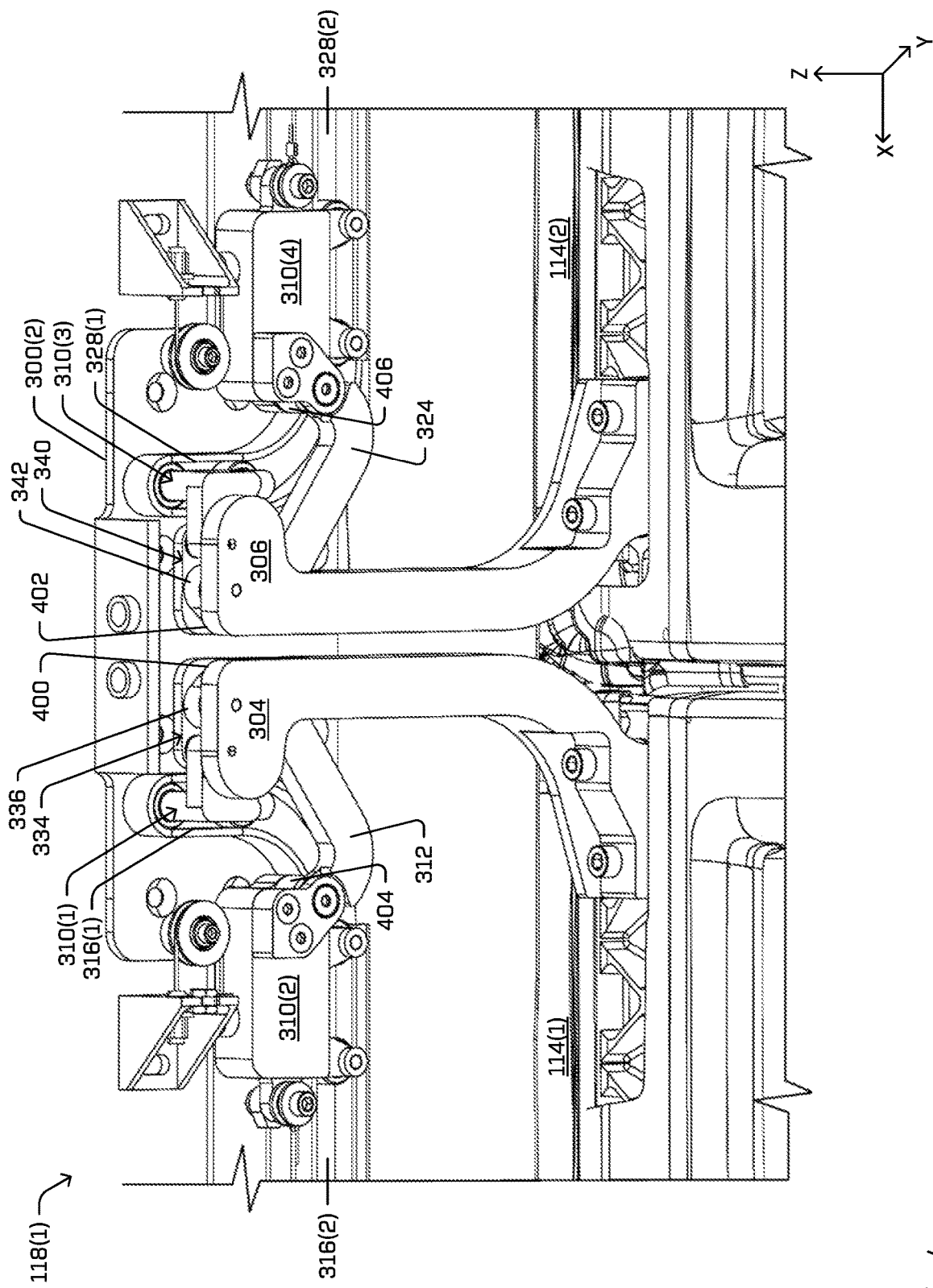
FIG. 4 is a detailed view of the first door actuator mechanism, showing components for opening and closing door(s) of the vehicle of FIG. 1, according to an example of the present disclosure.

FIG. 4 illustrates a perspective view of the first door actuator mechanism 118(1). The second plate 300(2) provides for the first portion 316(1) of the first channel 314 and the first portion 328(1) of the second channel 326. The first portion 316(1) and the first portion 328(1) may include respective sidewalls within which wheels of the first carriage 310(1) and the third carriage 310(3) reside. As also illustrated, the first portion 316(1) and the first portion 328(1) may respectively curve to communicatively couple to the second portion 316(2) of the first channel 314 and the second portion 328(2) of the second channel 326.

The first carriage 310(1) is shown coupled to a second end 400 of the first bracket 304, and the third carriage 310(3) is shown coupled to a second end 402 of the second bracket 306. Such couplings may respectively be within the first slot 334 and the second slot 340. Additionally, the first link 312 includes the first end 336 coupled to the first bracket 304 and a second end 404 coupled to the second carriage 310(2). Such couplings may be pivotable to enable the first link 312 to pivot relative to the first bracket 304 and the second carriage 310(2) during opening and closing of the first door 114(1). In some instances, the first link 312 may couple to the first bracket 304 within the first slot 334. The first link 312 operably couples the second carriage 310(2) to the first carriage 310 such that a pulling force imparted to the second carriage 310(2) is transferred to the first carriage 310(1). The first carriage 310(1) and the second carriage 310(2) may in turn traverse the first channel 314.

Additionally, the second link 324 includes the first end 342 coupled to the second bracket 306 and a second end 406 coupled to the fourth carriage 310(4). Such couplings may be pivotable to enable the second link 324 to pivot relative to the second bracket 306 and the fourth carriage 310(4) during opening and closing of the second door 114(2). In some instances, the second link 324 may couple to the second bracket 306 within the second slot 340. The second link 324 operably couples the fourth carriage 310(4) to the third carriage 310(3) such that a pulling force imparted to the fourth carriage 310(4) is transferred to the third carriage 310(3). The fourth carriage 310(4) and the third carriage 310(3) may in turn traverse the second channel 326.

Figure 5A:
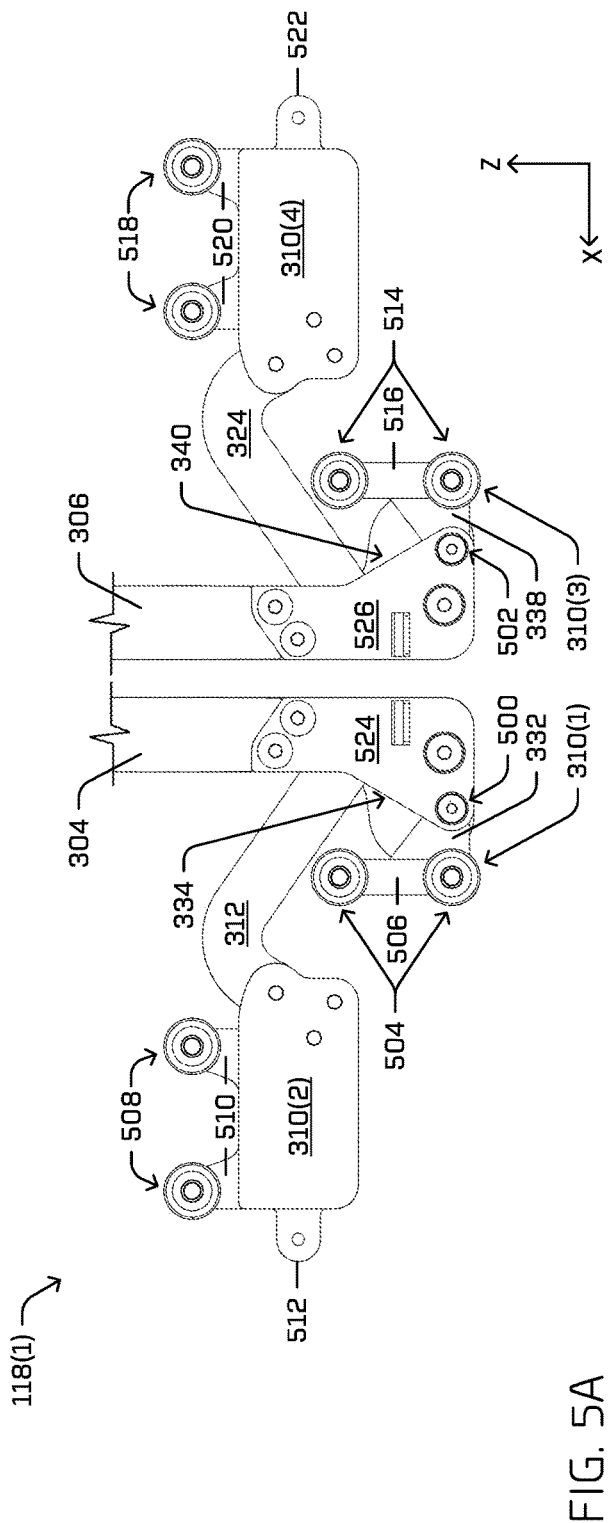
FIG. 5A is a first partial view of the first door actuator mechanism, showing components for opening and closing door(s) of the vehicle of FIG. 1, according to an example of the present disclosure.
Figure 5B:
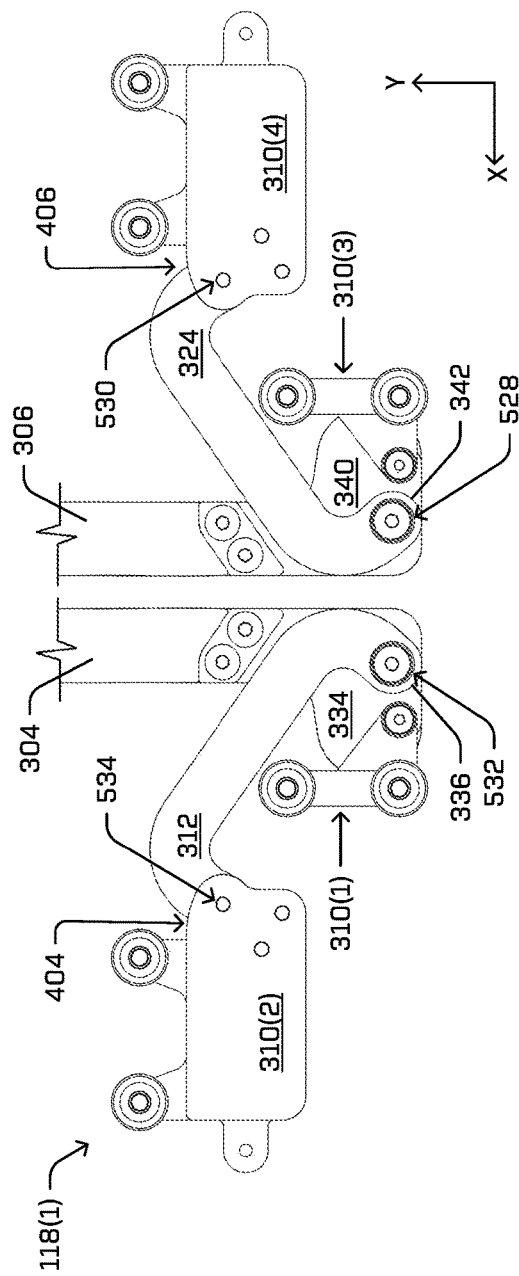
FIG. 5B is a second partial view of the first door actuator mechanism, showing components for opening and closing door(s) of the vehicle of FIG. 1, according to an example of the present disclosure.

FIGS. 5A and 5B illustrate partial views of the first door actuator mechanism 118(1). In FIG. 5A, a top view of the first carriage 310(1), the second carriage 310(2), the third carriage 310(3), and the fourth carriage 310(4) is shown. In FIG. 5B, a top view of the first carriage 310(1), the second carriage 310(2), the third carriage 310(3), and the fourth carriage 310(4) is shown, with portions of the first bracket 304 and the second bracket 306 removed.

Beginning with FIG. 5A, the first carriage 310(1) and the first link 312 pivotably couple to the first bracket 304 The first carriage 310(1) may couple to the first bracket 304 via a first pivot point 500, which may represent a pinned-connection between the first bracket 304 and the first carriage 310(1). The first pivot point 500 may be disposed through the first flange 332 of the first carriage 310(1). Similarly, the third carriage 310(3) and the second link 324 pivotably couple to the second bracket 306 The third carriage 310(3) may couple to the second bracket 306 via a second pivot point 502, which may represent a pinned-connection between the second bracket 306 and the third carriage 310(3). The second pivot point 502 may be disposed through the second flange 338 of the third carriage 310(3).

The first carriage 310(1) is shown including first wheels 504. In some instances, the first wheels 504 may include at least two wheels, however, in some instances, the first wheels 504 may include more than or less than two wheels. The first wheels 504 are configured to traverse the first channel 314 during an opening and a closing of the first door 114(1) (rotate about the Z-axis). The first wheels 504 may traverse both the first portion 316(1) and the second portion 316(2) of the first channel 314. The first wheels 504 may be disposed along a first strut 506 of the first carriage 310(1). The first strut 506 may extend from the first flange 332, vice versa.

The second carriage 310(2) is shown including second wheels 508, which in some instances, may include two wheels. The second wheels 508 are configured to traverse along the second portion 316(2) of the first channel 314 during an opening and a closing of the first door 114(1) (rotate about the Z-axis). As shown, the second wheels 508 may be spaced apart along a length of the second carriage 310(2). In some instances, the second wheels 508 may couple about pinned-connections on flanges 510 extending from the second carriage 310. The second carriage 310(2) is further shown including a first lip 512, to which the first cable 330(1) may couple.

The third carriage 310(3) is shown including third wheels 514. In some instances, the third wheels 514 may include at least two wheels, however, in some instances, the third wheels 514 may include more than or less than two wheels. The third wheels 514 are configured to traverse the second channel 326 during an opening and a closing of the second door 114(2). The third wheels 514 may traverse both the first portion 328(1) and the second portion 328(2) of the second channel 326. The third wheels 514 may be disposed along a second strut 516 of the third carriage 310(3). The second strut 516 may extend from the second flange 338, vice versa.

The fourth carriage 310(4) includes fourth wheels 518, which in some instances, may include two wheels. The fourth wheels 518 are configured to traverse along the second portion 328(2) of the second channel 326 during an opening and a closing of the second door 114(2). As shown, the fourth wheels 518 may be spaced apart along a length of the fourth carriage 310(4). In some instances, the fourth wheels 518 may couple about pinned-connections on flanges 520 extending from the fourth carriage 310(4). The fourth carriage 310(4) is further shown including a second lip 522, to which the third cable 330(3) may couple.

The first bracket 304 may include a first cover 524 that at least partially defines the first slot 334. Likewise the second bracket 306 may include a second cover 526 that at least partially defines the second slot 340. The first cover 524 may assist in coupling the first carriage 310(1) and the first link 312 to the first bracket 304, as well as defining the first slot 334 within which the first carriage 310(1) and the first link 312 at least partially reside. For example, the first flange 332 of the first carriage 310(1) may at least partially reside within the first slot 334, between the first bracket 304 and the first cover 524. Similarly, the second cover 526 may assist in coupling the third carriage 310(3) and the second link 324 to the second bracket 306, as well as defining the second slot 340 within which the third carriage 310(3) and the second link 324 at least partially reside. For example, the second flange 338 of the third carriage 310(3) may at least partially reside within the second slot 340, between the second bracket 306 and the second cover 526.

In FIG. 5B, the first cover 524 and the second cover 526 are shown removed from the first bracket 304 and the second bracket 306, respectively. As illustrated, the first slot 334 provides a first area within which the first carriage 310(1) and the first link 312 may pivot during opening and closing of the first door 114(1). The second slot 340 also provides a second area within which the third carriage 310(3) and the second link 324 may pivot during opening and closing of the second door 114(2).

The first end 336 of the first link 312 may couple to the first bracket 304 via a third pivot point 532, which may represent a pinned-connection between the first bracket 304 and the first link 312. The second end 404 of the first link 312 may couple to the second carriage 310(2) via a fourth pivot point 534. The first end 342 of the second link 324 may couple to the second bracket 306 via a fifth pivot point 528, which may represent a pinned-connection between the second bracket 306 and the second link 324. The second end 406 of the second link 324 may couple to the fourth carriage 310(4) via a sixth pivot point 530.

Figure 6:
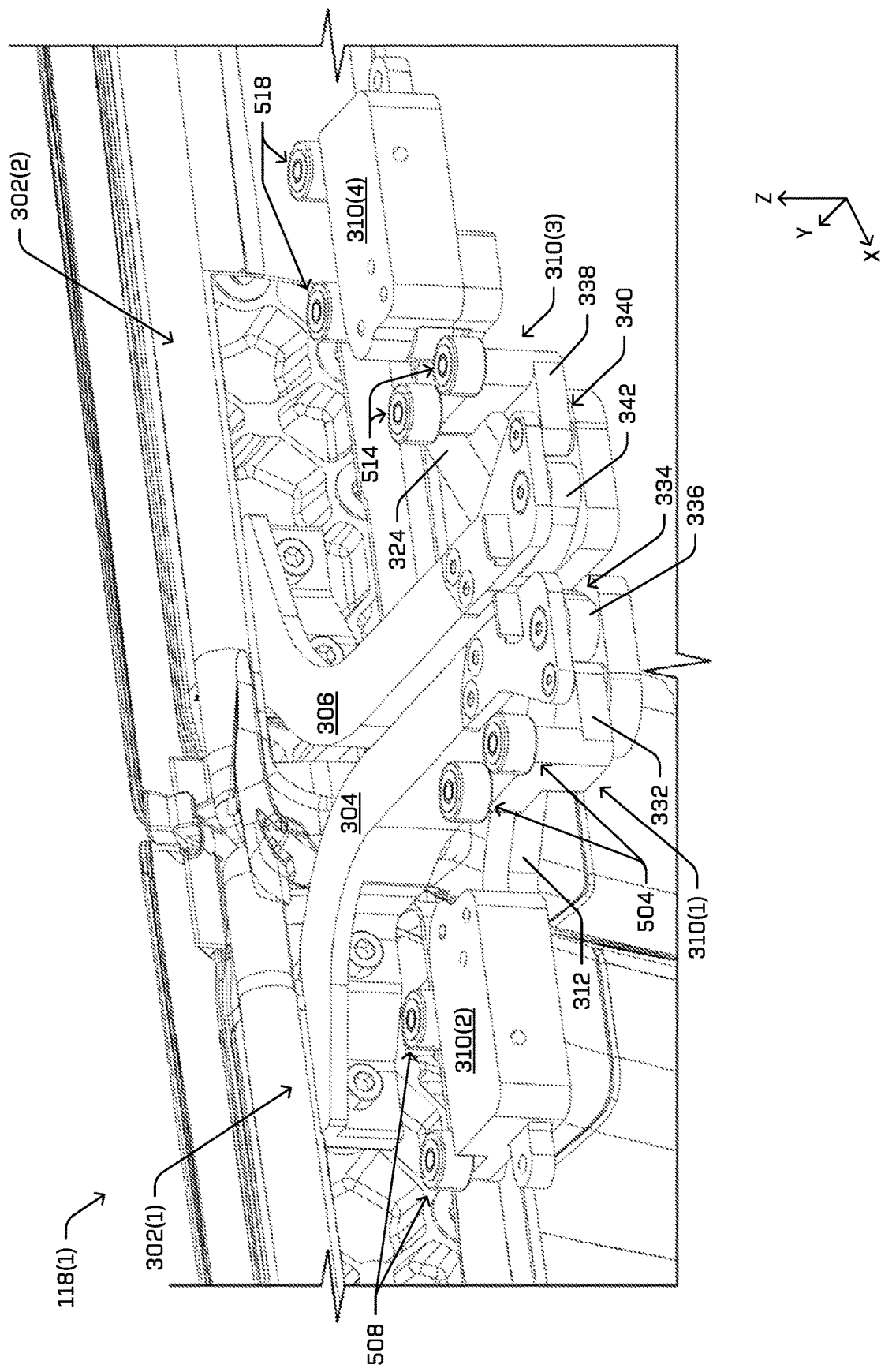
FIG. 6 is a partial view of the first door actuator mechanism for opening and closing door(s) of the vehicle of FIG. 1, according to an example of the present disclosure.

FIG. 6 illustrates a perspective view of the first door actuator mechanism 118(1), showing the first carriage assembly 302(1) and the second carriage assembly 302(2). In FIG. 6, the first plate 300(1), the second plate 300(2), and the third plate 300(3) are removed.

Introduced above, the first carriage 310(1) includes the first wheels 504 that engage with the first channel 314. The first carriage 310(1) is shown coupled to the first bracket 304, via the first flange 332. The first flange 332 of the first carriage 310(1) is disposed within the first slot 334 and pivotably coupled within the first slot 334. As also shown, the first end 336 of the first link 312 couples to the first bracket 304, within the first slot 334. The second wheels 508 of the second carriage 310(2) are also shown, which engage with the first channel 314. The first end 336 of the first link 312 pivotably couples to the second carriage 310(2).

The third carriage 310(3) includes the third wheels 514 that engage with the second channel 326. The third carriage 310(3) is shown coupled to the second bracket 306, via the second flange 338. The second flange 338 of the third carriage 310(3) is disposed within the second slot 340 and pivotably coupled within the second slot 340. As also shown, the first end 342 of the second link 324 couples to the second bracket 306, within the second slot 340. The fourth wheels 518 of the fourth carriage 310(4) are also shown, which engage with the second channel 326. The second end 406 of the second link 324 pivotably couples to the fourth carriage 310(4).

Figure 7:
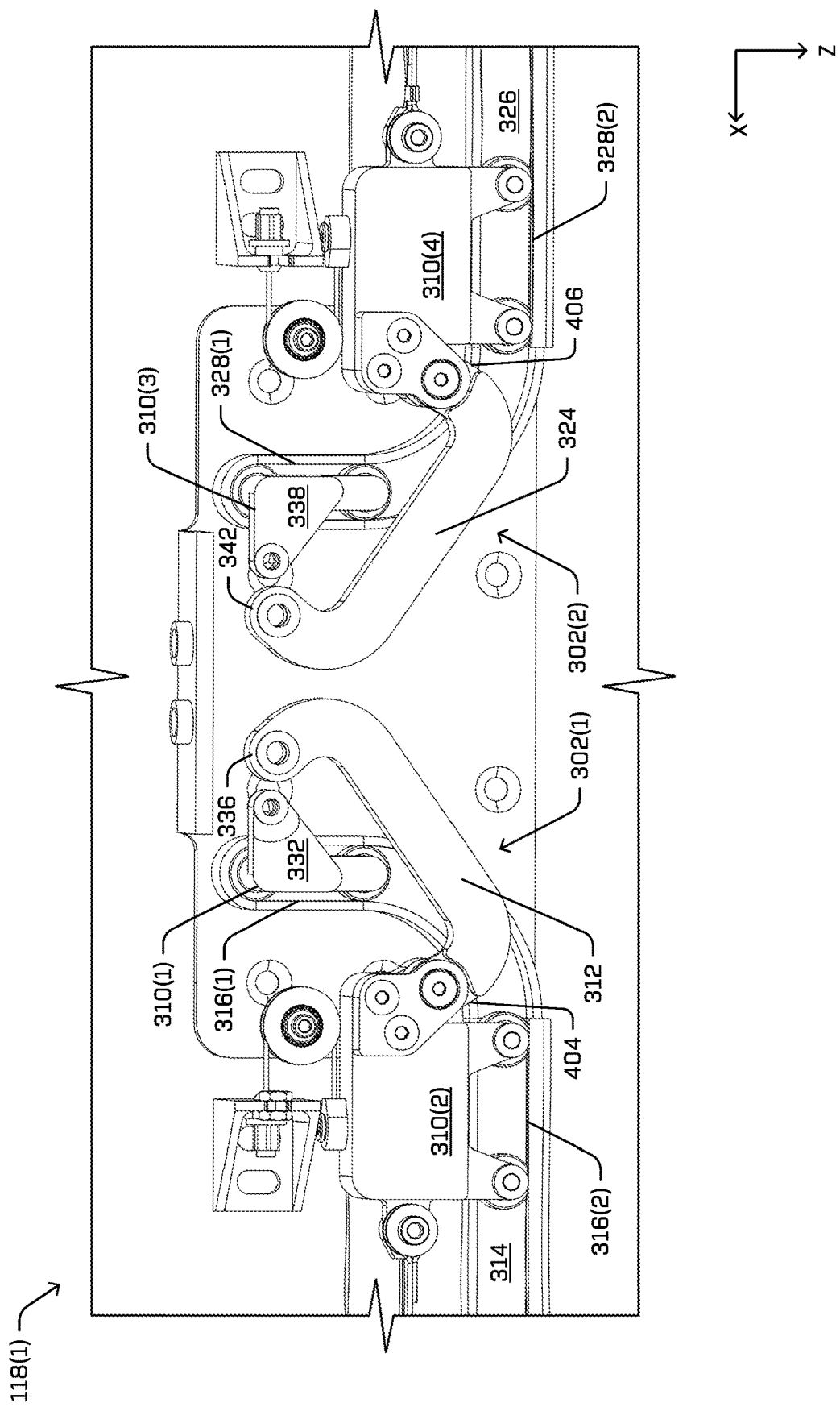
FIG. 7 is a partial view of the first door actuator mechanism for opening and closing door(s) of the vehicle of FIG. 1, according to an example of the present disclosure.

FIG. 7 illustrates a perspective view of the first door actuator mechanism 118(1), showing the first carriage assembly 302(1) and the second carriage assembly 302(2). In FIG. 7, the first plate 300(1), the second plate 300(2), the third plate 300(3), the first bracket 304, the second bracket 306, and portions of the first carriage 310(1) and the third carriage 310(3) are removed.

In FIG. 7, the pivotably couplings between the first carriage 310(1) and the first link 312 are shown. For example, passageways may be disposed through the first carriage 310(1) and the first link 312 for coupling to the first bracket 304 and/or the second carriage 310(2). For example, the first flange 332 of the first carriage 310(1) may include a passageway through which a pin is disposed for pivotably coupling to the first bracket 304. The first link 312 may include a passage disposed at the first end 336, through which a pin is disposed for pivotably coupling to the first bracket 304. On the second end 404, the first link 312 may include a passage through which a pin is disposed for pivotably coupling to the second carriage 310(2).

Additionally, passageways may be disposed through the third carriage 310(3) and the second link 324 for coupling to the second bracket 306 and/or the fourth carriage 310(4). For example, the second flange 338 of the third carriage 310(3) may include a passageway through which a pin is disposed for pivotably coupling to the second bracket 306. The second link 324 may include a passage disposed at the first end 342, through which a pin is disposed for pivotably coupling to the second bracket 306. On the second end 406, the second link 324 may include a passage through which a pin is disposed for pivotably coupling to the fourth carriage 310(4).

As also illustrated, the first wheels 504 are shown residing within sidewalls of the first channel 314 (at the first portion 316(1), and the second wheels 508 are shown residing within sidewalls of the first channel 314 (at the second portion 316(2)). The third wheels 514 are shown residing within sidewalls of the second channel 326 (at the first portion 328(1), and the fourth wheels 518 are shown residing within sidewalls of the second channel (at the second portion 328(2)).

Although the first portion 316(1) of the first channel 314 and the first portion 328(1) of the second channel 326 are shown including a similar curvature, the first portion 316(1) and the first portion 328(1) need not be the same. For example, the first portion 316(1) and/or the first portion 328(1) may include different curvatures than shown. Additionally, the first plate 300(1), the second plate 300(2), and/or the third plate 300(3) may be omitted. In such instances, the first channel 314 and/or the second channel 326 may couple to other portions of the vehicle 100, such as frames. As such, the first plate 300(1), the second plate 300(2), and/or the third plate 300(3) need not be included.

Figure 8A:
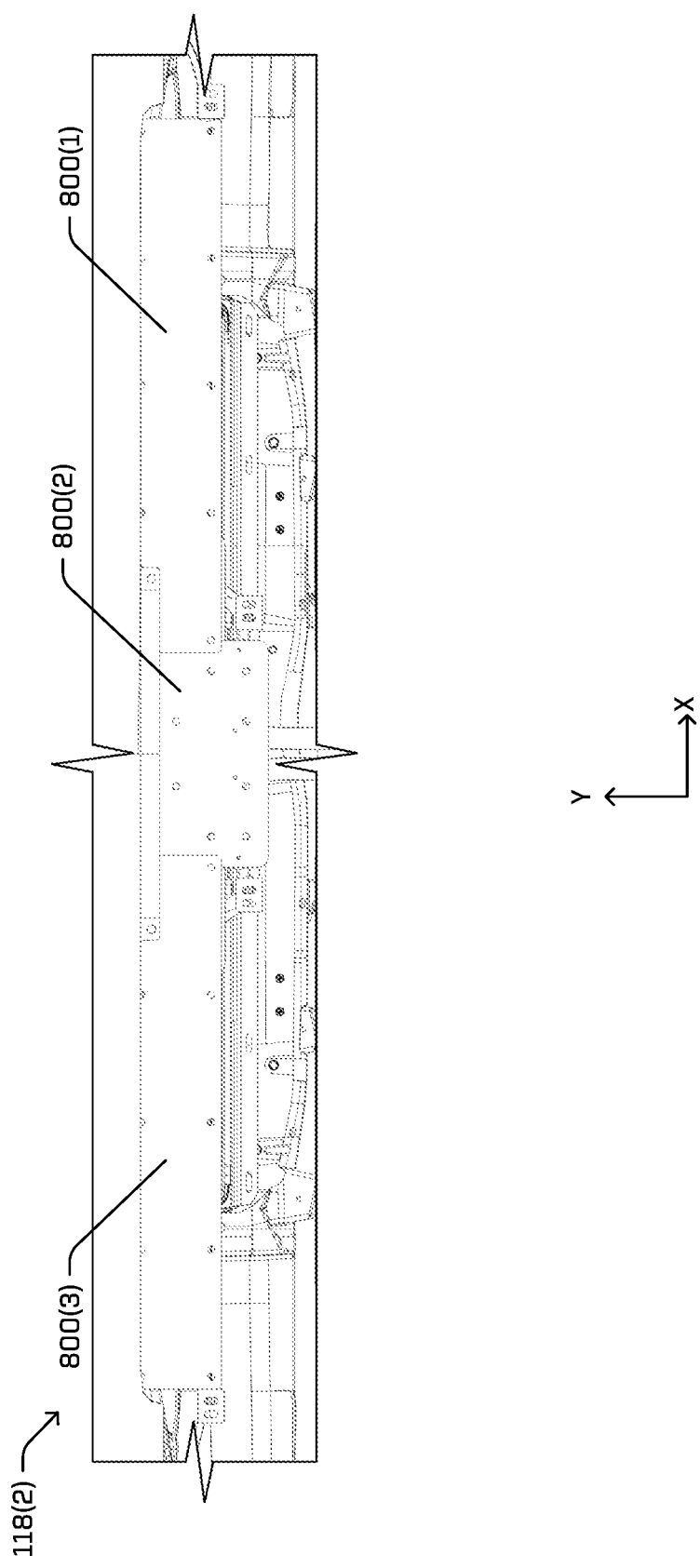
FIG. 8A is a first view of an example second door actuator mechanism for opening and closing door(s) of the vehicle of FIG. 1, according to an example of the present disclosure.

FIG. 8A illustrates a first view of the second door actuator mechanism 118(2). In some instances, the view shown in FIG. 8A represents a bottom view of the second door actuator mechanism 118(2).

The second door actuator mechanism 118(2) includes one or more plates to which components of the second door actuator mechanism 118(2) couple and/or engage. For example, as will be described herein, a first plate 800(1) of the second door actuator mechanism 118(2) may provide or include a portion of a first channel within which a first carriage assembly traverses. A second plate 800(2) of the second door actuator mechanism 118(2) may provide or include an additional portion of the first channel within which the first carriage assembly traverses. Additionally, a third plate 800(3) of the second door actuator mechanism 118(2) may provide or include a portion of a second channel within which a second carriage assembly traverses. The second plate 800(2) may provide an additional portion of the second channel within which the second carriage assembly traverses. However, although the first plate 800(1), the second plate 800(2), and the third plate 800(3) are shown as separate components, in some instances, the first plate 800(1), the second plate 800(2), and/or the third plate 800(3) may represent a single component (e.g., a single unibody plate). Additionally, in some instances, the first plate 800(1), the second plate 800(2), and/or the third plate 800(3) may be omitted and the channels of the second door actuator mechanism 118(2) may couple to other frames, structures, etc. of the vehicle 100.

Figure 8B:
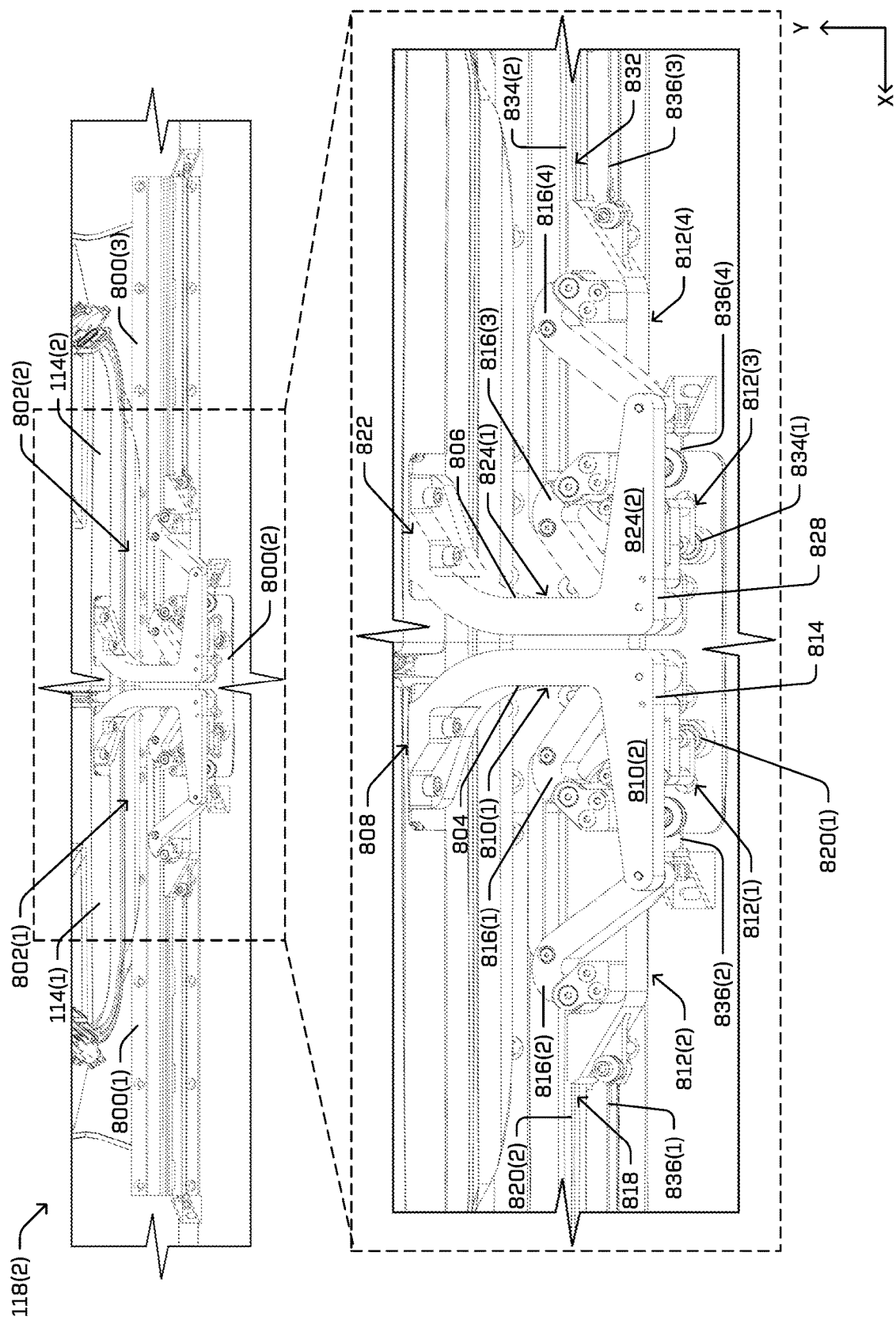
FIG. 8B is a second view of the second door actuator mechanism for opening and closing door(s) of the vehicle of FIG. 1, according to an example of the present disclosure.

FIG. 8B illustrates a second view of the second door actuator mechanism 118(2). In some instances, the view shown in FIG. 8B represents a top view of the second door actuator mechanism 118(2). In FIG. 8B, a detailed view of the second door actuator mechanism 118(2).

The second door actuator mechanism 118(2) is shown including a first carriage assembly 802(1) and a second carriage assembly 802(2). The first carriage assembly 802(1) couples to the first door 114(1) for opening and closing the first door 114(1), and the second carriage assembly 802(2) couples to the second door 114(2) for opening and closing the second door 114(2). The first carriage assembly 802(1) couples to the first door 114(1) via a first bracket 804, while the second carriage assembly 802(2) couples to the second door 114(2) via a second bracket 806. The first bracket 804 and the second bracket 806 may resemble L-shaped brackets.

The first bracket 804 may include a first end 808 that couples to the first door 114(1). A body of the first bracket 804 defines a first segment 810(1) that extends transverse to the first door 114(1) (Y-direction), and a second segment 810(2) that extends transverse to the first segment 810(1) (X-direction). The first carriage assembly 802(1) includes components that couple to the first bracket 804. For example, the first carriage assembly 802 includes a first carriage 812(1) and a second carriage 812(2). In some instances, the first carriage 812(1) and the second carriage 812(2) couple to the first bracket 804, whether directly or indirectly. For example, the first carriage 812(1) may couple to the first bracket 804, at a second end 814 of the first bracket 804 corresponding to the second segment 810(2). As explained herein, the coupling between the first carriage 812(1) and the first bracket 804 may be pivotable such that the first carriage 812(1) is permitted to traverse a travel path during opening and closing of the first door 114(1).

Additionally, the second carriage 812(2) may couple to the first bracket 804, along the second segment 810(2) via a first link 816(1) and a second link 816(2). As illustrated, the first link 816(1) may couple to the first bracket 804 and the second carriage 812(2). The coupling between the second carriage 812(2) and the first link 816(1), the first bracket 804 and the first link 816(1) and the second link 816(2), the second carriage 812(2) and the second link 816(2), as well as the second bracket 806 and the second link 816(2) may be pivotable such that the second carriage 812(2) is permitted to traverse the travel path during opening and closing of the first door 114(1). The coupling between the second segment 810(2), the first link 816(1), the second link 816(2), as well as a coupler that adjoins the first link 816(1) and the second link 816(2) (discussed in FIG. 9), may represent a four bar link that controls motion of the first door 114(1) when the first carriage 812(1) and the second carriage 812(2) traverse the first channel 818.

As introduced above in FIG. 8A, the first plate 800(1) and the second plate 800(2) provide and/or include a channel in which the first carriage assembly 802(1) engages. For example, the first carriage 812(1) and the second carriage 812(2) may include wheels that traverse channels in the first plate 800(1) and the second plate 800(2). In some instances, the first plate 800(1) and the second plate 800(2) include a first channel 818 having a first portion 820(1) and a second portion 820(2). The second plate 800(2) may include the first portion 820(1), and the first plate 800(1) may include the second portion 820(2).

The first portion 820(1) may represent a trough or groove defined by, or formed within, the second plate 800(2). In some instances, the second portion 820(2) may represent a C-shaped channel body (e.g., extrusion) coupled to the first plate 800(1). The first channel 818 defines a first travel path of the first door 114(1). Respective wheels of the first carriage 812(1) and the second carriage 812(2) may traverse the first channel 818. In some instances, and as shown in the closed position of the first door 114(1) in FIG. 8B, the first carriage 812(1) is configured to traverse the first portion 820(1) of the first channel 818 and the second portion 820(2) of the first channel 818 during and opening of the first door 114(1). In some instances, the second carriage 812(2) is configured to traverse the second portion 820(2) of the first channel 818 during an opening of the first door 114(1). The pivotable coupling between the first carriage 812(1) and the first bracket 804, as well as the pivotable coupling between the first bracket 804, the second carriage 812(2), the first link 816(1), and the second link 816(2) permit the first carriage 812(1) and the second carriage 812(2) to traverse the first channel 818 (e.g., during curvature of the travel path).

Similarly, the second bracket 806 may include a first end 822 that couples to the second door 114(2). A body of the second bracket 806 defines a first segment 824(1) that extends transverse to the second door 114(2) (Y-direction), and a second segment 824(2) that extends transverse to the second segment 824(2) (X-direction). The second carriage assembly 802(2) includes components that couple to the second bracket 806. For example, the second carriage assembly 802(2) includes a third carriage 812(3) and a fourth carriage 812(4). In some instances, the third carriage 812(3) and the fourth carriage 812(4) couple to the second bracket 806, whether directly or indirectly. For example, the third carriage 812(3) may couple to the second bracket 806, at a second end 828 of the second bracket 806 corresponding to the second segment 824(2). As explained herein, the coupling between the third carriage 812(3) and the second bracket 806 may be pivotable such that the third carriage 812(3) is permitted to traverse a travel path during opening and closing of the second door 114(2).

Additionally, the fourth carriage 812(4) may couple to the second bracket 806, along the second segment 824(2) via a third link 816(3) and a fourth link 816(4). As illustrated, the third link 816(3) and the fourth link 816(4) may couple to the second bracket 806 and the fourth carriage 812(4). The coupling between the fourth carriage 812(4) and the third link 816(3), the second bracket 806 and the third link 816(3), the fourth carriage 812(4) and the fourth link 816(4), as well as the second bracket 806 and the fourth link 816(4) may be pivotable such that the fourth carriage 812(4) is permitted to traverse the travel path during opening and closing of the second door 114(2). The coupling between the second segment 824(2), the third link 816(3), the fourth link 816(4), as well as a coupler that adjoins the third link 816(3) and the fourth link 816(4) (discussed in FIG. 9), may represent a four bar link that controls motion of the second door 114(2) when the third carriage 812(3) and the fourth carriage 812(4) traverse the second channel 832.

As introduced above in FIG. 8A, the second plate 800(2) and the third plate 800(3) provide and/or include a channel in which the second carriage assembly 802 engages. For example, the third carriage 812(3) and the fourth carriage 812(4) may include wheels that traverse a channel in the second plate 800(2) and the third plate 800(3). In some instances, the second plate 800(2) and the third plate 800(3) include a second channel 832 having a first portion 834(1) and a second portion 834(2). The second plate 800(2) may include the first portion 834(1), and the third plate 800(3) may form the second portion 834(2).

The first portion 834(1) may represent a trough or groove defined by, or formed within, the second plate 800(2). In some instances, the second portion 834(2) may represent a C-shaped channel body (e.g., extrusion) coupled to the third plate 800(3). The second channel 832 defines a second travel path of the second door 114(2). Respective wheels of the third carriage 812(3) and the fourth carriage 812(4) may traverse the second channel 832. In some instances, and as shown in the closed position of the second door 114(2), the third carriage 812(3) is configured to traverse the first portion 834(1) of the second channel 832 and the second portion 834(2) of the second channel 832 during opening and closing of the second door 114(2). In some instances, the fourth carriage 812(4) is configured to traverse the second portion 834(2) of the second channel 832 during opening and closing of the second door 114(2). The pivotable coupling between the third carriage 812(3) and the second bracket 806, as well as the pivotable coupling between the second bracket 806, the fourth carriage 812(4), the third link 816(3), and the fourth link 816(4) permit the third carriage 812(3) and the fourth carriage 812(4) to traverse the second channel 832 (e.g., during curvature of the travel path).

The second door actuator mechanism 118(2) includes components for respectively actuating the first door 114(1) and the second door (2) between open and closed positions. In some instances, the second door actuator mechanism 118(2) may include separate components coupled to the first carriage assembly 802(1) and the second carriage assembly 802(2) for respectively opening and closing the first door 114(1) and the second door 114(2). For example, a first cable 836(1) and a second cable 836(2) are shown coupled to the second carriage 812(2) of the first carriage assembly 802(1). In some instances, the first cable 836(1) may represent an opening cable that when pulled, opens the first door 114(1). The second cable 836(2) may represent a closing cable that when pulled, closes the first door 114(1). An end of the first cable 836(1) and the second cable 836(2) not coupled to the second carriage 812(2) may couple to a motor. During opening of the first door 114(1), for example, the motor may actuate to pull on the first cable 836(1). Here, the first cable 836(1) may spool about a drum. Additionally, the second cable 836(2) may provide slack (e.g., unspool) to permit the first cable 836(1) to be pulled. In some instances, the first cable 836(1) may represent a second portion of the second cable 212(2) that couples to the second carriage 812(2), and the second cable 836(2) may represent a second portion of the first cable 212(1) coupled to the second carriage 812(2), as discussed above with regard to FIG. 2A.

In some instances, the motor that couples to the first cable 836(1) of the second door actuator mechanism 118(2) may additionally couple to the first cable 330(1) of the first door actuator mechanism 118(1). This may permit the top and the bottom of the first door 114(1) to be opened in unison, via the first carriage assembly 302(1) of the first door actuator mechanism 118(1) and the first carriage assembly 802(1) of the second door actuator mechanism 118(2). That is, as discussed above in FIG. 2A, the first cable 330(1) and the first cable 836(1) may represent the second cable 212(2) such that when pulled, the first door 114(1) opens. The second cable 330(2) and the second cable 836(2) may represent the first cable 212(1) such that when pulled, the first door 114(1) closes.

Pulling on the first cable 836(1) correspondingly pulls on the second carriage 812(2). From the position of the second carriage 812(2) shown in FIG. 8B, when the second carriage 812(2) is pulled via the first cable 836(1), the second carriage 812(2) traverses in a first direction (X-direction). At the same time, the second carriage 812(2) imparts a pulling force to the first bracket 804 via the first link 816(1) and the second link 816(2). This pulling force directs the first carriage 812(1) in a second direction (Y-direction, outward away from the interior space 116). Movement in the second direction moves the first door 114(1) away from the vehicle 100 such that the first door 114(1) may open.

Moreover, during opening of the first door 114(1), movement in the second direction causes the second carriage 812(2) to traverse along the second portion 820(2) of the first channel 818 and the first carriage 812(1) to traverse along the first portion 820(1) of the first channel 818. In turn, and during a continued pulling of the first cable 836(1), the first carriage 812(1) transitions to traverse along the second portion 820(2). During this instance, the first carriage 812(1) and the second carriage 812(2) traverse substantially in the second direction. The second direction may be substantially parallel to the longitudinal axis 130 of the vehicle 100.

Conversely, during a closing of the first door 114(1), the second cable 836(2) may be pulled to pull the second carriage 812(2) in a third direction that is opposite the first direction (opposite X-direction). Here, the second cable 836(2) may couple to a motor, whether an additional or similar motor to which the first cable 836(1) couples. During movement of the motor, the second cable 836(2) spools. In turn, the first carriage 812(1) and the second carriage 812(2) traverse along the second portion 820(2) of the first channel 818. During a continued pulling force of the second carriage 812(2) via the second cable 836(2), the first carriage 812(1) traverses the first portion 820(1), while the second carriage 812(2) moves along the second portion 820(2).

In some instances, the motor that couples to the second cable 836(2) of the second door actuator mechanism 118(2) may additionally couple to the second cable 330(2) of the first door actuator mechanism 118(1). This may permit the top and the bottom of the first door 114(1) to be closed in unison, via the first carriage assembly 302(1) of the first door actuator mechanism 118(1) and the first carriage assembly 802(1) of the second door actuator mechanism 118(2).

As the first carriage 812(1) traverses the first portion 820(1), the first door 114(1) moves in a fourth direction that is opposite the second direction (opposite Y-direction, inward toward the interior space 116). The first carriage 812(1) then comes into contact with an end of the first channel 818 and is halted from traveling farther in the fourth direction. Here, the first door 114(1) is in the closed position. To effectuate opening and closing of the first door 114(1), in some instances, the first cable 836(1) and the second cable 836(2) may be fed through and/or routed around one or more pulleys.

The second door actuator mechanism 118(2) also includes components for opening and closing the second door 114(2). For example, a third cable 836(3) and a fourth cable 836(4) are shown coupled to the fourth carriage 812(4) of the second carriage assembly 802(2). In some instances, the third cable 836(3) may represent an opening cable that when pulled, opens the second door 114(2). The fourth cable 836(4) may represent a closing cable that when pulled, closes the second door 114(2). An end of the third cable 836(3) and the fourth cable 836(4) not coupled to the fourth carriage 812(4) may couple to a motor. During opening of the second door 114(2), for example, the motor may actuate to pull on the third cable 836(3). Here, the third cable 836(3) may spool about a drum. In some instances, the third cable 836(3) may represent a second portion of the fourth cable 212(4) that couples to the fourth carriage 812(4), and the fourth cable 836(4) may represent a second portion of the third cable 212(3) coupled to the fourth carriage 812(4), as discussed above with regard to FIG. 2A. Alternatively, the third cable 836(3) may represent the third cable 218(3) that couples to the fourth carriage 812(4) (the carriage 222), and the fourth cable 836(4) may represent the first cable 218(1) coupled to the fourth carriage, as discussed above with regard to FIG. 2B.

In some instances, the motor that couples to the third cable 836(3) of the second door actuator mechanism 118(2) may additionally couple to the third cable 330(3) of the first door actuator mechanism 118(1). This may permit the top and the bottom of the second door 114(2) to be opened in unison, via the second carriage assembly 302(2) of the first door actuator mechanism 118(1) and the second carriage assembly 802(2) of the second door actuator mechanism 118(2). Additionally, the fourth cable 836(4) may provide slack (e.g., unspool) to permit the third cable 836(3) to be pulled. That is, as discussed above in FIG. 2A, the third cable 330(3) and the third cable 836(3) may represent the fourth cable 212(4) such that when pulled, the second door 114(2) opens. The fourth cable 330(4) and the fourth cable 836(4) may represent the third cable 212(3) such that when pulled, the second door 114(2) closes.

Pulling on the third cable 836(3) correspondingly pulls on the fourth carriage 812(4). From the position of the fourth carriage 812(4) shown in FIG. 8B, when the fourth carriage 812(4) is pulled via the third cable 836(3), the fourth carriage 812(4) traverses in the third direction. At the same time, the fourth carriage 812(4) imparts a pulling force to the second bracket 806 via the third link 816(3) and the fourth link 816(4). This pulling force directs the third carriage 812(3) in the second direction. Movement in the second direction moves the second door 114(2) away from the vehicle 100 such that the second door 114(2) may open. Moreover, during opening of the second door 114(2), movement in the third direction causes the fourth carriage 812(4) to traverse along the second portion 834(2) of the second channel 832 and the third carriage 812(3) to traverse along the first portion 834(1) of the second channel 832. In turn, and during a continued pulling of the third cable 836(3), the third carriage 812(3) transitions into the second portion 834(2). During this instance, the third carriage 812(3) and the fourth carriage 812(4) traverse substantially in the third direction.

Conversely, during a closing of the second door 114(2), the fourth cable 836(4) may be pulled to pull the fourth carriage 812(4) in first direction. Here, the fourth cable 836(4) may couple to a motor, whether an additional or similar motor to which the third cable 836(3) couples. During movement of the motor, the fourth cable 836(4) spools. In turn, the third carriage 812(3) and the fourth carriage 812(4) traverse along the second portion 834(2) of the second channel 832. During a continued pulling force of the fourth carriage 812(4) via the fourth cable 836(4), the third carriage 812(3) traverses the first portion 834(1), while the fourth carriage 812(4) moves along the second portion 834(2).

In some instances, the motor that couples to the fourth cable 836(4) of the second door actuator mechanism 118(2) may additionally couple to the fourth cable 330(4) of the first door actuator mechanism 118(1). This may permit the top and the bottom of the second door 114(2) to be closed in unison, via the second carriage assembly 302(2) of the first door actuator mechanism 118(1) and the second carriage assembly 802(2) of the second door actuator mechanism 118(2).

As the third carriage 812(3) traverses the first portion 834(1), the second door 114(2) moves in a fourth direction (opposite the second direction). The third carriage 812(3) then comes into contact with an end of the second channel 832 and is halted from traveling farther in the fourth direction. Here, the second door 114(2) is in the closed position. To effectuate opening and closing of the second door 114(2), in some instances, the third cable 836(3) and the fourth cable 836(4) may be fed through and/or routed around one or more pulleys.

Furthermore, in some instances, the first cable 836(1), the second cable 836(2), the third cable 836(3), and the fourth cable 836(4) may route through one or more supports. Such supports may couple the first cable 836(1), the second cable 836(2), the third cable 836(3), and the fourth cable 836(4) to the vehicle 100 (or a body/frame of the vehicle). One or more tensioners may couple the first cable 836(1), the second cable 836(2), the third cable 836(3), and the fourth cable 836(4) to the supports for adjusting slack in the first cable 836(1), the second cable 836(2), the third cable 836(3), and the fourth cable 836(4).

Although the first carriage assembly 802(1) and the second carriage assembly 802(2) are shown and described as including cables for opening and closing the first door 114(1) and the second door 114(2), respectively, other mechanisms may be used. For example, a first actuator may couple to the second carriage 812(2) and a second actuator may couple to the fourth carriage 812(4). Actuating the first actuator in a first direction (e.g., retraction of the first actuator) may pull on the second carriage 812(2) such that the first carriage assembly 802(1) traverses the first channel 818 to the open position (in the first direction). Actuating the first actuator in a second direction (e.g., extension) may push on the second carriage 812(2) such that the first carriage assembly 802(1) traverses the first channel 818 to the closed position. The second actuator may similarly couple to the fourth carriage 812(4) and actuate in respective directions to open and close the second door 114(2). Such actuators may represent linear actuators and may be pneumatic or hydraulic. Additionally, screw drives, piston-type drives, and/or other actuators may be used.

Although the first door actuator mechanism 118(1) discussed above in FIGS. 3A-7 is discussed as being on top of the first door 114(1) and the second door 114(2), and the second door actuator mechanism 118(2) is discussed as being on the bottom of the first door 114(1) and the second door 114(2), the positions of the first door actuator mechanism 118(1) and the second door actuator mechanism 118(2) may be interchanged. For example, the first door actuator mechanism 118(1) may include more than one link coupling the brackets with the second carriage 812(2) or the fourth carriage 812(4). Similarly, the second door actuator mechanism 118(2) may include less than two links coupling the brackets with the second carriage 812(2) or the fourth carriage 812(4).

Although the second door actuator mechanism 118(2) is shown and described as including the first carriage assembly 802(1) and the second carriage assembly 802(2), such components may be distinct and separate. For example, the second door actuator mechanism 118(2) may only include one of the first carriage assembly 802(1), as well as components for actuating the first carriage assembly 802(1) to open and close the first door 114(1). In such instances, a separate actuator mechanism may include the second carriage assembly 802(2) for opening and closing the second door 114(2). As such, separate and distinct door actuator mechanism(s) may be included for the first door 114(1) and second door 114(2).

Figure 8C:
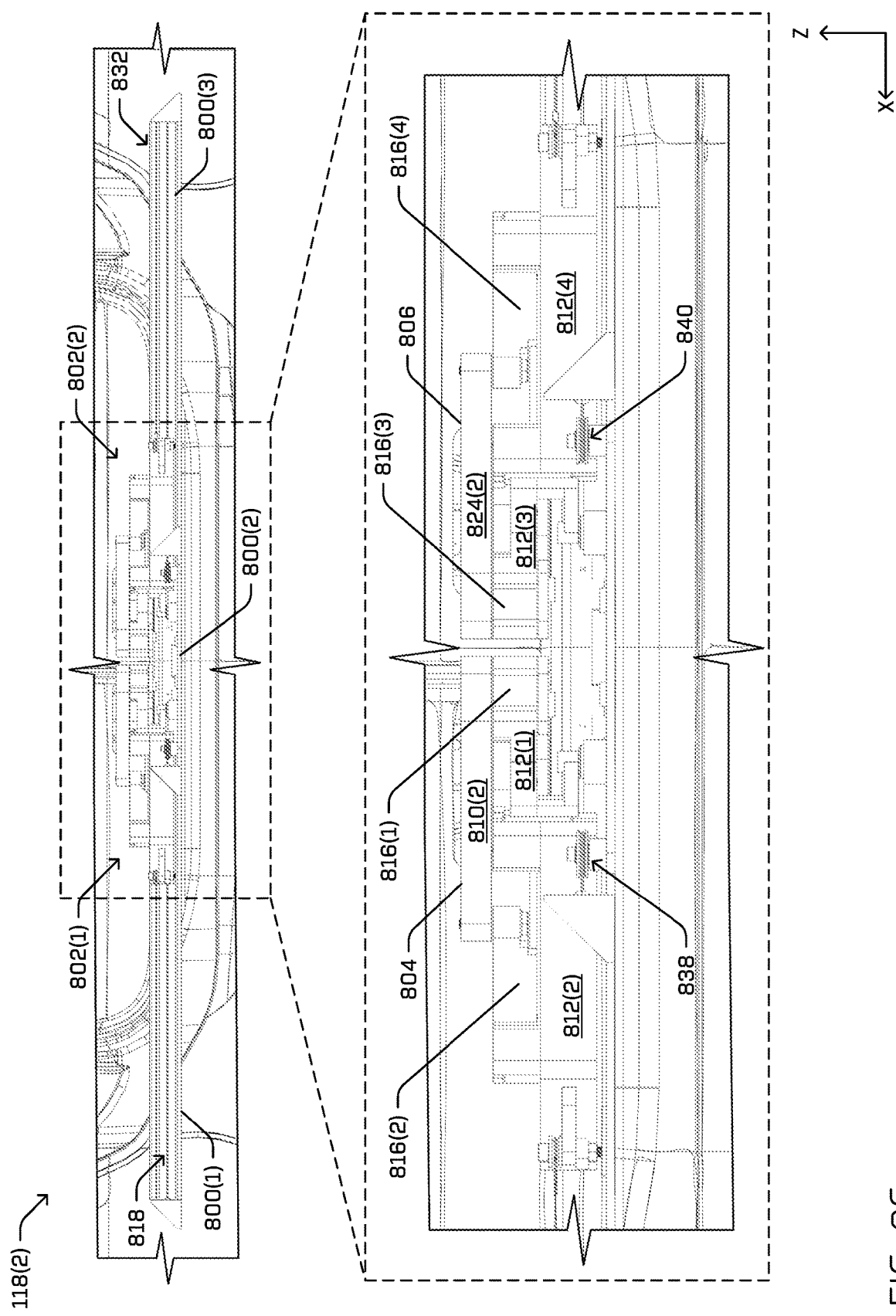
FIG. 8C is a third view of the second door actuator mechanism for opening and closing door(s) of the vehicle of FIG. 1, according to an example of the present disclosure.

FIG. 8C illustrates a third view of the second door actuator mechanism 118(2). In some instances, the view shown in FIG. 8C may represent a front view of the second door actuator mechanism 118(2). In FIG. 8C, a detailed view of the second door actuator mechanism 118(2) is shown.

The first plate 800(1), the second plate 800(2), and/or the third plate 800(3) include, or form portions of, the first channel 818 and the second channel 832 within which the first carriage assembly 802(1) and the second carriage assembly 802(2) engage. For example, the first plate 800(1) includes a length (X-direction) for the second portion 820(2) of the first channel 818, and the third plate 800(3) includes a length (X-direction) of the second channel 832. In some instances, the second plate 800(2) defines the first portion 820(1) of the first channel 818 and the first portion 834(1) of the second channel 832.

The first carriage 812(1) includes wheels that engage with the first portion 820(1) and the second portion 820(2) of the first channel 818. Additionally, the second carriage 812(2) includes wheels that engage with the second portion 820(2) of the first channel 818. Similarly, the third carriage 812(3) includes wheels that engage with the first portion 834(1) and the second portion 834(2) of the second channel 832. Additionally, the fourth carriage 812(4) includes wheels that engage with the second portion 834(2) of the second channel 832.

The first carriage 812(1) is shown being coupled to the first bracket 804. The first carriage 812(1) pivotably couples (e.g., hinged, bearing, etc.) to the first bracket 804 such that the first carriage 812(1) may pivot relative to the first bracket 804 as the first door 114(1) opens and closes. In some instances, the first carriage 812(1) may couple to the first bracket 804, proximate a location where the first segment 810(1) and the second segment 810(2) adjoin. Additionally, the first link 816(1) is shown coupled to the first bracket 804, at a location where the first segment 810(1) and the second segment 810(2) adjoin. The second link 816(2) couples to the first bracket 804, at a distal portion of the second segment 810(2).

The third carriage 812(3) is shown being coupled to the second bracket 806. The third carriage 812(3) pivotably couples (e.g., hinged, bearing, etc.) to the second bracket 806 such that the third carriage 812(3) may pivot relative to the second bracket 806 as the second door 114(2) opens and closes. In some instances, the fourth carriage 812(4) may couple to the second bracket 806, proximate a location where the first segment 824(1) and the second segment 824(2) adjoin. Additionally, the third link 816(3) is shown coupled to the second bracket 806, at a location where the first segment 824(1) and the second segment 824(2) adjoin. The fourth link 816(4) couples to the second bracket 806, at a distal portion of the second segment 824(2).

As introduced above, cables of the first carriage assembly 802(1) and the second carriage assembly 802(2) may wrap around one or more pulleys. For example, the second cable 836(2) may wrap around a first pulley 838 for providing a pulling force on the second carriage 812(2) in the first direction. The fourth cable 836(4) may wrap around a second pulley 840 for providing a pulling force on the fourth carriage 812(4) in the third direction. In some instances, the first pulley 838 and the second pulley 840 may couple to the second plate 800(2).

Figure 8D:
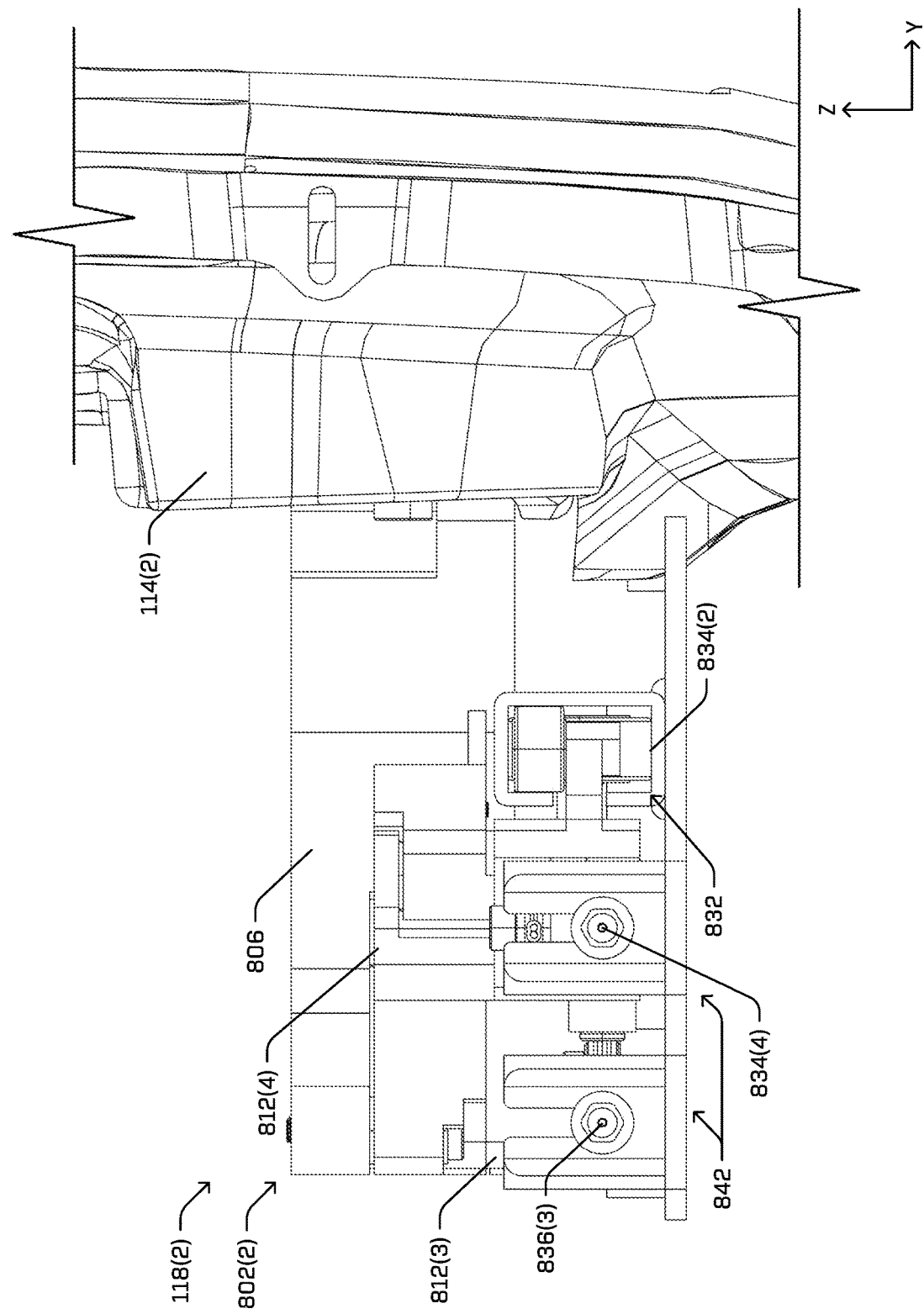
FIG. 8D is a fourth view of the first door actuator mechanism for opening and closing door(s) of the vehicle of FIG. 1, according to an example of the present disclosure.

FIG. 8D illustrates a fourth view of the second door actuator mechanism 118(2). The view shown in FIG. 8D represents an end view of the second door actuator mechanism 118(2), showing components of the second carriage assembly 802(2). However, although the view shown in FIG. 8D and the discussion below relates to the second carriage assembly 802(2), the first carriage assembly 802(1) may include similar components and function similarly.

The second bracket 806 is shown extending from the second door 114(2) and coupling to the third carriage 812(3) and the fourth carriage 812(4). Additionally, as will be discussed herein in detail, the fourth carriage 812(4) includes wheels that reside within the second channel 832. For example, the end view in FIG. 8D illustrates that the second channel 832 includes the second portion 834(2) within which wheels coupled to the fourth carriage 812(4) engage. The second portion 834(2) of the second channel 832 may include a C-shaped structure, and within the sidewalls of the second portion 834(2), the wheels of the fourth carriage 812(4) may reside. The C-shaped structure of the second portion 834(2) may restrict lateral movement (Y-direction) and vertical movement (Z-direction) of the second carriage assembly 802(2).

Supports 842 are also shown, through which the third cable 836(3) and the fourth cable 836(4) may route, respectively. The supports 842 may serve to align the third cable 836(3) and the fourth cable 836(4), and may prove structure for tensioning the third cable 836(3) and the fourth cable 836(4).

Figure 9:
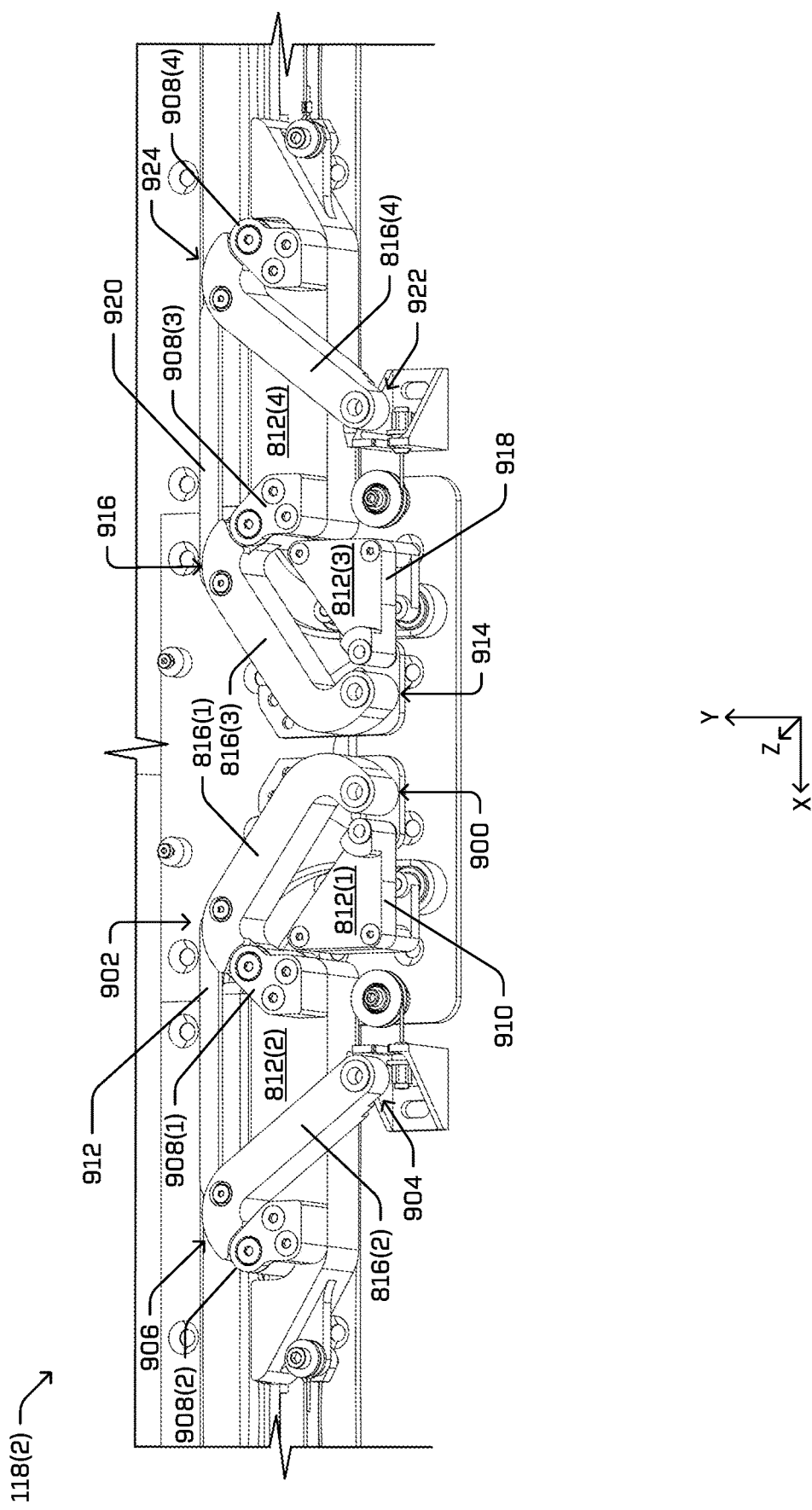
FIG. 9 is a partial detailed view of the second door actuator mechanism, showing components for opening and closing door(s) of the vehicle of FIG. 1, according to an example of the present disclosure.

FIG. 9 illustrates a perspective view of the second door actuator mechanism 118(2). In FIG. 9, the first bracket 804 and the second bracket 806 are shown removed to further illustrate components and/or features of the second door actuator mechanism 118(2).

The first link 816(1) is shown including a first end 900 for coupling to the first bracket 804, and a second end 902 for coupling to the second carriage 812(2). For example, the first link 816(1) may include passages through which pins are disposed for pivotably coupling the first link 816(1) to the first bracket 804 and the second carriage 812(2), respectively. The second link 816(2) is shown including a third end 904 for coupling to the first bracket 804, and a fourth end 906 for coupling to the second carriage 812(2). The second link 816(2) may include passages through which pins are disposed for pivotably coupling the second link 816(2) to the first bracket 804 and the second carriage 812(2), respectively.

In some instances, the second carriage 812(2) may include a first mount 908(1) to which the first link 816(1) couples, and a second mount 908(2) to which the second link 816(2) couples. As shown, the first link 816(1) couples to the second carriage 812(2) at a first end, and the second link 816(2) couples to the second carriage 812(2) at a second end, opposite the first end and spaced apart along a longitudinal length of the second carriage 812(2) (X-direction).

The first carriage 812(1) includes a first flange 910 for coupling the first carriage 812(1) to the first bracket 804. The first flange 910 may include a passage through which a pin is disposed for pivotably coupling the first carriage 812(1) to the first bracket 804. A first coupler 912 is shown coupling the first link 816(1) and the second link 816(2). In some instances, the first coupler 912 may prevent the first link 816(1) and the second link 816(2) inverting during opening and closing of the first door 114(1). The first coupler 912 may also assist in coordinating motion between the first link 816(1) and the second link 816(2). In other words, the first link 816(1), the second link 816(2), the first coupler 912, and the second segment 824(2) may operate as a four bar linkage that helps constrain motion of the first door 114(1).

The third link 816(3) is shown including a first end 914 for coupling to the second bracket 806, and a second end 916 for coupling to the fourth carriage 812(4). For example, the third link 816(3) may include passages through which pins are disposed for pivotably coupling the third link 816(3) to the second bracket 806 and the fourth carriage 812(4), respectively. The fourth link 816(4) is shown including a third end 922 for coupling to the second bracket 806, and a fourth end 924 for coupling to the fourth carriage 812(4). The fourth link 816(4) may include passages through which pins are disposed for pivotably coupling the fourth link 816(4) to the second bracket 806 and the fourth carriage 812(4), respectively. In some instances, the fourth carriage 812(4) may include a third mount 908(3) to which the third link 816(3) couples, and a fourth mount 908(4) to which the fourth link 816(4) couples. As shown, the third link 816(3) couples to the fourth carriage 812(4) at a first end, and the fourth link 816(4) couples to the fourth carriage 812(4) at a second end, opposite the first end and spaced apart along a longitudinal length of the fourth carriage 812(4) (X-direction).

The third carriage 812(3) includes a second flange 918 for coupling the third carriage 812(3) to the second bracket 806. The second flange 918 may include a passage through which a pin is disposed for pivotably coupling the third carriage 812(3) to the second bracket 806. A second coupler 920 is shown coupling the third link 816(3) and the fourth link 816(4). In some instances, the second coupler 920 may prevent the third link 816(3) and the fourth link 816(4) inverting during opening and closing of the second door 114(1). The second coupler 920 may also assist in coordinating motion between the third link 816(3) and the fourth link 816(4). In other words, the third link 816(3), the fourth link 816(4), the second coupler 920, and the second segment 824(2) may operate as a four bar linkage that helps constrain motion of the second door 114(2).

Figure 10:
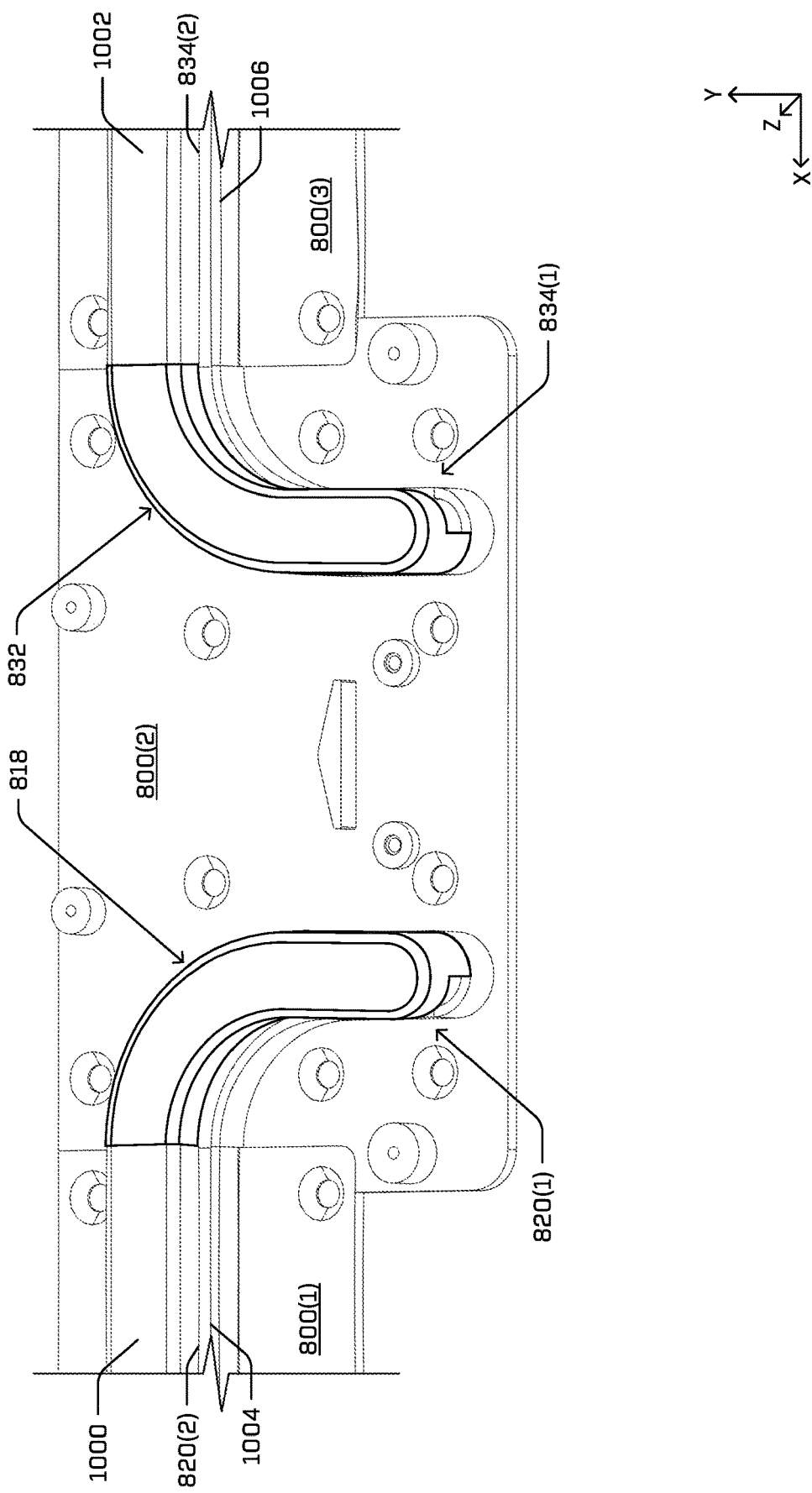
FIG. 10 is partial view of the second door actuator mechanism, showing channels within which components of the second door actuator mechanism may traverse for opening and closing door(s) of the vehicle of FIG. 1, according to an example of the present disclosure.

FIG. 10 illustrates a partial view of the first channel 818 and the second channel 832. In some instances, the first portion 820(1) and/or the second portion 820(2) may be formed via a first conduit 1000 coupled to the first plate 800(1) and the second plate 800(2). The first conduit 1000 may represent a C-shaped channel that at least partially encloses wheels of the first carriage 812(1) and wheels of the second carriage 812(2). The first conduit 1000 may include or define a first opening 1004 that extends a length of the first conduit 1000, and within which the first flange 910 may traverse during an opening and closing of the first door 114(1).

Additionally, or alternatively, the first portion 834(1) and/or the second portion 834(2) may be formed via a second conduit 1002 coupled to the second plate 800(2) and the third plate 800(3). The second conduit 1002 may represent a C-shaped channel that at least partially encloses wheels of the third carriage 812(3) and wheels of the fourth carriage 812(4). The second conduit 1002 may include or define a second opening 1006 that extends a length of the second conduit 1002, and within which the second flange 918 may traverse during an opening and closing of the second door 114(2).

Although the first plate 800(1), the second plate 800(2), and the third plate 800(3) are shown and discussed as separate components, in some instances, the first plate 800(1), the second plate 800(2), and the third plate 800(3) may represent single plate having the first channel 818 and the second channel 832. In such instances, the first channel 818 is formed or defined by the first conduit 1000, that extends along or couples to a single plate. Similarly, in such instances, the second channel 832 is formed or defined by the second conduit 1002, that extends along or couples to a single plate. Moreover, even though the first portion 820(1) of the first channel 818 and the first portion 834(1) of the second channel 832 are shown including a similar curvature, the first portion 820(1) and the first portion 834(1) need not be the same. For example, the first portion 820(1) and/or the first portion 834(1) may include different curvatures than shown. Still in some instances, portions of the first channel 818 and/or the second channel 832 may be formed by other conduits (e.g., U-shaped channel) or other surfaces (e.g., sidewalls) extending from the first plate 800(1), the second plate 800(2), and the third plate 800(3). Additionally, the first plate 800(1), the second plate 800(2), and/or the third plate 800(3) may be omitted. In such instances, the first conduit 1000 and/or the second conduit 1002 may couple to other portions of the vehicle 100, such as frames. As such, the first plate 800(1), the second plate 800(2), and/or the third plate 800(3) need not be included.

Figure 11A:
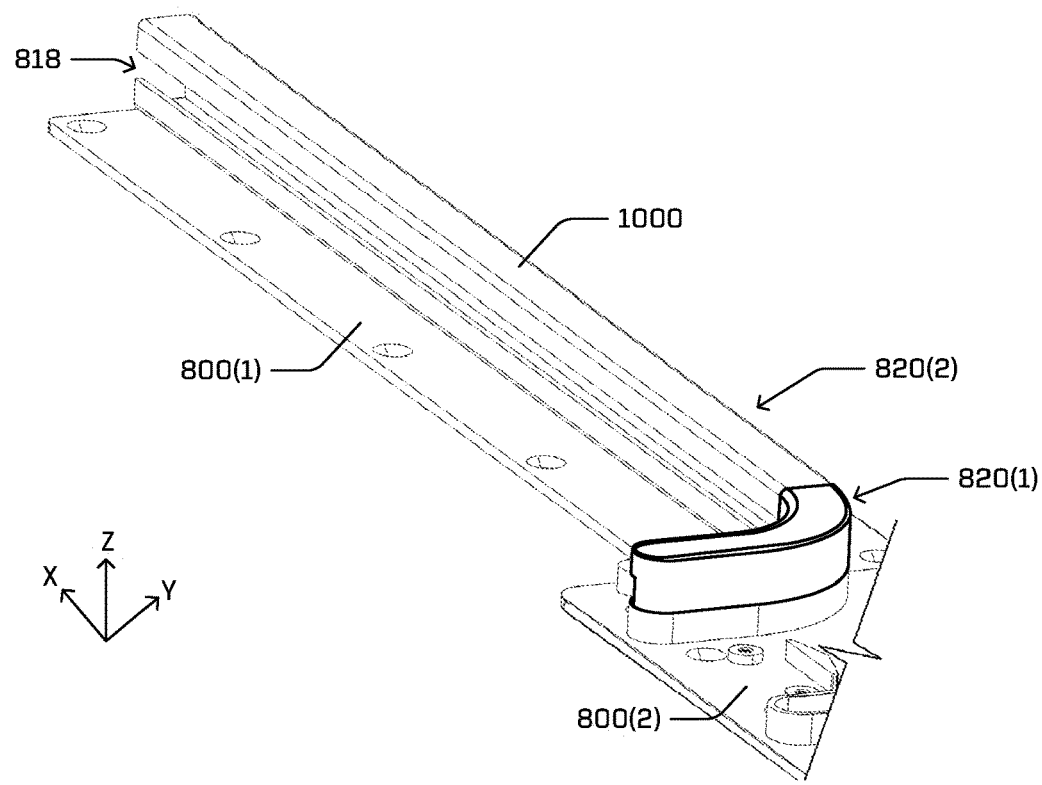
FIG. 11A is a partial view of the second door actuator mechanism, showing a first channel within which components of the second door actuator mechanism may traverse for opening and closing door(s) of the vehicle of FIG. 1, according to an example of the present disclosure.

FIG. 11A illustrates a detailed view of the first channel 818. As introduced above, the second plate 800(2) includes or defines the first portion 820(1) of the first channel 818. The second portion 820(2) may be formed via the first conduit 1000 coupled to the first plate 800(1). As shown, the first portion 820(1) and the second portion 820(2) are communicatively coupled such that wheels of the first carriage 812(1) and wheels of the second carriage 812(2) may move from the first portion 820(1) to the second portion 820(2), vice versa.

In some instances, the first conduit 1000 may also extend to provide the first portion 820(1) of the first channel 818. For example, the first conduit 1000 may curve to include the first portion 820(1). In such instances, the wheels of the first carriage 812(1) and the second carriage 812(2) may reside within the C-shaped channel of the first conduit 1000 during opening and closing of the first door 114(1).

Additionally, in some instances, a length (X-direction) of the first channel 818 may be longer than the length of the first channel 314 of the first door actuator mechanism 118(1). In part, because the second carriage 812(2) is larger than the second carriage 812(2) (e.g., via the first link 816(1) and the second link 816(2)), the length of the first channel 818 may be longer to accommodate the second carriage 812(2).

Figure 11B:
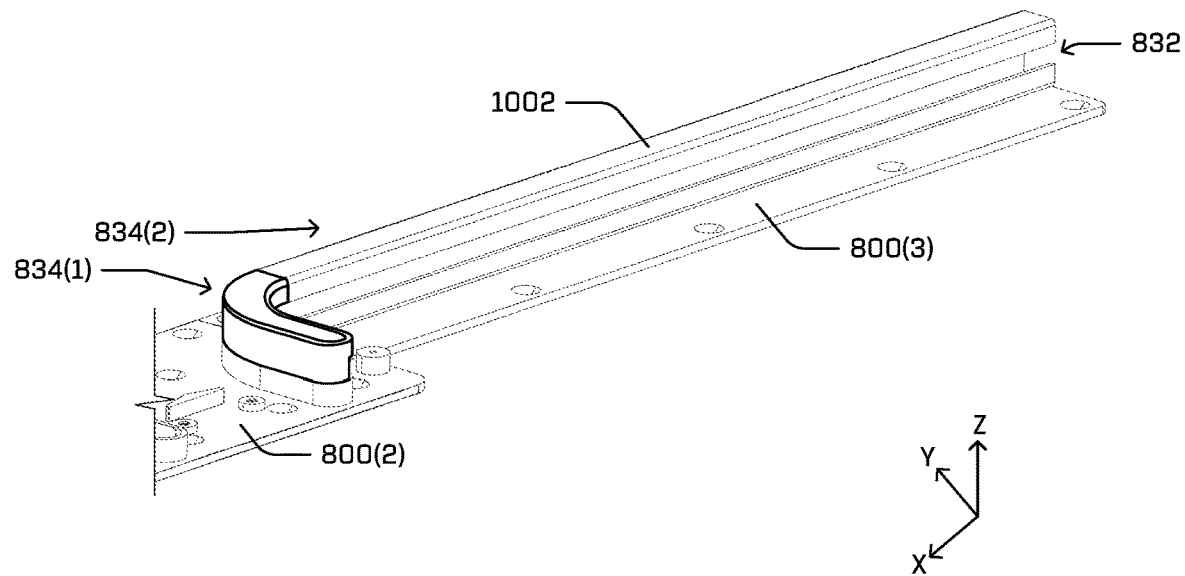
FIG. 11B is a partial view of the second door actuator mechanism, showing a second channel within which components of the second door actuator mechanism may traverse for opening and closing door(s) of the vehicle of FIG. 1, according to an example of the present disclosure.

FIG. 11B illustrates a detailed view of the second channel 832. As introduced above, the second plate 800(2) includes or defines the first portion 834(1) of the second channel 832. The second portion 834(2) may be formed via the second conduit 1002 coupled to the third plate 800(3). As shown, the first portion 834(1) and the second portion 834(2) are communicatively coupled together such that wheels of the third carriage 812(3) and wheels of the fourth carriage 812(4) may move from the first portion 834(1) to the second portion 834(2), vice versa.

In some instances, the second conduit 1002 may also extend to provide the first portion 834(1) of the second channel 832. For example, the second conduit 1002 may curve to include the second portion 834(1). In such instances, the wheels of the third carriage 812(3) and the fourth carriage 812(4) may reside within the C-shaped channel of the second conduit 1002 during opening and closing of the second door 114(2).

Additionally, in some instances, a length (X-direction) of the second channel 832 may be longer than the length of the second channel 326 of the first door actuator mechanism 118(1). In part, because the fourth carriage 812(4) is larger than the fourth carriage 812(4) (e.g., via the third link 816(3) and the fourth link 816(4)), the length of the second channel 832 may be longer to accommodate the fourth carriage 812(4).

Figure 12:
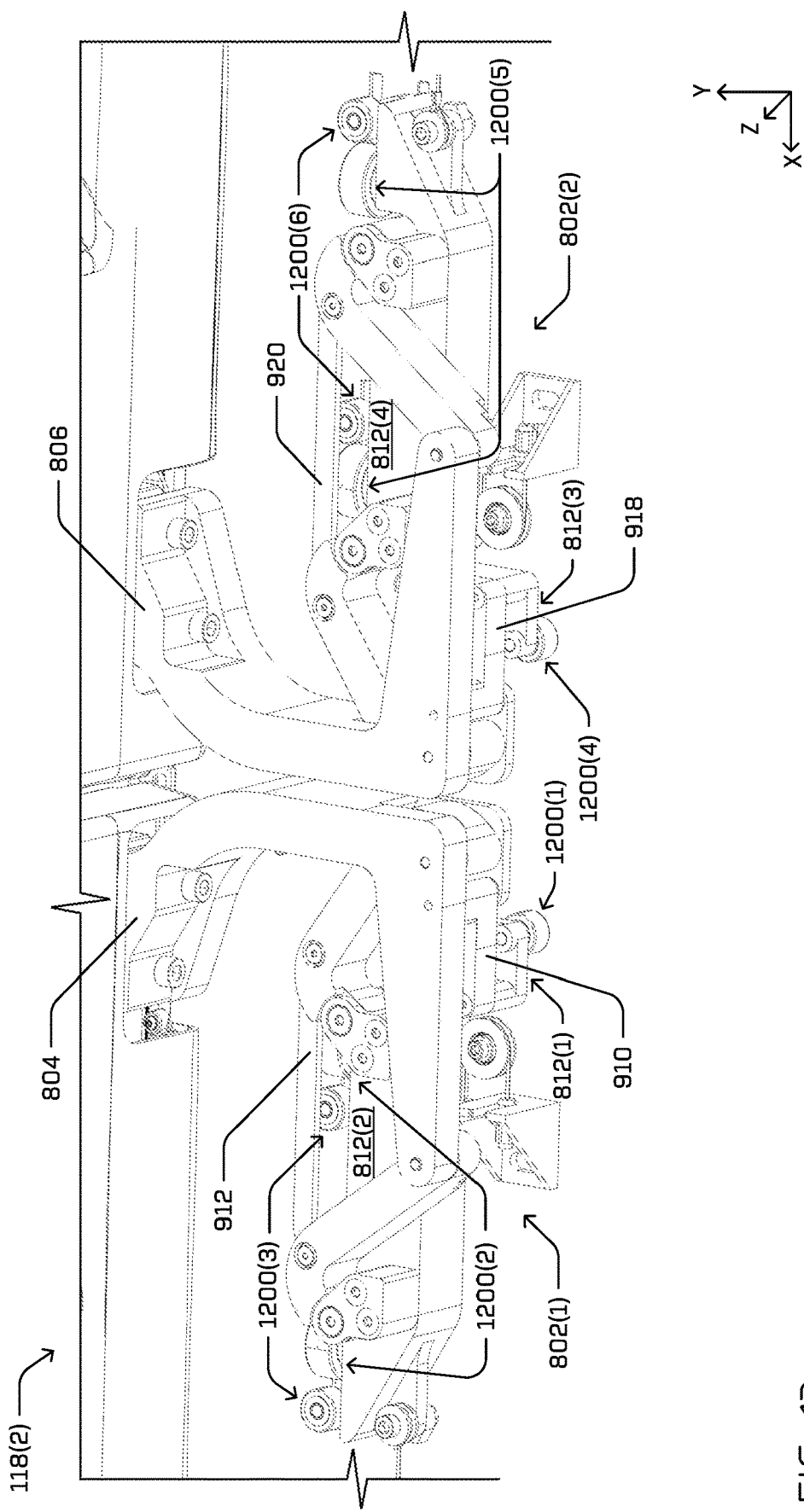
FIG. 12 is a partial detailed view of the second door actuator mechanism, showing components for opening and closing door(s) of the vehicle of FIG. 1, according to an example of the present disclosure.

FIG. 12 illustrates a perspective view of the second door actuator mechanism 118(2). In FIG. 12, the first plate 800(1), the second plate 800(2), and the third plate 800(3) are removed to illustrate wheels of the first carriage assembly 802(1) and the second carriage assembly 802(2) of the second door actuator mechanism 118(2).

The first carriage 812(1) includes first wheels 1200(1) that engage with the first channel 818. The first carriage 812(1) is shown coupled to the first bracket 804, via the first flange 910. The first wheels 1200(1) engage with the first channel 818, formed by the first conduit 1000. The first wheels 1200(1) are configured to rotate about the Z-axis.

The second carriage 812(2) includes second wheels 1200(2) and third wheels 1200(3). The second wheels 1200(2) and the third wheels 1200(3) engage with the first channel 818, or the second portion 820(2) formed by the first conduit 1000. In some instances, the second wheels 1200(2) support a weight of the first door 114(1), and as such, rotate about the Y-axis. Conversely, the third wheels 1200(3) may rotate about the Z-axis and may assist in guiding the second carriage 812(2) along the second portion 820(2) of the first channel 818. In some instances, the second wheels 1200(2) may represent vertical wheels (e.g., so as to support the weight of the first door 114(1)), while the third wheels 1200(3) may represent horizontal wheels.

The third carriage 812(1) includes fourth wheels 1200(4) that engage with the second channel 832. The third carriage 812(3) is shown coupled to the second bracket 806, via the second flange 918. The fourth wheels 1200(4) engage with the second channel 832, formed by the second conduit 1002. The fourth wheels 1200(4) are configured to rotate about the Z-axis.

The fourth carriage 812(4) includes fifth wheels 1200(5) and fifth wheels 1200(6). The fifth wheels 1200(5) and the sixth wheels 1200(6) engage with the second channel 832, or the second portion 834(2) formed by the second conduit 1002. In some instances, the fifth wheels 1200(5) support a weight of the second door 114(1), and as such, rotate about the Y-axis. Conversely, the sixth wheels 1200(6) may rotate about the Z-axis and may assist in guiding the fourth carriage 812(4) along the second portion 834(2) of the second channel 832. In some instances, the fifth wheels 1200(5) may represent vertical wheels (e.g., so as to support the weight of the second door 114(2)), while the sixth wheels 1200(6) may represent horizontal wheels.

Figure 13:
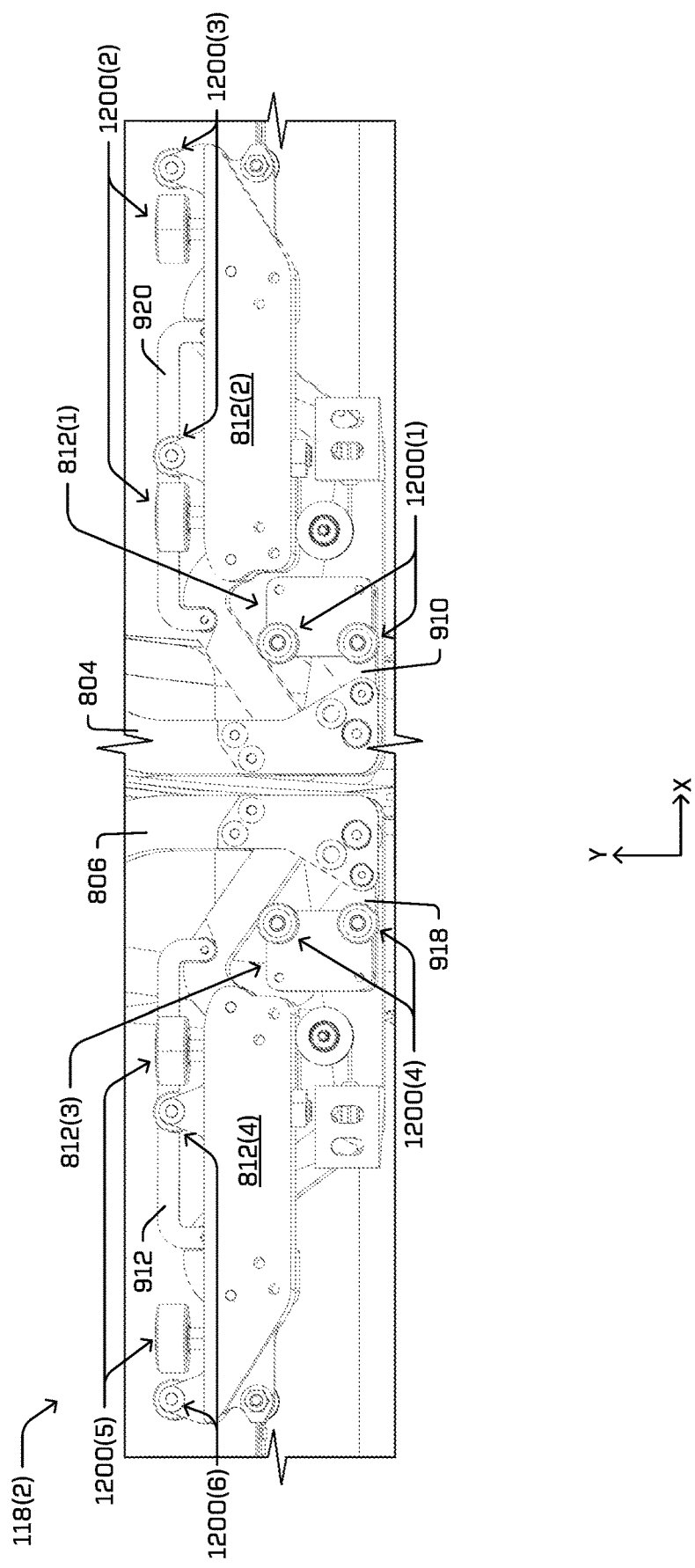
FIG. 13 is a partial detailed view of the second door actuator mechanism, showing components for opening and closing door(s) of the vehicle of FIG. 1, according to an example of the present disclosure.

FIG. 13 illustrates a bottom view of the second door actuator mechanism 118(2). In FIG. 13, the first plate 800(1), the second plate 800(2), and the third plate 800(3) are removed to illustrate wheels of the first carriage assembly 802(1) and the second carriage assembly 802(2) of the second door actuator mechanism 118(2).

The first wheels 1200(1) are shown including two wheels coupled to the first carriage 812(1). The first carriage 812(1) pivotably couples to the first bracket 804 such that as the first wheels 1200(1) traverse the first portion 820(1) of the first channel 818, the first carriage 812(1) rotates (about Z-axis) to traverse the second portion 820(2). The second wheels 1200(2), which may include two wheels spaced apart along a longitudinal length of the second carriage 812(2), are shown extending from the second carriage 812(2) for supporting a weight of the first door 114(1) and traversing the second carriage 812(2) along the first channel 818. The third wheels 1200(3), which may include two wheels spaced apart along a longitudinal length of the second carriage 812(2), may be rotatably coupled to the second carriage 812(2) via flanges. The flanges are configured to traverse the first opening 1004 in the first conduit 1000.

The fourth wheels 1200(4) are shown including two wheels coupled to the third carriage 812(3). The third carriage 812(3) pivotably couples to the second bracket 806 such that as the fourth wheels 1200(4) traverse the first portion 834(1) of the second channel 832, the third carriage 812(3) rotates (about Z-axis) to traverse the second portion 834(2). The fifth wheels 1200(5), which may include two wheels spaced apart along a longitudinal length of the fourth carriage 812(4), are shown extending from the fourth carriage 812(4) for supporting a weight of the second door 114(2) and traversing the fourth carriage 812(4) along the second channel 832. The sixth wheels 1200(6), which may include two wheels spaced apart along a longitudinal length of the fourth carriage 812(4), may be rotatably coupled to the fourth carriage 812(4) via flanges. The flanges are configured to traverse the second opening 1006 in the second conduit 1002.

The first coupler 912 is also shown pivotably coupling the first carriage 812(1) and the second carriage 812(2), while the second coupler 920 is shown pivotably coupling the third carriage 812(3) and the fourth carriage 812(4). Such couplings may provide the four bar linkages of the first carriage assembly 802(1) and the second carriage assembly 802(2), respectively, to control a motion of the first door 114(1) and the second door 114(2) about a vertical axis (Z-axis).

Figure 14:
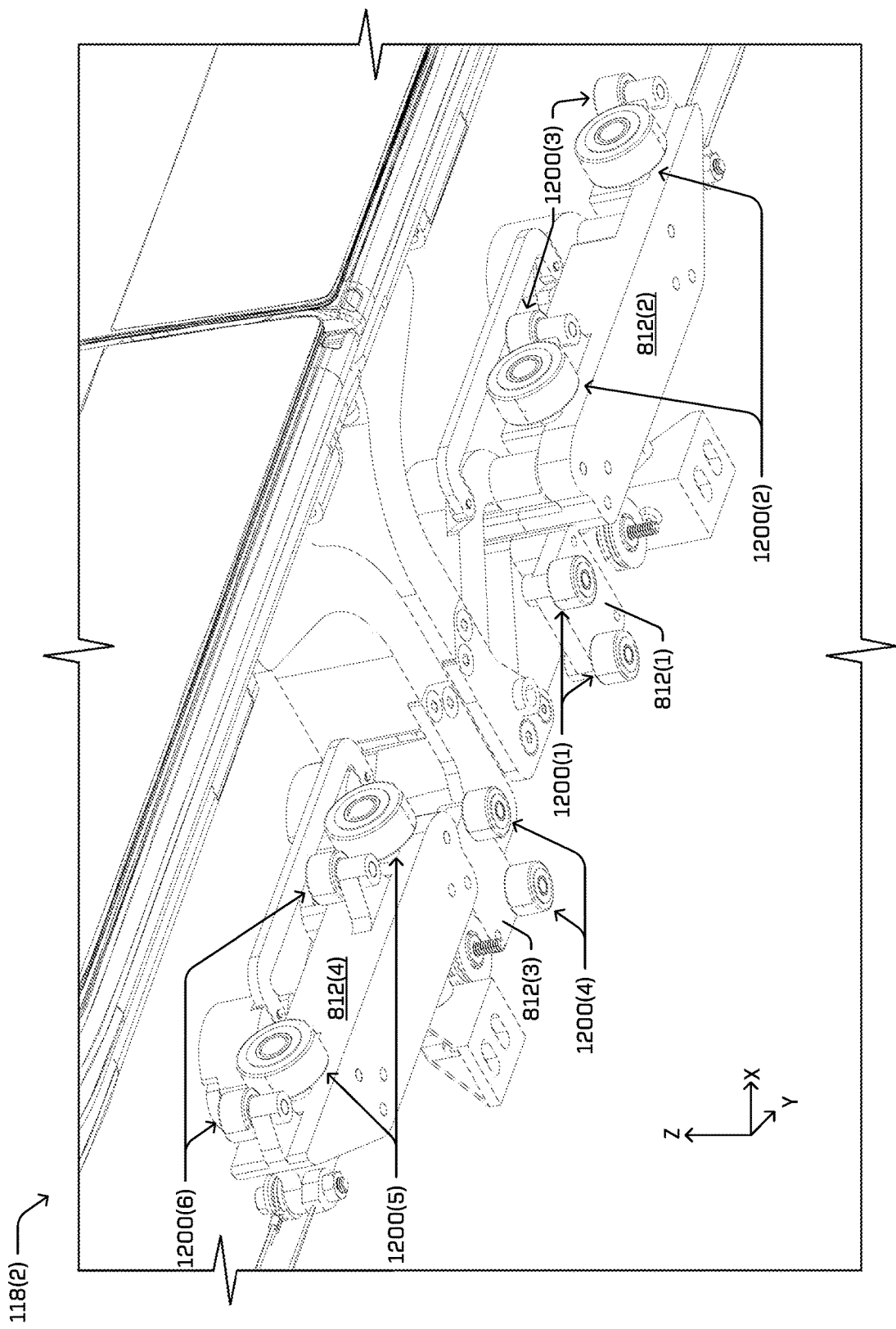
FIG. 14 is a partial detailed view of the second door actuator mechanism, showing components for opening and closing door(s) of the vehicle of FIG. 1, according to an example of the present disclosure.
Figure 15A:
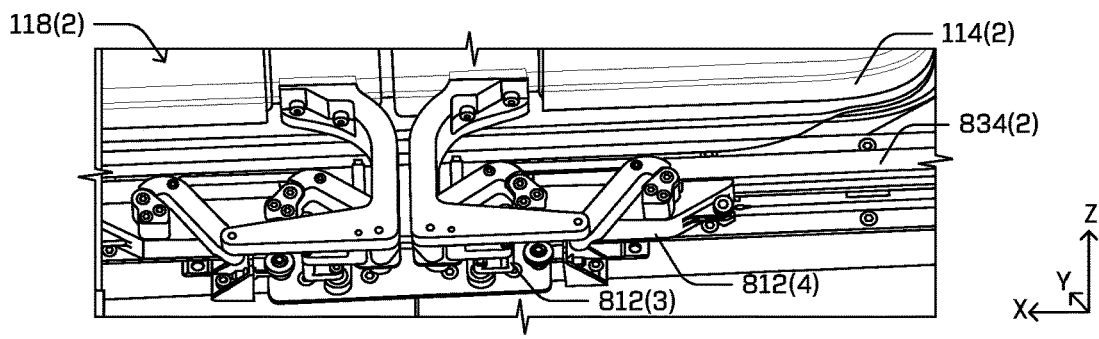
FIG. 15A is a first view showing a first position of a door during opening of the door of the vehicle of FIG. 1, according to an example of the present disclosure.
Figure 15B:
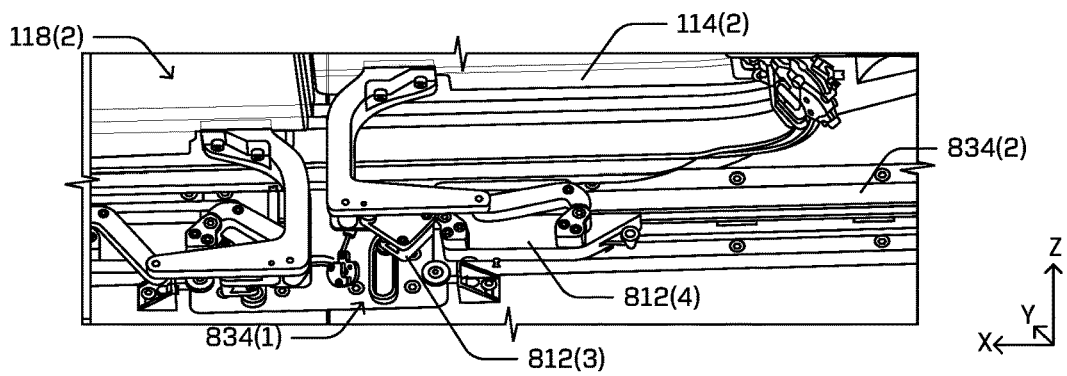
FIG. 15B is a second view showing a second position of a door during opening of the door of the vehicle of FIG. 1, according to an example of the present disclosure.
Figure 15C:
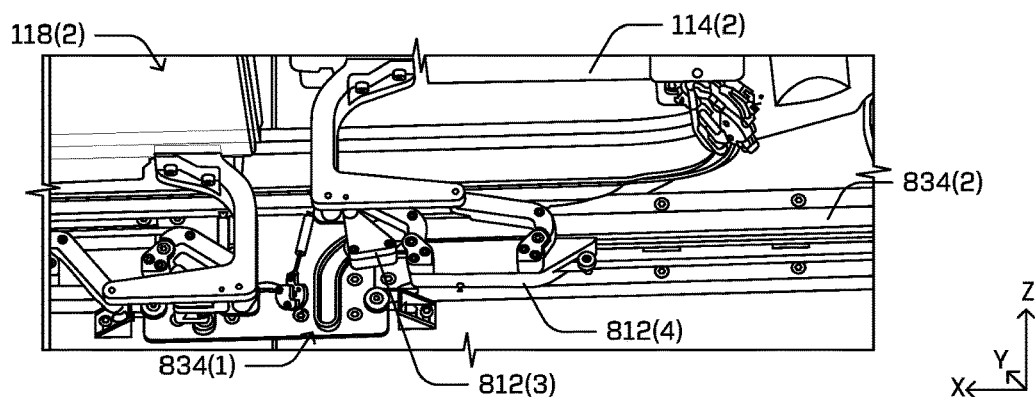
FIG. 15C is a third view showing a third position of a door during opening of the door of the vehicle of FIG. 1, according to an example of the present disclosure.
Figure 15D:
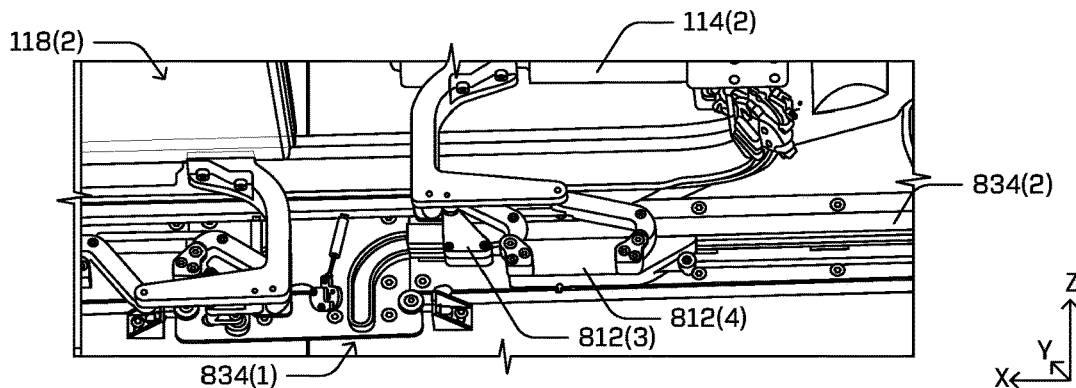
FIG. 15D is a fourth view showing a fourth position of a door during opening of the door of the vehicle of FIG. 1, according to an example of the present disclosure.

FIG. 14 illustrates a bottom view of the second door actuator mechanism 118(2). In FIG. 14, the first plate 800(1), the second plate 800(2), and the third plate 800(3) are removed to illustrate wheels of the first carriage assembly 802(1) and the second carriage assembly 802(2) of the second door actuator mechanism 118(2).

The first wheels 1200(1) are coupled to the first carriage 812(1) via one or more axles. The second wheels 1200(2) are shown extending from the second carriage 812(2) for supporting a weight of the first door 114(1). The second wheels 1200(2) may be offset from a body of the second carriage 812(2), such as via axles, which are configured to traverse the first opening 1004 in the first conduit 1000. The third wheels 1200(3) may be rotatably coupled to the second carriage 812(2) via the flanges that offset the third wheels 1200(3) from the second carriage 812(2) for traversing the second portion 820(4). The flanges are configured to traverse the first opening 1004 in the first conduit 1000.

The fourth wheels 1200(4) are coupled to the third carriage 812(3) via one or more axles. The fourth wheels 1200(4) are shown extending from the second carriage 812(2) for supporting a weight of the second door 114(2). The fifth wheels 1200(5) may be offset from a body of the fourth carriage 812(4), such as via axles, which are configured to traverse the second opening 1006 in the second conduit 1002. The sixth wheels 1200(6) may be rotatably coupled to the fourth carriage 812(4) via the flanges that offset the sixth wheels 1200(6) from the fourth carriage 812(4) for traversing the second portion 834(2). The flanges are configured to traverse the second opening 1006 in the second conduit 1002.

FIGS. 15A-15D illustrates a series of illustrations to show an opening of the second door 114(2) via an operation of the second door actuator mechanism 118(2), and particularly, the engagement between the second carriage assembly 802(2) and the second channel 832. However, the operation of the first carriage assembly 802(1) of the second door actuator mechanism 118(2) may be similar to the discussion of the second carriage assembly 802(2) herein. Moreover, the first carriage assembly 302(1) and the second carriage assembly 302(2) of the first door actuator mechanism 118(1) may similarly traverse the first channel 314 and the second channel 326, respectively.

As shown at "1", the second door 114(2) is in the closed position. At "1", the fourth wheels 1200(4) of the third carriage 812(3) reside within the first portion 834(1) of the second channel 832, while the fifth wheels 1200(5) and the sixth wheels 1200(6) of the fourth carriage 812(4) reside within the second portion 834(2) of the second channel 832. As the third cable 836(3) pulls on the fourth carriage 812(4), the fourth wheels 1200(4) of the third carriage 812(3) traverse the first portion 834(1) of the second channel 832, while the fifth wheels 1200(5) and the sixth wheels 1200(6) of the fourth carriage 812(4) traverse the second portion 834(2) of the second channel 832. Given the shape of the first portion 834(1) of the second channel 832, the second door 114(2) extends in a direction away from the vehicle 100.

For example, at "2," as the third carriage 812(3) traverses the first portion 834(1), the second door 114(2) is forced outward and away from the vehicle 100 via a coupling between the third carriage 812(3) and the second bracket 806. At substantially the same time, the fourth carriage 812(4) traverses along the second portion 834(2). As such, the pulling force imparted to the fourth carriage 812(4) via the third cable 836(3) transfers a corresponding pulling force to the third carriage 812(3) such that the second door 114(2) is extended outward as the third carriage 812(3) follows a curvature of the first portion 834(1).

At "3" the third carriage 812(3) continues to follow the curvature of the first portion 834(1), while the fourth carriage 812(4) extends longitudinally along the second portion 834(2). As also shown at "3" the third link 816(3) and the fourth link 816(4) transfer a pulling force from the fourth carriage 812(4) to the third carriage 812(3).

At "4" the third carriage 812(3) transitions into traversing along the second portion 834(2). That is, the fourth wheels 1200(4) of the third carriage 812(3) reside within the second portion 834(2) of the second channel 832. In this manner, the third carriage 812(3) travels along the second portion 834(2) such that the second door 114(2) opens longitudinally along the side of the vehicle 100. As such, the curved nature of the second channel 832 (via the first portion 834(1)), ensures that the second door 114(2) engages the vehicle 100 in a direction substantially perpendicular to a side of the vehicle 100. Such engagement, and directional movement, seals the second door 114(2) against the vehicle 100. That is, during opening, the second door 114(2) moves laterally outward away from the body 104 of the vehicle 100 to disengage the seals before the second door 114(2) transitions to move longitudinally. Similarly, as the second door 114(2) closes, the second door 114(2) moves longitudinally first, before being moved laterally inward to compress the second door 114(2), or seals of the second door 114(2), against the body 104 of the vehicle 100.

FIGS. 16A-16F illustrate additional latches of the vehicle 100 to assist in locking the first door 114(1) and the second door 114(2). In addition to the first latch 208 that engages the first door 114(1) and the second latch 210 that engages the second door 114(2), the vehicle 100 may include a first passive latch 1600 and/or a second passive latch 1602. The first passive latch 1600 may assist in locking the first door 114(1), or keeping the first door 114(1) in the closed position, while the second passive latch 1602 may assist in locking the second door 114(2), or keeping the second door 114(2) in the closed position. For example, given that the first latch 208 and the second latch 210 are engaged with outward lateral ends of the first door 114(1) and the second door 114(2), respectively, the first passive latch 1600 and the second passive latch 1602 may assist in ensuring that the first door 114(1) and the second door 114(2) seal against a middle portion of the door assembly 200 (e.g., where the first door 114(1) and the second door 114(2) seal against one another).

The first passive latch 1600 and the second passive latch 1602 may represent cam-type latches that engage with the first bracket 804 and the second bracket 806, respectively, in the closed position. For example, the first passive latch 1600 may include a first biasing member 1604(1) coupled to the body 104 (or other structure element of the vehicle 100), and a first cam 1606(1) coupled to the first biasing member 1604(1). As shown, a first end of the first biasing member 1604(1) couples to the body 104, while a second end of the first biasing member 1604(1) couples to the first cam 1606(1). Similarly, the second passive latch 1602 may include a second biasing member 1604(2) coupled to the body 104 (or other structure element of the vehicle 100), and a second cam 1606(2) coupled to the second biasing member 1604(2). A first end of the second biasing member 1604(2) couples to the body 104, while a second end of the second biasing member 1604(2) couples to the second cam 1606(2). In some instances, the first cam 1606(1) and the second cam 1606(2) are pivotably coupled to the second plate 8002(2), such that the first cam 1606(1) and the second cam 1606(2) may rotate as the first biasing member 1604(1) and the second biasing member 1604(2) move.

The first biasing member 1604(1) and the second biasing member 1604(2) may represent springs or gas cylinders that exert a force on the first cam 1606(1) and the second cam 1606(2), respectively. The first biasing member 1604(1) and the second biasing member 1604(2) may provide a toggle action to the first cam 1606(1) and the second cam 1606(2), respectively. The first cam 1606(1) and the second cam 1006(2) may have an over center lock point, and once the first cam 1606(1) and the second cam 1606(2) reach the over center position, the first cam 1606(1) and the second cam 1606(2) may be latched into place. At this position, the first door 114(1) and the second door 114(2) may be held in place in the closed position. However, the first door 114(1) and the second door 114(2) may be opened when a certain amount of force is applied to the first cam 1606(1) and the second cam 1606(2) such that the first cam 1606(1) and the second cam 1606(2) are advanced past the over center lock point. At this time, the first biasing member 1604(1) and the second biasing member 1604(2) may be compressed.

Figure 16A:
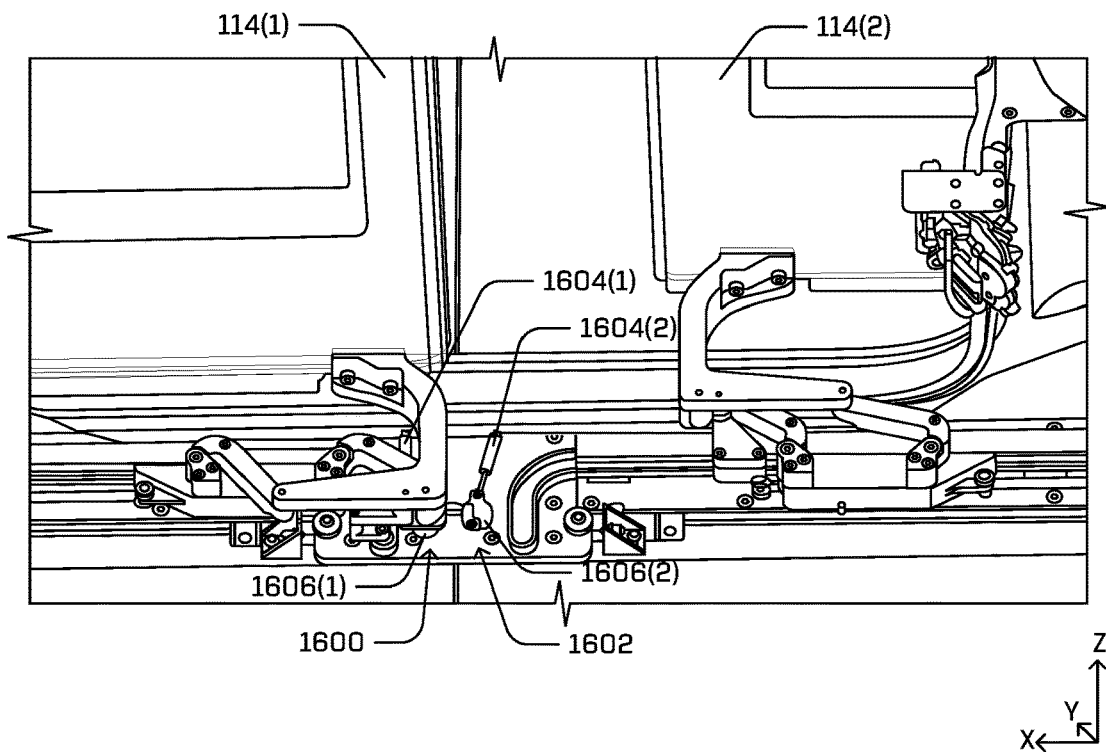
FIG. 16A illustrates a first view of a latching mechanism of the vehicle of FIG. 1, according to an example of the present disclosure.
Figure 16B:
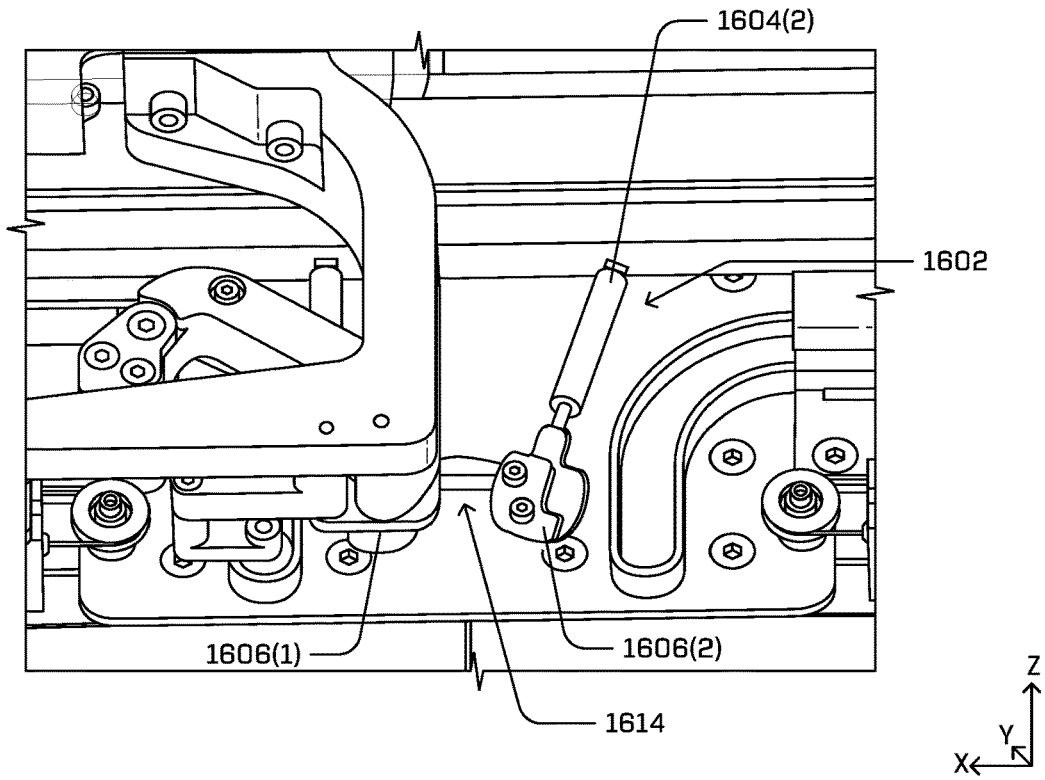
FIG. 16B illustrates a second view of the latching mechanism of FIG. 16A, according to an example of the present disclosure.
Figure 16C:
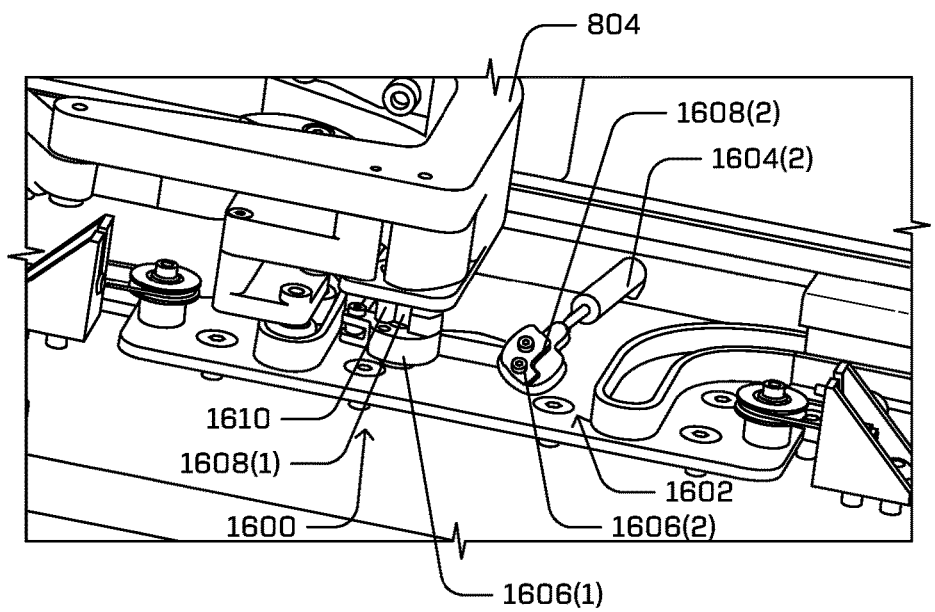
FIG. 16C illustrates a third view of the latching mechanism of FIG. 16A, according to an example of the present disclosure.

As shown in FIGS. 16A-16C, the first door 114(1) is in the closed position while the second door 114(2) is in the open position. In the open position, the second cam 1606(2) does not engage with the second bracket 806, and as such, the second door 114(2) may move to the open position. However, the second cam 1606(2) may accept the pin of the second bracket 806, in the open position, and then via movement of the second biasing member 1604(2), may engage the second bracket 806 for closing the second door 114(2). An opposite movement disengages the second bracket 806 such that the second door 114(2) may be opened. The second plate 800(2) may include a stop 1614 in which the first cam 1606(1) and the second cam 1606(2) engage to prevent over rotation. For example, the first cam 1606(1) and the second cam 1606(2) may engage with the stop 1614 to limit an amount by which the first cam 1606(1) and the second cam 1606(2) rotate.

As shown more clearly in FIG. 16C-16F, the first cam 1606(1) includes a first cam surface 1608(1) and the second cam 1606(2) includes a second cam surface 1608(2). The first cam surface 1608(1) engages with a first pin 1610 (e.g., striker, striker pin, etc.) that extends from the first bracket 804, while the second cam surface 1608(2) engages with a second pin 1612 that extends from the second bracket 806. The engagement between the first pin 1610 and the first cam surface 1608(1) (or more generally the first cam 1606(1)), prevents the first bracket 804 extending in a direction associated with the first door 114(1) opening (e.g., Z-direction). In this manner, the first passive latch 1600 prevents the first door 114(1) opening and assists in sealing the first door 114(1) against the vehicle 100. However, movement of the first biasing member 1604(1) (e.g., in the Z-direction) causes the first cam 1606(1) to rotate (clockwise about the Y-axis) to disengage the first pin 1610 from the first cam surface 1608(1), and consequently, enables the first door 114(1) to be opened. During closing of the first door 114(1), movement of the first biasing member 1604(1) in an opposite direction causes the first cam 1606(1) to rotate (counterclockwise about the Y-axis) to engage the first pin 1610 and the first cam surface 1608(1), and consequently, locks the first door 114(1). During this rotation of the first cam 1606(1), the first cam surface 1608(1) may pull on the first door 114(1) (via the first bracket 804) to direct the first door 114(1) laterally inward to seal the first door 114(1) against the vehicle 100.

The second cam surface 1608(2) may similarly engage with the second pin 1612 of the second bracket 806 for sealing the second door 114(2) in the closed position. For example, the second cam surface 1608(2) is positioned to accept the second pin 1612 coupled to the second bracket 806. From this position, the second biasing member 1604(2) may actuate (e.g., extend) to rotate the second cam 1606(2) (clockwise about the Y-axis). Therein, after moving, the second pin 1612 may be restricted from laterally extending away from the vehicle 100, and as such, the second door 114(2) may be sealed against the vehicle 100. The first biasing member 1604(1) and the second biasing member 1604(2) may be pivotably coupled to the first cam 1606(1) and the second cam 1606(2), respectively, to permit translation of the first biasing member 1604(1) and the second biasing member 1604(2) during actuation. Moreover, the first biasing member 1604(1) and the second biasing member 1604(2) may also pivotably coupled to the body 104 of the vehicle 100.

Operation of the second passive latch 1602 is shown and described in relation to FIGS. 16D-16F. However, although the discussion herein relates to the second passive latch 1602, it is to be understood that the first passive latch 1600 may operate and function similarly. In FIG. 16D, the second passive latch 1602 is shown in an open position for accepting the second pin 1612. At this position, a flange 1616 of the first cam 1606(2) may engage with the stop 1614 to prevent rotation of the first cam 1606(2) in a counterclockwise direction (about Y-axis). That is, the second biasing member 1604(2) may apply a force against the flange 1616 to keep the second passive latch 1602 in the open position for accepting the second pin 1612, and the stop 1614 may prevent the second cam 1606(2) over rotating from the force applied by the second biasing member 1604(2). As also shown in FIG. 16D, during closing of the second door 114(2), the second pin 1612 engages with the second cam surface 160(2). In FIG. 16E, during closing of the second door 114(2) (via the second door actuator mechanism 118(2)), the second pin 1612 is directed inward (towards the interior space 116). This results in a force being applied to the second cam 1606(2) from the second cam surface 1608(2). As a result, the flange 1616 is moved in a clockwise direction, away from the stop 1414. During continued actuation of the second door actuator mechanism 118(2), the second cam 1606(2) further rotates to a closed position as shown in FIG. 16F. In the closed position, the second biasing member 1604(2) applying a force to the second cam 1606(2) engaged with the second pin 1612. This force keeps the second cam 1606(2) in the closed position. However, a force applied by the second door actuator mechanism 118(2) during opening of the second door 114(2) causes the second pin 1612 to apply a force to the second cam 1606(2) and the second cam 1606(2) in turn rotates in the counterclockwise direction such that the second door 114(2) may be opened.

Although the first passive latch 1600 and the second passive latch 1602, or portions thereof, are shown being coupled to the second plate 800(2), the second plate 800(2) may be omitted. In such instances, the first passive latch 1600 and the second passive latch 1602 may couple to the first conduit 1000 and the second conduit 1002, respectively. For example, a flange may extend from the first conduit 1000 and the second conduit 1002. Here, the first cam 1606(1) and the second cam 1606(2) may couple to the pivotably couple to flange and operate for latching the first door 114(1) and the second door 114(2), respectively.

Figure 17:
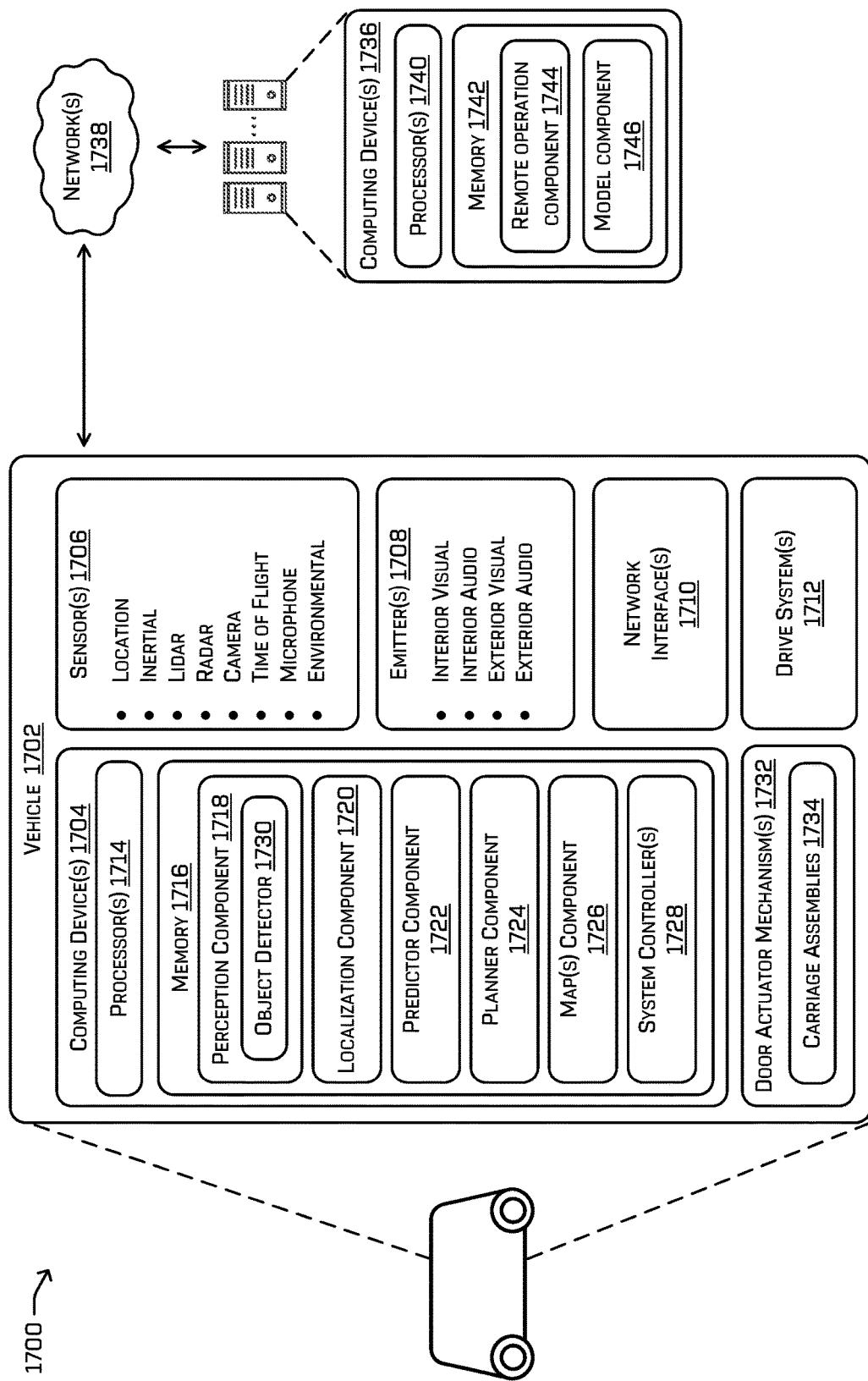
FIG. 17 is a block diagram of an example system for implementing the techniques described herein, according to an example of the present disclosure.

FIG. 17 depicts a block diagram of an example architecture 1700 for implementing the techniques discussed herein. In some instances, the architecture 1500 may include a vehicle 1702, which may represent the vehicle 100 introduced in FIG. 1. In some instances, the vehicle 1502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1702 may be a fully or partially autonomous vehicle having any other level or classification. Moreover, in some instances, the techniques described herein may be usable by non-autonomous vehicles as well. Still, the systems and methods described herein may be incorporated into any ground-borne, airborne, or waterborne vehicle, including those ranging from vehicles that need to be manually controlled by a driver at all times, to those that are partially or fully autonomously controlled.

The vehicle 1702 may include one or more vehicle computing device(s) 1704, one or more sensor(s) 1706, one or more emitter(s) 1708, one or more network interface(s) 1710 (also referred to as communication devices and/or modems), and/or one or more drive system(s) 1712. In some instances, the one or more sensor(s) 1706 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 1706 may include multiple instances of each of these or other types of sensors. For instance, the time-of-flight sensors may include individual time-of-flight sensors located at the corners, front, back, sides, and/or top of the vehicle 1702. As another example, the camera sensors may include multiple cameras disposed at various locations about the exterior and/or interior of the vehicle 1702. Similarly, the microphone sensors may include multiple microphones disposed at various locations about the exterior and/or interior of the vehicle 1702. The one or more sensor(s) 1706 may provide input to the vehicle computing device(s) 1704.

The one or more emitter(s) 1708 may emit light and/or sound. The one or more emitter(s) 1708 in this example may include interior audio and visual emitters to communicate with passengers of the vehicle 1702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 1708 in this example may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 1702 may also include one or more network interface(s) 1710 that enable communication between the vehicle 1702 and one or more other local or remote computing device(s) (e.g., a remote teleoperation computing device) or remote services. For instance, the one or more network interface(s) 1710 may facilitate communication with other local computing device(s) on the vehicle 1702. Also, the one or more network interface(s) 1710 may allow the vehicle 1702 to communicate with other nearby computing device(s) (e.g., other nearby vehicles, traffic signals, controllers, etc.). The one or more network interface(s) 1710 may include physical and/or logical interfaces for connecting the vehicle computing device(s) 1704 to another computing device or one or more external networks (e.g., the Internet). For example, the one or more network interface(s) 1710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 1702 may include one or more drive system(s) 1712. In some examples, the vehicle 1702 may have a single drive system 1712. In at least one example, the vehicle 1702 may have multiple drive systems 1712, where individual drive system(s) 1712 may be positioned on opposite ends of the vehicle 1702 (e.g., the front and the rear, etc.). In at least one example, the drive system(s) 1712 may include the one or more sensor(s) 1706 to detect conditions of the drive system(s) 1712 and/or the surroundings of the vehicle 1702. By way of example and not limitation, the sensor(s) 1706 may include one or more wheel encoders (e.g., rotary encoders) to sense rotation of the wheels of the drive system(s) 1712, inertial sensors (e.g., inertial measurement units, accelerometers, gyroscopes, magnetometers, etc.) to measure orientation and acceleration of the drive system(s) 1712, cameras or other image sensors, ultrasonic sensors to acoustically detect objects in the surroundings of the drive system(s) 1712, lidar sensors, radar sensors, etc. Some sensors, such as the wheel encoders may be unique to the drive system(s) 1712. In some cases, the sensor(s) 1706 on the drive system(s) 1712 may overlap or supplement corresponding systems of the vehicle 1702 (e.g., sensor(s) 1706).

The drive system(s) 1712 may include many of the vehicle systems, including a high voltage battery for wirelessly charging the high voltage battery, a motor to propel the vehicle, power electronics to bi-directionally convert between DC and AC, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

Additionally, the drive system(s) 1712 may include a drive system controller which may receive and preprocess data from the sensor(s) 1706 and to control operation of the various vehicle systems. In some examples, the drive system controller may include one or more processor(s) and memory communicatively coupled with the one or more processor(s). The memory may store one or more components to perform various functionalities of the drive system(s) 1712. Furthermore, the drive system(s) 1712 also include one or more communication connection(s) that enable communication by the respective drive system with one or more other local or remote computing device(s).

The vehicle computing device(s) 1704 may include one or more processor(s) 1714 and memory 1716 communicatively coupled with the one or more processor(s) 1714. In the illustrated example, the memory 1716 of the vehicle computing device(s) 1704 may store a perception component 1718, a localization component 1720, a predictor component 1722, a planner component 1724, a map(s) component 1726, and one or more system controller(s) 1728. Though depicted as residing in the memory 1716 for illustrative purposes, it is contemplated that the perception component 1718, the localization component 1720, the predictor component 1722, the planner component 1724, the map(s) component 1726, and the one or more system controller(s) 1728 may additionally, or alternatively, be accessible to the vehicle computing device(s) 1704 (e.g., stored in a different component of vehicle 1702) and/or be accessible to the vehicle 1702 (e.g., stored remotely).

The perception component 1718 may include functionality to perform object detection, segmentation, and/or classification. In some examples, the perception component 1718 may include an object detector 1730 that provides processed sensor data that indicates a presence of an entity that is proximate to the vehicle 1702 and/or a classification of the entity as an entity type (e.g., car, pedestrian, cyclist, building, tree, road surface, curb, sidewalk, unknown, etc.).

In additional and/or alternative examples, the perception component 1718 may provide processed sensor data that indicates one or more characteristics associated with a detected entity and/or the environment in which the entity is positioned. In some examples, characteristics associated with an entity may include, but are not limited to, an X-position (global position), a Y-position (global position), a Z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc. In general, the object detector 1730 may detect (among other things) semantic objects represented by sensor data. In some examples, the object detector 1730 may identify such semantic objects and may determine a two-dimensional or a three-dimensional bounding box associated with the object. The object detector 1730 may determine additional information such as a location, orientation, pose, and/or size (e.g., length, width, height, etc.) associated with the object. The object detector 1730 may send data to other components of the architecture 1700 for localization and/or determining calibration information, as discussed herein.

Further, the perception component 1718 may include functionality to store perception data generated by the perception component 1718. In some instances, the perception component 1718 may determine a track corresponding to an object that has been classified as an object type. For purposes of illustration only, the perception component 1718, using the sensor(s) 1706 may capture one or more images of an environment, which may be used to determine information about an environment. The stored perception data may, in some examples, include fused perception data captured by the vehicle 1702. Fused perception data may include a fusion or other combination of sensor data from sensor(s) 1706, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the vehicle computing device(s) 1704 may determine a track corresponding to a pedestrian.

The localization component 1720 may include functionality to receive data from the sensor(s) 1706 and/or other components to determine a position of the vehicle 1702. For example, the localization component 1720 may include and/or request/receive a three-dimensional map of an environment and may continuously determine a location of the vehicle 1702 within the map (e.g., determining a location in or near a charging depot). In some instances, the localization component 1720 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the vehicle 1702. In some instances, the localization component 1720 may provide data to various components of the vehicle 1702 to determine an initial position of an autonomous vehicle for generating a trajectory (e.g., to a vehicle charging space) or for initial calibration.

The predictor component 1722 may generate one or more probability maps representing prediction probabilities of possible locations of one or more objects in an environment. For example, the predictor component 1722 may generate one or more probability maps for vehicles, pedestrians, animals, and the like within a threshold distance from the vehicle 1702. In some instances, the predictor component 1722 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planner component 1724 may determine a path for the vehicle 1702 to follow to traverse through an environment (e.g., through a charging station). For example, the planner component 1724 may determine various routes and paths and various levels of detail. In some instances, the planner component 1724 may determine a route to travel from a first location (e.g., a current location) to a second location (e.g., a target location, such as a vehicle charging space). For the purpose of this discussion, a route may be a sequence of waypoints for traveling between two locations. As non-limiting examples, waypoints include streets, intersections, global positioning system (GPS) coordinates, etc. Further, the planner component 1724 may generate an instruction for guiding the vehicle 1702 along at least a portion of the route from the first location to the second location. In at least one example, the planner component 1724 may determine how to guide the vehicle 1702 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planner component 1724 may alternatively, or additionally, use data from the perception component 1718 and/or the predictor component 1722 to determine a path for the vehicle 1702 to follow to traverse through an environment. For example, the planner component 1724 may receive data from the perception component 1718 and/or the predictor component 1722 regarding objects associated with an environment. Using this data, the planner component 1724 may determine a route to travel from a first location (e.g., a current location) to a second location (e.g., a target location) to avoid objects in an environment. In at least some examples, the planner component 1724 may determine there is no such collision free path and, in turn, provide a path which brings vehicle 1702 to a safe stop avoiding all collisions and/or otherwise mitigating damage.

The memory 1716 further includes the map(s) component 1726 that may be used by the vehicle 1702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. A map may further include an object identifier, an object classification, a three-dimensional location, covariance data (e.g., represented in image data or a multi-resolution voxel space), and the like. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the map(s) component 1726 may include at least one map (e.g., images and/or a mesh). In some examples, the vehicle 1702 may be controlled based at least in part on the map(s) component 1726. That is, the map(s) component 1726 may be used in connection with the perception component 1718 (and sub-components), the localization component 1720 (and sub-components), the predictor component 1722, and/or the planner component 1724 to determine a location of the vehicle 1702, identify objects in an environment, generate prediction(s) and/or probabilities associated with objects and/or the vehicle 1702, and/or generate routes and/or trajectories to navigate within an environment (e.g., a trajectory to navigate within a charging station to maneuver for charging).

In at least one example, the vehicle computing device(s) 1704 include one or more system controller(s) 1728, which may be configured to control steering, propulsion, braking, safety, emitters, communication, and other systems of the vehicle 1702. The system controller(s) 1728 may communicate with and/or control corresponding systems of the drive system(s) 1712 and/or other components of the vehicle 1702, which may be configured to operate in accordance with a path provided from the planner component 1724.

The vehicle 1702 is further shown including door actuator mechanism(s) 1732. The door actuator mechanism(s) 1324 may include components for opening and closing doors of the vehicle 1702. In some instances, the door actuator mechanism(s) 1732 may include carriage assemblies 1734 that couple to doors of the vehicle 1702 for transitioning the doors between closed and open positions, vice versa. The door actuator mechanism(s) 1732 may additionally include motors or other actuators that actuate the carriage assemblies 1734 for transitioning the doors between closed and open positions, vice versa. The vehicle 1702 may include any number of doors, and in some instances, more than one door actuator mechanism 1732 (and a respective carriage assembly), may couple to the door. For example, a first door actuator mechanism having a first carriage assembly may couple to a top of a door, and a second door actuator mechanism having a second carriage assembly may couple to a bottom of the door.

The vehicle 1702 may connect to computing device(s) 1736 via a network 1738 and may include one or more processor(s) 1740 and memory 1742 communicatively coupled with the one or more processor(s) 1740. In at least one instance, the one or more processor(s) 1740 may be similar to the processor(s) 1714 and the memory 1742 may be similar to the memory 1716. In the illustrated example, the memory 1742 of the computing device(s) 1736 stores a remote operation component 1744 and/or a model component 1746. In at least one instance, the model component 1746, after empirical testing and/or simulations, may generate ML models to be used by the perception component 1718, as discussed herein. Though depicted as residing in the memory 1742 for illustrative purposes, it is contemplated that the remote operation component 1744 and the model component 1746 may additionally, or alternatively, be accessible to the computing device(s) 1736 (e.g., stored in a different component of computing device(s) 1736 and/or be accessible to the computing device(s) 1736 (e.g., stored remotely). The model component 1746 may include functionality to generate models for determining heights/classifications of multi-channel image data, as discussed herein.

The processor(s) 1714 of the vehicle computing device(s) 1704 and the processor(s) 1740 of the computing device(s) 1736 may be any suitable processor capable of executing instructions to process data and perform operations as described herein. By way of example and not limitation, the processor(s) 1714 and 1740 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 1716 of the vehicle computing device(s) 1704 and the memory 1742 of the computing device(s) 1736 are examples of non-transitory computer-readable media. The memory 1716 and 1742 may store an operating system and one or more software applications, instructions, programs, and/or data to implement the methods described herein and the functions attributed to the various systems. In various implementations, the memory 1716 and 1742 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 1716 and 1742 may be implemented as a neural network. In some examples a machine learned model could be trained for object detection.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

EXAMPLE CLAUSES

The following paragraphs describe various examples. Any of the examples in this section may be used with any other of the examples in this section and/or any of the other examples or embodiments described herein.

A: A door assembly comprising: a door; a first door actuator mechanism positioned proximate a top of the door to transition the door between an open position and a closed position; a second door actuator mechanism positioned proximate a bottom of the door to transition the door between the open position and the closed position; a first latch positioned at a first location around a perimeter of the door and engaging with the door to hold the door in the closed position; and a second latch positioned at a second location around the perimeter of the door and engaging with the door to hold the door in the closed position, the second latch comprising: a cam having a cam surface, and a biasing member coupled to the cam, the biasing member being configured to transition the cam between a first position in which a cam surface engages a portion of the door to prevent the door from transitioning to the open position, and a second position in which the cam surface disengages the portion of the door to permit the door transitioning to the open position, wherein: the second latch is further configured to transition to the cam to the second position in response to the door opening.

B: The door assembly of paragraph A, wherein: the first door actuator mechanism represents a first point of contact with the door, proximate the top of the door; the second door actuator mechanism represents a second point of contact with the door, proximate the bottom of the door; and the first latch represents a third point of contact with the door, proximate a side of the door.

C: The door assembly of paragraph A or B, wherein: the first door actuator mechanism comprises a first carriage assembly and a first channel within which the first carriage assembly traverses; and the second door actuator mechanism comprises a second carriage assembly and a second channel within which the second carriage assembly traverses.

D: The door assembly of any of paragraphs A-C, wherein: the second carriage assembly comprises: a bracket coupled to the door, a first carriage coupled to the bracket, a second carriage coupled to the first carriage and the bracket, and a pin; in the first position, the cam surface engages the pin; and in the second position, the cam surface disengages the pin.

E: The door assembly of any of paragraphs A-D, wherein the biasing member comprises a gas cylinder or a spring.

F: The door assembly of any of paragraphs A-E, wherein: in the second position, a first amount of force applied to the cam surface causes the cam to move over center and transition the cam to the first position; and in the first position, a second amount of force applied to the cam surface causes the cam to move over center and transition the cam to the second position, the second amount of force being opposite the first amount of force.

G: A vehicle comprising: a door; a first door actuator mechanism coupled to the door and forming a first point of contact with the door, the first door actuator mechanism being configured to traverse the door between an open position and a closed position; a second door actuator mechanism coupled to the door and forming a second point of contact with the door, the second door actuator mechanism being configured to traverse the door between the open position and the closed position; a latch forming a third point of contact with the door and being configured to hold the door in the closed position; and a passive latch engaging with a portion of the second door actuator mechanism and being configured to hold the door in the closed position, the passive latch comprising: a cam, and a biasing member coupled to the cam, the biasing member being configured to transition the cam between a first position in which the cam engages the portion of the second door actuator mechanism, and a second position in which the cam disengages the portion of the second door actuator mechanism.

H: The vehicle of paragraph G, wherein: in the first position, the cam prevents the door transitioning to the open position; and in the second position, the cam permits the door transitioning to the open position.

I: The vehicle of paragraph G or H, wherein: in the first position, the biasing member applies a first amount of force to the cam to prevent the door transitioning to the open position; and in the first position, applying a second amount of force to the cam permits the door transitioning to the open position, the second amount of force being opposite the first amount of force.

J: The vehicle of any of paragraphs G-I, wherein: the first point of contact is proximate a top of the door; the second point of contact is proximate a bottom of the door; and the third point of contact is proximate a side of the door.

K: The vehicle of any of paragraphs G-J, wherein: the second door actuator mechanism comprises a bracket coupled to the door; the bracket comprises a pin; and the pin comprises the portion of the second door actuator mechanism in which the cam engages.

L: The vehicle of any of paragraphs G-K, wherein: the first door actuator mechanism comprises a first carriage assembly and a first channel within which the first carriage assembly traverses; and the second door actuator mechanism comprises a second carriage assembly and a second channel within which the second carriage assembly traverses.

M: The vehicle of any of paragraphs G-L, wherein the biasing member comprises a gas cylinder or a spring.

N: The vehicle of any of paragraphs G-M, wherein the cam rotates in a first direction from the first position to the second position, further comprising a stop that prevents rotation of the cam in a second direction at the first position, the second direction being opposite the first direction.

O: A door assembly comprising: a door; a door actuator mechanism configured to transition the door between an open position and a closed position; a first latch configured to hold the door in the closed position; and a second latch engaging with a portion of the door actuator mechanism and being configured to hold the door in the closed position, the second latch comprising: a cam, and a biasing member coupled to the cam, the biasing member configured to transition the cam between a first position in which the cam engages the portion of the door actuator mechanism, and a second position in which the cam disengages the portion of the door actuator mechanism.

P: The door assembly of paragraph O, wherein the second latch is configured to disengage the portion of the door actuator mechanism based at least in part on a threshold amount of force being applied to the cam.

Q: The door assembly of paragraph O or P, further comprising a second door actuator mechanism configured to transition the door between the open position and the closed position, wherein: the door actuator mechanism is disposed proximate a bottom of the door; the first latch is disposed proximate a side of the door; the second latch is disposed proximate the bottom of the door; and the second door actuator mechanism is disposed proximate a top of the door.

R: The door assembly of any of paragraphs O-Q, wherein: the cam includes a cam surface; the door actuator mechanism includes a pin; in the first position, the cam surface and the pin are engaged to prevent the door transitioning to the open position; and in the second position, the cam surface and the pin are disengaged to permit the door transitioning to the open position.

S: The door assembly of any of paragraphs O-R, wherein: the biasing member applies a first amount of force to the cam in the first position; and applying a second amount of force to the cam in the first position causes the cam to transition to the second position, the second amount of force being opposite the first amount of force.

T: The door assembly of any of paragraphs O-S, wherein a first location of the first latch is spaced from a second location of the second latch in a direction along a longitudinal axis of the door assembly.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A door assembly comprising:
    a door including a striker;
    a first door actuator mechanism positioned proximate a top of the door to transition the door between an open position and a closed position;
    a second door actuator mechanism positioned proximate a bottom of the door to transition the door between the open position and the closed position;
    a first latch positioned at a first location around a perimeter of the door and engaging with the door to hold the door in the closed position; and
    a second latch positioned at a second location around the perimeter of the door and engaging with the door to hold the door in the closed position, the second latch comprising:
        a cam having a cam surface, and
        a biasing member coupled to the cam, the biasing member being configured to transition the cam between a first position in which the cam surface is urged against the striker to prevent the cam moving over center to transition the door to the open position, and a second position in which the cam is urged against the cam surface and moves over center such that the cam surface disengages the striker to permit the door to transition to the open position, wherein:
            the second latch is further configured to transition to the cam to the second position in response to the door opening.

2. The door assembly of claim 1, wherein:
    the first door actuator mechanism represents a first point of contact with the door, proximate the top of the door;
    the second door actuator mechanism represents a second point of contact with the door, proximate the bottom of the door; and
    the first latch represents a third point of contact with the door, proximate a side of the door.

3. The door assembly of claim 1, wherein:
    the first door actuator mechanism comprises a first carriage assembly and a first channel within which the first carriage assembly traverses; and
    the second door actuator mechanism comprises a second carriage assembly and a second channel within which the second carriage assembly traverses.

4. The door assembly of claim 3, wherein:
    the second carriage assembly comprises:
        a bracket coupled to the door,
        a first carriage coupled to the bracket, and
        a second carriage coupled to the first carriage and the bracket;
    the striker from the bracket;
    in the first position, the cam surface engages the striker; and
    in the second position, the cam surface disengages the striker.

5. The door assembly of claim 1, wherein the biasing member comprises a gas cylinder or a spring.

6. The door assembly of claim 1, wherein:
in the second position, a first amount of force applied to the cam surface causes the cam to move over center and transition the cam to the first position; and
in the first position, a second amount of force applied to the cam surface causes the cam to move over center and transition the cam to the second position, the second amount of force being opposite the first amount of force.

7. A vehicle comprising:
a door;
a first door actuator mechanism coupled to the door and forming a first point of contact with the door, the first door actuator mechanism being configured to traverse the door between an open position and a closed position;
a second door actuator mechanism coupled to the door and forming a second point of contact with the door, the second door actuator mechanism being configured to traverse the door between the open position and the closed position;
a latch forming a third point of contact with the door and being configured to hold the door in the closed position; and
a passive latch engaging with a portion of the second door actuator mechanism, the passive latch comprising:
a cam, and
a biasing member coupled to the cam, the biasing member being configured to apply a first amount of force to position the cam in a first position over center and engage the portion of the second door actuator mechanism to prevent the door transitioning to the open position, and apply a second amount of force to position the cam in a second position over center and disengage the portion of the second door actuator mechanism to permit the door transitioning to the open position.

8. The vehicle of claim 7, wherein the second amount of force is opposite the first amount of force.

9. The vehicle of claim 7, wherein:
the first point of contact is proximate a top of the door;
the second point of contact is proximate a bottom of the door; and
the third point of contact is proximate a side of the door.

10. The vehicle of claim 7, wherein:
the second door actuator mechanism comprises a bracket coupled to the door;
the bracket comprises a pin; and
the pin comprises the portion of the second door actuator mechanism in which the cam engages.

11. The vehicle of claim 7, wherein:
the first door actuator mechanism comprises a first carriage assembly and a first channel within which the first carriage assembly traverses; and
the second door actuator mechanism comprises a second carriage assembly and a second channel within which the second carriage assembly traverses.

12. The vehicle of claim 7, wherein the biasing member comprises a gas cylinder or a spring.

13. The vehicle of claim 7, wherein the cam rotates in a first direction from the first position to the second position, further comprising a stop that prevents rotation of the cam in a second direction at the first position, the second direction being opposite the first direction.

14. A door assembly comprising:
a door;
a first door actuator mechanism configured to transition the door between an open position and a closed position;
a second door actuator mechanism configured to transition the door between the open position and the closed position;
a first latch configured to hold the door in the closed position; and
a second latch engaging with a portion of the first door actuator mechanism, the second latch comprising:
a cam, and
a biasing member coupled to the cam, the biasing member configured to:
force the cam over center to a first position in which the cam engages the portion of the first door actuator mechanism in response to the portion of the first door actuator mechanism being urged against the cam in a first direction, and
force the cam over center to a second position in which the cam disengages the portion of the first door actuator mechanism in response to the portion of the first door actuator mechanism being urged against the cam in a second direction.

15. The door assembly of claim 14, wherein the second latch is configured to disengage the portion of the first door actuator mechanism based at least in part on a threshold amount of force being applied to the cam.

16. The door assembly of claim 14, wherein:
the first door actuator mechanism is disposed proximate a bottom of the door;
the first latch is disposed proximate a side of the door;
the second latch is disposed proximate the bottom of the door; and
the second door actuator mechanism is disposed proximate a top of the door.

17. The door assembly of claim 14, wherein:
the cam includes a cam surface;
the first door actuator mechanism includes a pin;
the pin comprises the portion of the first door actuator mechanism which the cam engages;
in the first position, the cam surface and the pin are engaged to prevent the door transitioning to the open position; and
in the second position, the cam surface and the pin are disengaged to permit the door transitioning to the open position.

18. The door assembly of claim 14, wherein:
the biasing member applies a first amount of force to the cam in the first position; and
in the first position, applying a second amount of force to the cam in the first direction, via the portion of the first door actuator mechanism, overcomes the first amount of force and causes the cam to transition to the second position, the second amount of force being opposite the first amount of force.

19. The door assembly of claim 18, wherein:
the biasing member applies a third amount of force to the cam in the second position; and
in the second position, applying a fourth amount of force to the cam in the second direction, via the portion of the first door actuator mechanism, overcomes the third amount of force and causes the cam to transition to the first position.

20. The door assembly of claim 14, wherein a first location of the first latch is spaced from a second location of the second latch in a third direction along a longitudinal axis of the door assembly.

\* \* \* \* \*